United States Patent
Kimura

(10) Patent No.: US 10,025,220 B2
(45) Date of Patent: Jul. 17, 2018

(54) OPTICAL SCANNING APPARATUS

(71) Applicant: CANON KABUSHIKI KAISHA, Tokyo (JP)

(72) Inventor: Kazumi Kimura, Toda (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/477,333

(22) Filed: Apr. 3, 2017

(65) Prior Publication Data
US 2017/0293236 A1  Oct. 12, 2017

(30) Foreign Application Priority Data

Apr. 8, 2016  (JP) .................. 2016-077749
Apr. 8, 2016  (JP) .................. 2016-077750

(51) Int. Cl.
| | | |
|---|---|---|
| *G03G 15/04* | (2006.01) | |
| *G03G 15/043* | (2006.01) | |
| *G02B 26/10* | (2006.01) | |
| *G02B 13/00* | (2006.01) | |
| *H04N 1/193* | (2006.01) | |

(52) U.S. Cl.
CPC ........ *G03G 15/043* (2013.01); *G02B 13/0035* (2013.01); *G02B 26/101* (2013.01); *G02B 26/105* (2013.01); *H04N 1/193* (2013.01)

(58) Field of Classification Search
CPC ........... G03G 15/043; G03G 15/04036; G02B 13/0035; G02B 26/101; G02B 26/105; G02B 26/123; G02B 26/10; H04N 1/193
See application file for complete search history.

(56) References Cited

U.S. PATENT DOCUMENTS

| 7,145,705 B2 | 12/2006 | Hayashi | |
|---|---|---|---|
| 2005/0220504 A1* | 10/2005 | Kondo | G03G 15/011 399/301 |
| 2009/0074459 A1* | 3/2009 | Nakamura | G02B 26/123 399/151 |

(Continued)

FOREIGN PATENT DOCUMENTS

| JP | 2005092129 A | 4/2005 |
|---|---|---|
| JP | 2012194333 A | 10/2012 |

(Continued)

*Primary Examiner* — Sophia S Chen
(74) *Attorney, Agent, or Firm* — Rossi, Kimms & McDowell LLP

(57) ABSTRACT

An optical scanning apparatus of the present invention includes: a splitting element which splits a light flux emitted from a light source into first and second light fluxes; a deflecting unit which deflects the first and second light fluxes to scan first and second scanned surfaces in a main scanning direction; and an imaging optical system which includes a first imaging lens on which both the first and second light fluxes deflected by the deflecting unit are incident and guides the first and second light fluxes to the first and second scanned surfaces. The condition expressed by $-1.1 \leq \alpha_1/\alpha_2 \leq -0.9$ is satisfied where $\alpha_1$ and $\alpha_2$ are angles within a main scanning cross section between a first axis parallel to the main scanning cross section and directions of incidence of the first and second light fluxes on the deflecting unit, respectively.

20 Claims, 11 Drawing Sheets

(56) References Cited

U.S. PATENT DOCUMENTS

| | | | | |
|---|---|---|---|---|
| 2010/0028048 A1* | 2/2010 | Kimura | ............ | G03G 15/04036 399/177 |
| 2011/0318057 A1* | 12/2011 | Watanabe | ............ | G02B 26/127 399/151 |
| 2016/0147193 A1* | 5/2016 | Yoshida | ............ | G03G 15/04036 399/107 |
| 2016/0231690 A1* | 8/2016 | Yoshida | ............. | G03G 21/1619 |

FOREIGN PATENT DOCUMENTS

| | | | |
|---|---|---|---|
| JP | 2012233931 A | 11/2012 | |
| JP | 2014137471 A | 7/2014 | |

* cited by examiner

OPTICAL SCANNING APPARATUS

BACKGROUND OF THE INVENTION

Field of the Invention

The present invention relates to an optical scanning apparatus and is suitable for an image forming apparatus such as a laser light flux printer or a multi-function printer in particular.

Description of the Related Art

Optical scanning apparatuses have been used as exposure apparatuses for image forming apparatuses such as laser light flux printers in recent years.

Japanese Patent Application Laid-Open No. 2005-92129 discloses an optical scanning apparatus 500 illustrated in FIG. 5.

As illustrated in FIG. 5, a light flux emitted from a shared light source (not illustrated) is split into two light fluxes L1 and L2 by a light beam splitting element (not illustrated). The light flux L2 is reflected on a not-illustrated folding mirror. The light fluxes L1 and L2 are incident on a deflecting surface 551 of a polygon mirror 505 so that the difference between incidence angles thereof within the main scanning cross-section is 45 degrees. The light fluxes L1 and L2 thereby scan different scanned surfaces alternately.

However, in the optical scanning apparatus 500 disclosed in the Japanese Patent Application Laid-Open No. 2005-92129, the light fluxes L1 and L2 are incident on the deflecting surface 551 with different incidence angles and are therefore deflected by different positions on the deflecting and reflecting surface 551. Accordingly, the optical paths of the light fluxes L1 and L2 from the points of reflection on the deflecting surface 551 to the respective scanned surfaces are different in length from each other. This results in a difference in the focusing position at each image height between the scanned surfaces, producing a difference in field curvature between the scanned surfaces.

SUMMARY OF THE INVENTION

An object of the invention is to provide an optical scanning apparatus with a less difference in field curvatures between the scanned surfaces which are scanned by a plurality of light fluxes obtained by splitting a light flux emitted from a shared light source.

An optical scanning apparatus according to the present invention includes: a splitting element which splits a light flux emitted from a light source into first and second light fluxes; a deflecting unit which deflects the first and second light fluxes to scan first and second scanned surfaces in a main scanning direction; and an imaging optical system which includes a first imaging lens on which both the first and second light fluxes deflected by the deflecting unit are incident and guides the first and second light fluxes to the first and second scanned surfaces, respectively. The optical scanning apparatus satisfies the following conditional expression:

$$-1.1 \leq \alpha 1/\alpha 2 \leq -0.9$$

where $\alpha 1$ and $\alpha 2$ are angles within a main scanning cross section between a first axis parallel to the main scanning cross section and the directions of incidence of the first and second light fluxes on the deflecting unit, respectively.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. Some of the following drawings have different scales from the real one for easy understanding of the embodiments.

In the following description, the main scanning direction corresponds to a direction perpendicular to the axis of rotation of a deflecting unit and an optical axis of an optical system. The sub-scanning direction corresponds to the direction parallel to the axis of rotation of the deflecting unit. The main scanning cross section corresponds to a cross section perpendicular to the sub-scanning direction while the sub-scanning cross section corresponds to a cross section perpendicular to the main scanning direction.

Figure 5:
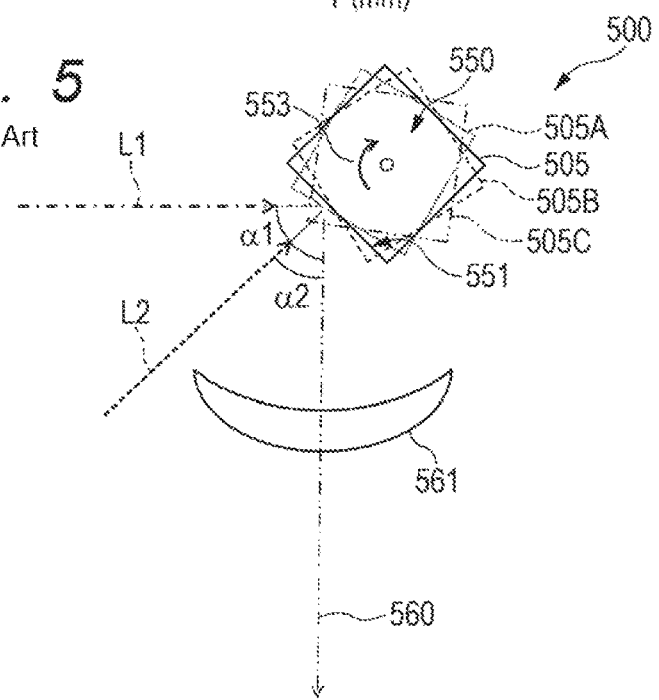
FIG. 5 is a partially-enlarged main scanning cross-section view of a conventional optical scanning apparatus.

FIG. 5 illustrates a partially-enlarged main scanning cross-section view of an optical scanning apparatus 500 disclosed in Japanese Patent Application Laid-Open No. 2005-92129.

As illustrated in FIG. 5, a light flux emitted from a shared light source (not illustrated) is split into light fluxes L1 and L2 by a not-illustrated light beam splitting unit. The light flux L1 goes straight to be incident on a deflecting surface 551 of a polygon mirror 505 while the light flux L2 is reflected on a not-illustrated folding mirror to be incident on the deflecting surface 551.

Herein, angles α1 and α2, which are angles between an axis X and the respective directions of incidence of the light fluxes L1 and L2 on the deflecting surface 551, are 90 and 45 degrees in the main scanning cross section, respectively. The axis X corresponds to an optical axis 560 of an imaging lens 561.

The polygon mirror 505 rotates in the direction of arrow 553 around a rotational axis 550. Accordingly, the polygon mirror 505 is sequentially positioned as indicated by 505A, 505, 505B, and 505C in FIG. 5, for example.

Herein, the polygon mirror 505 is positioned at the position indicated by 505 when the light flux L1 scans an on-axis image height in the corresponding scanned surface for printing. The polygon mirror 505 is positioned at the position indicated by 505A when the light flux L1 scans a most off-axis image height on the scanning start side in the corresponding scanned surface for printing. The polygon mirror 505 is positioned at the position indicated by 505B when the light flux L1 scans a most off-axis image height on the scanning end side in the corresponding scanned surface for printing.

The polygon mirror 505 is positioned at the position indicated by 505C when the light flux L2 scans a certain image height in the corresponding scanned surface for printing.

As seen from FIG. 5, the angle of the polygon mirror 505 when the light flux L1 scans a certain image height in the corresponding scanned surface for printing is different from that when the light flux L2 scans the same image height in the corresponding scanned surface for printing.

The positions of the points of reflection in the deflecting surface 551 at which the light fluxes L1 and L2 are incident to be reflected/deflected are different from each other when the light fluxes L1 and L2 scan the same image height in the respective scanned surfaces for printing. Accordingly, displacements of the points of reflection of respective light fluxes L1 and L2 in the direction of the optical axis 560 on the deflecting surface 551 are different from each other.

When the light fluxes L1 and L2 scan the same image height in the respective scanned surfaces for printing, therefore, the optical paths from the points of reflection in the deflecting surface 551 to the respective scanned surfaces have different lengths.

This results in differences between the focus positions at each image height in the respective scanned surfaces scanned by the light fluxes L1 and L2, thereby producing a difference between field curvatures on the scanned surfaces scanned by the light fluxes L1 and L2.

First Embodiment

Figure 1A:
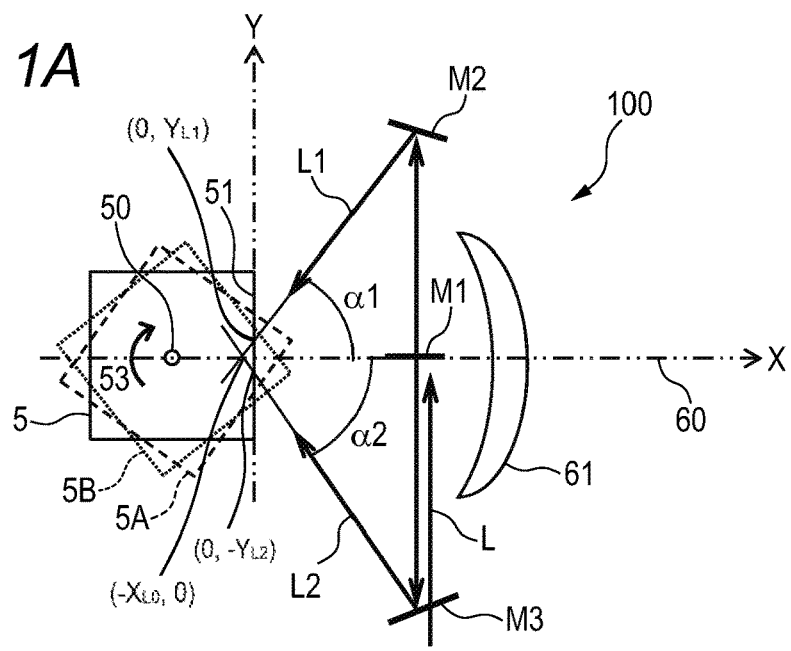
FIG. 1A is a partially-enlarged main scanning cross-section view of an optical scanning apparatus according to a first embodiment.
Figure 1B:
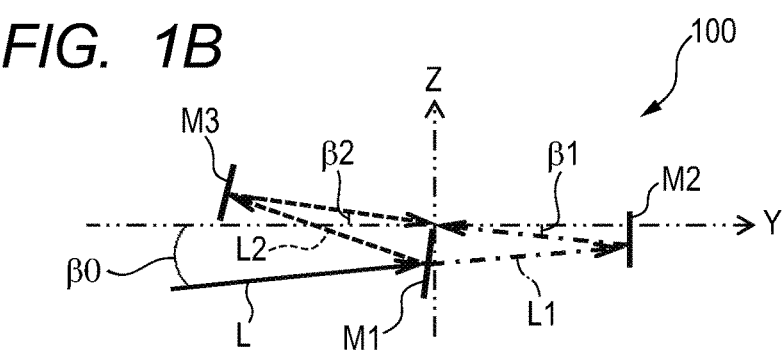
FIG. 1B is a view illustrating paths of light fluxes in the optical scanning apparatus according to the first embodiment.
Figure 1C:
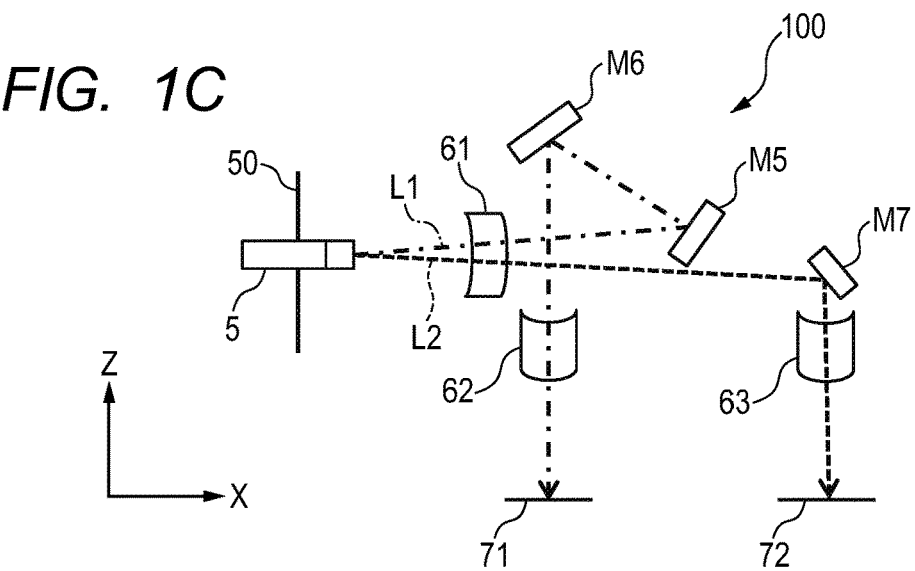
FIG. 1C is a partially-enlarged sub-scanning cross-section view of the optical scanning apparatus according to the first embodiment.

FIGS. 1A and 1B are a partially-enlarged main scanning cross-section view and a partially-enlarged Y-Z cross-section view of an optical scanning apparatus 100 according to a first embodiment, respectively. FIG. 1C is a partially-enlarged sub-scanning cross-section view of the optical scanning apparatus 100 according to the first embodiment.

In the first embodiment, an optical axis (a first axis) 60 of a first imaging lens 61 is referred to as an axis X. The origin is set to the intersection of the optical axis 60 and a deflecting surface 51 of a polygon mirror 5 when the optical axis 60 and the deflecting surface 51 intersect at right angles. An axis perpendicular to the optical axis 60 in the main scanning cross section, that is, the main scanning direction is referred to as an axis Y, and the direction perpendicular to the optical, axis 60 within the sub-scanning cross section, that is, the sub-scanning direction is referred to as an axis Z.

As illustrated in FIGS. 1A and 1B, a light flux L emitted from a not-illustrated light source is split into a transmitted light flux (a first light flux) L1 and a reflected light flux (a second light flux) L2 by a half mirror M1 as the splitting element.

The light flux L1 transmitted through the half mirror M1 is reflected by a folding mirror M2 and is incident on the deflecting surface (a first deflecting surface) 51 of a polygon mirror (a deflecting unit) 5. On the other hand, the light flux L2 reflected by the half mirror M1 is reflected by a folding mirror M3 and is incident on the deflecting surface 51 of the polygon mirror 5.

As illustrated in FIG. 1C, the light flux L1 incident on the deflecting surface 51 of the polygon mirror 5 is deflected by the deflecting surface 51 of the polygon mirror 5 and is then incident on the first imaging lens (a first imaging lens) 61. The light flux L1 having passed through the first imaging lens 61 is focused on a scanned surface (a first scanned surface) 71 by folding mirrors M5 and M6 and a second imaging lens (a second imaging lens) 62. The light flux L2 incident on the deflecting surface 51 of the polygon mirror 5 is deflected by the deflecting surface 51 of the polygon mirror 5 and is then focused on a scanned surface (a second scanned surface) 72 by the first imaging lens 61, a folding mirror M7, and a second imaging lens (a third imaging lens) 63.

In such a manner, spot images are formed near the scanned surfaces 71 and 72 both in the main scanning cross section and sub-scanning cross section. When the polygon mirror 5 is rotated at a constant speed around a rotation axis 50 in the direction of arrow 53, the scanned surfaces 71 and 72 can be scanned at constant speed. The polygon mirror 5 can scan the scanned surfaces 71 and 72 at different timing from each other.

The polygon mirror 5 rotates around the rotation axis 50 in the direction of the arrow 53, sequentially taking the positions indicated by 5A, 5B, and 5 as illustrated in FIG. 1A, for example.

Note that, in the optical scanning apparatus 100 according to the first embodiment, the rotation axis 50 of the polygon mirror 5 is located on the optical axis 60 as illustrated in FIG. 1A.

The angle (acute angle) between the axis X and the direction of incidence of the light flux L1 on the polygon mirror 5 within the main scanning cross section (the angle of incidence on a cross section (the Y-Z plane) perpendicular to the axis X in the main scanning cross section) is indicated by α1. Hereinafter, α1 is sometimes referred to as a main scanning incidence angle of the light flux L1. The angle (acute angle) between the axis X and the direction of incidence of the light flux L2 on the polygon mirror 5 within the main scanning cross section is indicated by α2. Hereinafter, α2 is sometimes referred to as a main scanning incidence angle of the light flux L2. The angles from the axis X, in the counterclockwise and clockwise directions, within the main scanning cross section (X-Y plane) when seen from the positive side to negative side in the axis Z have positive and negative values, respectively.

The angle (acute angle) within the cross section perpendicular to the axis X (the Y-Z plane, the first cross section) between the axis Y and a projection onto the Y-Z plane, of the direction of incidence of the light flux L1 on the polygon mirror 5 is indicated by β1. Hereinafter, β1 is sometimes referred to as a sub-scanning oblique incidence angle of the light flux L1. The angle (acute angle) within the cross section perpendicular to the axis X (the Y-Z plane) between the axis Y and a projection onto the Y-Z plane, of the direction of incidence of the light flux L2 on the polygon mirror 5 is indicated by β2. Hereinafter, β2 is sometimes referred to as a sub-scanning oblique incidence angle of the light flux L2. It is defined that the sub-scanning oblique incidence angle has positive and negative values when the z component of a projection onto the Y-Z plane, of the direction of incidence of a light flux on the polygon mirror 5 is positive and negative, respectively. In other words, the angle of a light flux incident on the deflecting unit from a predetermined side of the main scanning cross section is positive while the angle of a light flux incident on the deflecting unit from the other side of the main scanning cross section is negative.

The light fluxes L1 and L2 thereby can scan the different scanned surfaces 71 and 72 alternately at different timing from each other.

Herein, in the optical scanning apparatus 100 according to the first embodiment, the light fluxes L1 and L2 are incident on the deflecting surface 51 of the polygon mirror 5 so as to satisfy: α1=−α2; and β1=−β2. In other words, the light fluxes L1 and L2 are incident on the deflecting surface 51 of the polygon mirror 5 in two-fold rotational symmetry with respect to the optical axis 60.

Thereby, the image-height dependence of changes in displacement of the deflecting surface 51 of the rotating polygon mirror 5 on the optical axis related to the light flux L1 is symmetric to that related to the light flux L2 with respect to the on-axis image height.

This configuration is concretely described below.

As described above, the displacement of the deflecting surface 51 on the optical axis when the light flux L1 is incident on the most off-axis image height on the scanning start side in the scanned surface 71 is different from the displacement of the deflecting surface 51 on the optical axis when the light flux L1 is incident on the most off-axis image height on the scanning end side in the scanned surface 71.

Accordingly, if the imaging optical system is optically symmetric across the on-axis image height in the main scanning direction with respect to the optical axis 60, field curvature (image-height dependence of the focus position) at each image height on the scanning start side in the scanned surface 71 is asymmetric to field curvature of each image height on the scanning end side.

In a similar manner, the displacement of the deflecting surface 51 on the optical axis when the light flux L2 is incident on the most off-axis image height on the scanning start side in the scanned surface 72 is different from the displacement of the deflecting surface 51 on the optical axis when the light flux L2 is incident on the most off-axis image height on the scanning end side in the scanned surface 72.

When the imaging optical system is optically symmetric across the on-axis image height in the main scanning direction with respect to the optical axis 60, field curvature at each image height on the scanning start side in the scanned surface 72 is asymmetric to field curvature at each image height on the scanning end side.

However, in the optical scanning apparatus 100 according to the embodiment, the light fluxes L1 and L2 are incident on the deflecting surface 51 of the polygon mirror 5 in two-fold rotational symmetry with respect to the optical axis 60.

Accordingly, the displacement of the deflecting surface 51 on the optical axis when the light flux L1 is incident on an image height Y0 on the scanning start side is equal to the displacement of the deflecting surface 51 on the optical axis when the light flux L2 is incident on at an image height −Y0 on the scanning end side.

In a similar manner, the displacement of the deflecting surface 51 on the optical axis when the light flux L1 is incident on an image height −Y0 on the scanning end side is equal to the displacement of the deflecting surface 51 on the optical axis when the light flux L2 is incident on an image height Y0 on the scanning start side.

Accordingly, field curvature on the scanned surface 71 related to the light flux L1 is a reversal of field curvature on the scanned surface 72 related to the light flux L2 with respect to the optical axis 60 across the on-axis image height.

In the optical scanning apparatus 100 according to the first embodiment, therefore, the difference between the field curvature on the scanned surface 71 and the field curvature on the scanned surface 72 can be easily reduced by considering the configuration of the imaging optical system.

In the optical scanning apparatus 100 according to the first embodiment, in the light of the aforementioned reversal symmetry of the field curvatures, the difference between the field curvatures on the scanned surfaces 71 and 72 is reduced by employing the first imaging lens 61 symmetric in the main scanning direction with respect to the optical axis 60.

In the optical scanning apparatus 100 according to the first embodiment, the second imaging lenses 62 and 63 have shapes asymmetric at least in the main scanning direction with respect to the optical axis 60. This reduces the aforementioned asymmetry of the field curvatures on the scanned surfaces 71 and 72 due to changes in displacement of the deflecting surface 51.

Moreover, as described above, the asymmetry of the field curvature on the scanned surface 71 is a reversal of the asymmetry of the field curvature on the scanned surface 72 with respect to the optical axis 60. The second imaging lenses 62 and 63 therefore may have asymmetric shapes at least in the main scanning direction with respect to the optical axis 60. Moreover, the second imaging lenses 62 and 63 are arranged so that one of the imaging lenses 62 and 63 corresponds to the other lens when being reversed with respect to the optical axis 60.

In other words, the second imaging lenses 62 and 63 are arranged in two-fold rotational symmetry with respect to the optical axis 60.

In the optical scanning apparatus 100 according to the first embodiment, the sub-scanning oblique incidence angles $\beta 1$ and $\beta 2$ satisfy the relationship of $\beta 1 = -\beta 2$. Accordingly, a spot formed by the imaging optical system is rotated due to the wavefront aberration in a direction of 45 degrees. Known techniques to reduce the wavefront aberration in the direction of 45 degrees include shifting the lens surface in the axis-Z direction or providing a special plane (a sagittal line tilt surface) in which the tilt amount in the cross section in the sub-scanning direction varies at each image height.

In the optical scanning apparatus 100 according to the first embodiment, the light fluxes L1 and L2 are incident on the deflecting surface 51 of the polygon mirror 5 in two-fold rotational symmetry with respect to the optical axis 60. Accordingly, the image-height dependence of the wavefront aberration in the direction of 45 degrees related to the light flux L1 has a reversed relationship with the image-height dependence of the wavefront aberration in the direction of 45 degrees related to the light flux L2 across the on-axis image height with respect to the optical axis 60.

To reduce the wavefront aberration in the direction of 45 degrees, it is therefore necessary to shift the lens surfaces opposite to each other in the Z-axis direction with respect to the optical axis 60 by the same amount. Specifically, it is necessary to shift the lens surface of one of the second imaging lenses 62 and 63 by $+Z_0$ while shifting the lens surface of the other lens by $-Z_0$. Alternatively, to provide the aforementioned special plane (the sagittal line tilt plane), the special planes of the second imaging lenses 62 and 63 may have profiles reversed with respect to the optical axis 60.

As illustrated in FIG. 1A, in the X-Y plane (in the main scanning cross section), the paths of incidence of the light fluxes L1 and L2 on the polygon mirror 5 respectively cross the axis Y at the coordinates of $(0, Y_{L1})$ and $(0, -Y_{L2})$ and intersect at the coordinates of $(-X_{L0}, 0)$ on the axis X (the optical axis 60). Herein, $X_{L0}$, $Y_{L1}$, and $Y_{L2}$ are positive values.

The relationship of $Y_{L2} = -X_{L0} \times \tan(\alpha 1)$ is satisfied using the main scanning incidence angle $\alpha 1$ of the light flux L1.

When the deflecting surface 51 of the polygon mirror 5 is perpendicular to the optical axis 60, the light fluxes L1 and L2 are incident on the polygon mirror 5, at a substantially identical, height in the sub-scanning direction.

As illustrated in FIG. 1A, in the optical scanning apparatus 100 according to the first embodiment, the X coordinate of the intersection $(-X_{L0}, 0)$ is negative. In other words, the paths of incidence of the light fluxes L and L2 on the polygon mirror 5 intersect with each other on the optical axis 60, at a position on a side closer to the rotational axis 50 of the polygon mirror 5 from the intersection (the origin) of the optical axis 60 and the deflecting surface 51 of the polygon mirror 5, where the deflecting surface 51 is set perpendicular to the optical axis 60.

If the light fluxes L1 and L2 are incident on the deflecting surface 51 so as to intersect at a position in front of the deflecting surface 51 on the axis X, the light fluxes L1 and L2 deflected for scanning by nearly whole length of the deflecting surface 51 of the polygon mirror 5. This causes a shortage of the effective area of the deflecting surface 51 at scanning a wide field angle.

On the other hand, when the light fluxes L1 and L2 are incident on the deflecting surface 51 so as to intersect at a position behind the deflecting surface 51 on the axis X like the optical scanning apparatus 100 according to the first embodiment, the light fluxes L1 and L2 are deflected for scanning by the central portion of the deflecting surface 51. This allows scanning of a wide angle of field without increasing the width of the deflecting surface 51 of the polygon mirror 5 in the main scanning direction.

The optical scanning apparatus 100 according to the first embodiment, each of the light fluxes L1 and L2 is obliquely incident on the deflecting surface 51 of the polygon mirror 5 at a certain angle with respect to the axis Y within a cross section perpendicular to the axis X. Accordingly, the light fluxes L1 and L2 which have been deflected by the deflecting surface 51 are separated from each other in the sub-scanning direction, so that only the light flux L1 can be reflected by the folding mirror M5 as the reflecting element.

In the optical scanning apparatus 100 according to the first embodiment, the polygon mirror 5 includes four surfaces. However, the first embodiment is not limited to this. The deflecting unit may be a polygon mirror including five or six surfaces, for example.

Moreover, the optical scanning apparatus 100 according to the first embodiment includes two imaging lenses for each light flux, and the first imaging lens 61 has a symmetric profile with respect to the optical, axis 60 in the main scanning direction. In the optical scanning apparatus 100 according to the first embodiment, each of the second imaging lenses 62 and 63 has an asymmetric profile with respect to the optical axis 60 at least in the main scanning direction. However, the first embodiment is not limited to such a configuration. The imaging optical system may be consists of three or more imaging lenses for each light flux. In this case, an imaging device which transmits each light flux and is located closest to the deflecting unit in the imaging optical system may be configured to have a symmetric profile in the main scanning direction with respect to the optical axis while the imaging device located closest to the scanned surface is configured to have an asymmetric profile with respect to the optical axis at least in the main scanning direction.

As described above, in the optical scanning apparatus 100 according to the first embodiment, two light fluxes obtained by splitting a light flux with the splitting element are incident on a deflecting surface of the polygon mirror in two-fold rotational symmetry with respect to the optical axis of the imaging lens on which both of the two light fluxes are incident. By considering the configuration of the imaging optical system, the difference between field curvatures on one of the scanned surfaces and the other scanned surface can be easily reduced.

The imaging lens focusing one of the light fluxes on one of the scanned surfaces and the imaging lens focusing the other light flux on the other scanned surface may have an identical profile and be arranged so that when one of the imaging lenses is rotated by 180 degrees around the optical axis of the imaging lens on which the two light fluxes are both incident, the rotated imaging lens coincides with the other lens. The two imaging lenses can be therefore manufactured with the same mold, thus resulting in lower cost and fewer processes.

Figure 2A:
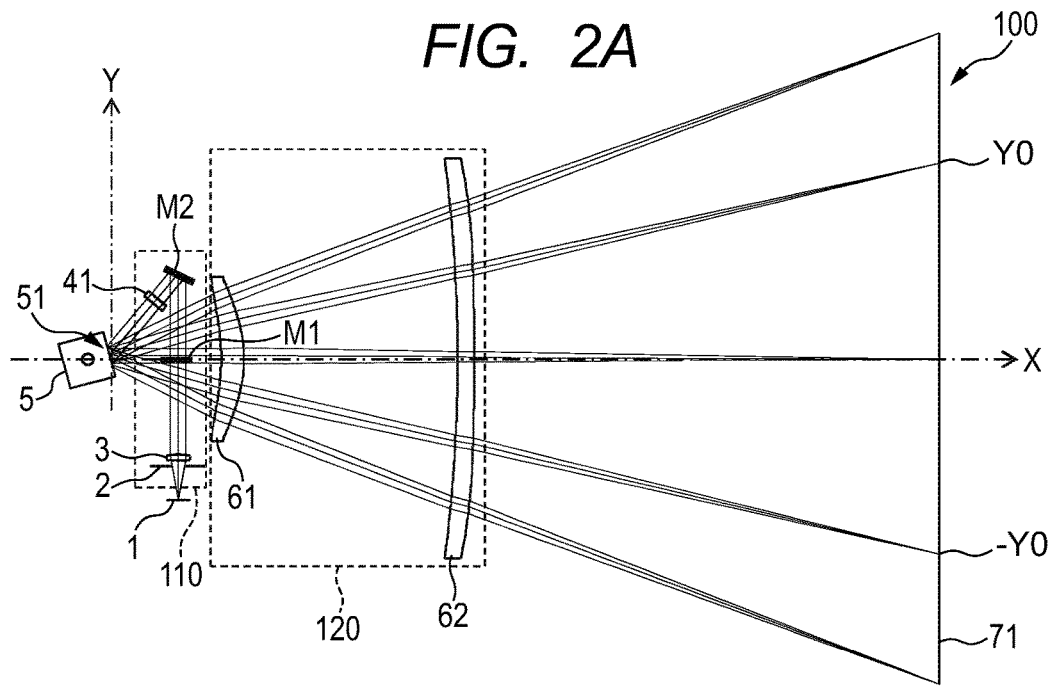
FIG. 2A is a main scanning cross-section view of the optical scanning apparatus according to the first embodiment.
Figure 2B:
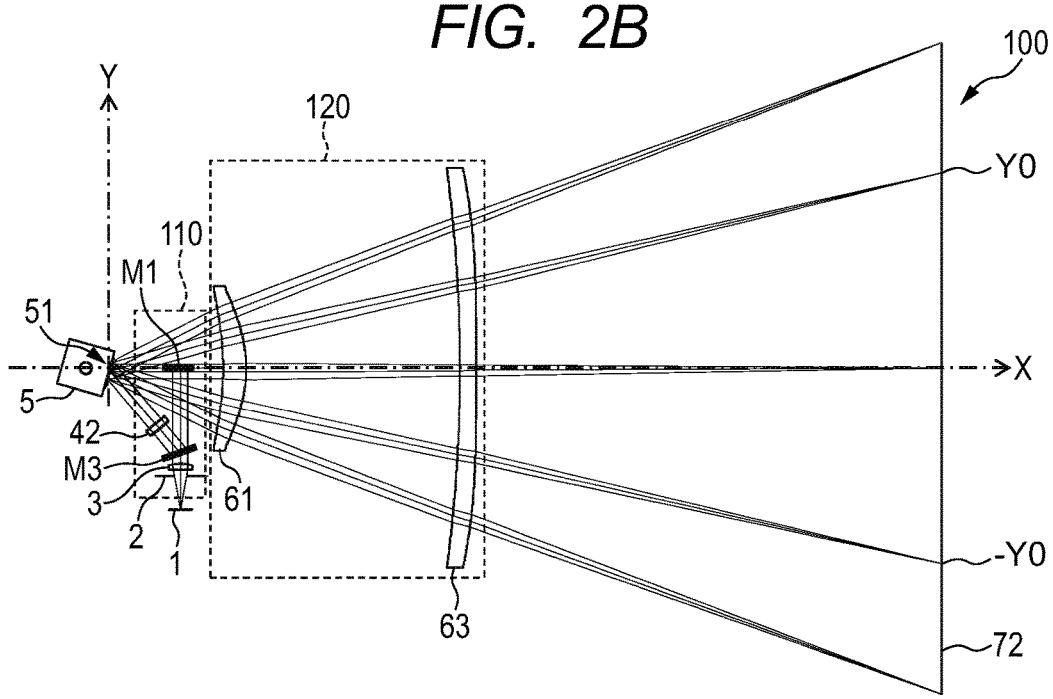
FIG. 2B is a main scanning cross-section view of the optical scanning apparatus according to the first embodiment.

FIGS. 2A and 2B are main scanning cross-section views of the optical scanning apparatus 100 according to the first embodiment.

FIG. 2A illustrates only the path of the light flux L1 transmitted through the half mirror M1, not illustrating the folding mirror M3 and a cylinder lens 42. On the other hand, FIG. 2B illustrates only the path of the light flux L2 reflected on the half mirror M1, not illustrating the folding mirror M2 and a cylinder lens 41.

The optical scanning apparatus 100 includes a light source 1, a stop 2, a condensing lens 3, the cylinder lenses 41 and 42, the half mirror M1 as the splitting element, and the folding mirrors M2 and M3. The optical scanning apparatus 100 further includes the polygon mirror 5 as the deflecting unit, the first imaging lens 61, the second imaging lenses 62 and 63, and the folding mirrors M5, M6, and M7 (see FIG. 1C).

The light source 1 is a semiconductor laser including a light emitting point or the like. The light source 1 may include a plurality of light emitting points. The light source 1 is provided with a not-illustrated cover glass.

The stop 2 has a rectangular opening and limits the diameters of the light flux L emitted from the light source 1 in the main scanning direction and the sub-scanning direction. The rectangular opening of the stop 2 according to the first embodiment has a size of 5.60 mm in the main scanning direction×0.76 mm in the sub-scanning direction. Instead of the stop 2, a main scanning stop limiting the diameter of the light flux in the main scanning direction and a sub-scanning stop limiting the diameter of the light flux in the sub-scanning direction may be separately provided.

The condensing lens 3 converts the light flux L having passed through the stop 2 into a light flux substantially collimated both in the main scanning direction and sub-scanning direction. The substantially collimated light flux includes a weakly divergent light flux, a weakly convergent light flux, and a collimated light flux herein.

The half mirror M1 splits the light flux L having passed through the condensing lens 3 into the transmitted light flux L1 and reflected light flux L2.

The folding mirrors M2 and M3 reflect the transmitted light flux L1 and reflected light flux L2 which are separated by the half mirror M1, respectively.

The cylinder lenses 41 and 42 have a predetermined refractive power only in the sub-scanning direction and condense the transmitted light flux L1 and reflected light flux L2, which are respectively reflected by the folding mirrors M2 and M3, in the sub-scanning direction.

In such a manner, the light fluxes L1 and L2 which are obtained by splitting a light flux emitted from the light source 1 are condensed only in the sub-scanning direction near the deflecting surface 51 of the polygon mirror 5 and are focused as line images long in the main scanning direction.

The stop 2, condensing lens 3, cylinder lenses 41 and 42, half mirror M1, and folding mirrors M2 and M3 constitute an incidence optical system 110 of the optical scanning apparatus 100 according to the first embodiment.

The polygon mirror 5 is rotated by a not-illustrated driving unit such as a motor to deflect/reflect the light fluxes L1 and L2 toward the scanned surfaces 71 and 72, respectively.

The first imaging lens 61 is configured to focus the light fluxes L1 and L2 deflected by the polygon mirror 5, onto the scanned surfaces 71 and 72, respectively.

The folding mirrors M5 and M6 reflect the light flux L1 having passed through the first imaging lens 61.

The second imaging lens 62 focuses the light flux L1 having been reflected by the folding mirrors M5 and M6, on the scanned surface 71.

The folding mirror M7 reflects the light flux L2 having passed through the first imaging lens 61.

The second imaging lens 63 focuses the light flux L2 reflected by the folding mirror M7, on the scanned surface 72.

The first imaging lens 61 and second imaging lenses 62 and 63 constitute an imaging optical system 120 of the optical scanning apparatus 100 according to the first embodiment.

The folding mirrors M5, M6, and M7 constitute a reflection optical system of the optical scanning apparatus 100 according to the first embodiment.

The light flux L emitted from the light source 1 is limited in diameters in the main scanning direction and sub-scanning direction by the stop 2, converted to a light flux substantially collimated both in the main scanning and sub-scanning directions by the condensing lens 3, and then split into the transmitted light flux L1 and reflected light flux L2 by the half mirror M1.

The transmitted light flux L1 and reflected light flux L2 are reflected by the folding mirrors M2 and M3, respectively, condensed in the sub-scanning direction by the cylinder lenses 41, and 42, respectively, and then incident on the deflecting surface 51 of the polygon mirror 5.

The light fluxes L1 and L2 incident on the deflecting surface 51 of the polygon mirror 5 are deflected on the deflecting surface 51 of the polygon mirror 5 and then focused on the scanned surfaces 71 and 72 by the first imaging lens 61, second imaging lenses 62 and 63, and folding mirrors M5, M6, and M7, respectively.

Spot images are thus formed near the scanned surfaces 71 and 72 both within the main scanning and sub-scanning cross sections. The scanned surfaces 71 and 72 can be scanned at constant speed by rotating the polygon mirror 5 at constant speed.

The first imaging lens 61 and second imaging lenses 62 and 63 of the optical scanning apparatus 100 according to the first embodiment are made of resin. Lenses made of resin are manufactured by a known molding technique in which resin is put into a mold, cooled, and then taken out of the mold. The resin lenses are therefore manufactured at lower cost than conventional imaging lenses such as glass lenses.

As illustrated in FIG. 1B, the optical scanning apparatus 100 according to the first embodiment employs a so-called sub-scanning oblique incidence optical system in which the light fluxes L1 and L2 are incident on a deflecting surface 51 of the polygon mirror 5 from below and above in the sub-scanning direction, at the angles β1 and β2 within the Y-Z plane. Hereinafter, the angles β1 and β2 are sometimes referred to as sub-scanning oblique incidence angles.

As illustrated in FIG. 1C, the paths of the light fluxes L1 and L2 having passed through the first imaging lens 61 can be separated by the folding mirror M5.

Next, characteristics of the optical scanning apparatus 100 according to the first embodiment are shown in Tables 1 to 5 below.

TABLE 1

| | |
|---|---|
| Diameter of polygon mirror 5 (mm) | 20 |
| Number of surfaces of polygon mirror 5 | 4 |
| Angle α1 between light flux L1 and optical axis 60 (deg.) | 50 |
| Angle α2 between light flux L2 and optical axis 60 (deg.) | −50 |
| Most off-axis image height Y+ (mm) | 150 |
| Most off-axis image height Y− (mm) | −150 |
| Fθ coefficient | 318.31 |
| D | 30% |
| Sub-scanning oblique scanning angle β1 of light flux L1 (deg.) | 1.8 |
| Sub-scanning oblique scanning angle β2 of light flux L2 (deg.) | −1.8 |
| NA1 | 1.65 |
| NA2 | 1.65 |

TABLE 2

| | Surface number | R | X | Y | Z | gx(x) | gx(y) | gx(z) |
|---|---|---|---|---|---|---|---|---|
| Light source 1 | 1 | 0.000 | 32.036 | −65.242 | −10.357 | 0.000 | 0.996 | 0.084 |
| Cover glass | 2 | 0.000 | 32.036 | −64.993 | −10.336 | 0.000 | 0.996 | 0.084 |
| Stop 2 | 3 | 0.000 | 32.036 | −49.498 | −9.035 | 0.000 | 0.996 | 0.084 |
| Incident surface of condensing lens 3 | 4 | 0.000 | 32.036 | −46.977 | −8.823 | 0.000 | 0.996 | 0.084 |
| Exit surface of condensing lens 3 | 5 | aspherical | 32.036 | −43.987 | −8.572 | 0.000 | 0.996 | 0.084 |
| Half mirror M1 | 6 | 0.000 | 32.036 | 0.000 | −4.878 | 0.000 | −0.999 | 0.039 |
| Folding mirror M2 | 7 | 0.000 | 32.036 | 39.389 | −1.571 | 0.342 | 0.939 | 0.028 |
| Incident surface of cylinder lens 41 | 8 | aspherical | 22.399 | 27.904 | −1.099 | 0.642 | 0.766 | −0.031 |
| Exit surface of cylinder lens 41 | 9 | 0.000 | 20.472 | 25.607 | −1.005 | 0.642 | 0.766 | −0.031 |
| Deflecting surface of polygon mirror 5 | 10 | 0.000 | −0.663 | 2.988 | 0.000 | 0.906 | 0.423 | 0.000 |
| Incident surface of first imaging lens 61 | 11 | asplerical | 52.000 | 0.000 | 0.000 | 1.000 | 0.000 | 0.000 |
| Exit surface of first imaging lens 61 | 12 | aspherical | 62.500 | 0.000 | 0.000 | 1.000 | 0.000 | 0.000 |
| Incident surface of second imaging lens 62 | 13 | aspherical | 160.500 | 0.000 | 2.653 | 1.000 | 0.000 | 0.000 |
| Exit surface of second imaging lens 62 | 14 | aspherical | 168.000 | 0.000 | 2.653 | 1.000 | 0.000 | 0.000 |
| Scanned surface 71 | 15 | 0.000 | 382.000 | 0.000 | 2.653 | 1.000 | 0.000 | 0.000 |

TABLE 3

Exit surface of condensing lens 3 (surface number 5)

| Ryu | Kyu | b2u | b4u | b6u | b8u | b10u |
|---|---|---|---|---|---|---|
| −1.52E+01 | 0.00E+00 | 0.00E+00 | 2.49E−05 | 0.00E+00 | 0.00E+00 | 0.00E+00 |
| Ryl | Kyl | b2l | b4l | b6l | b8l | b10l |
| −1.52E+01 | 0.00E+00 | 0.00E+00 | 2.49E−05 | 0.00E+00 | 0.00E+00 | 0.00E+00 |
| r | | d2u | d4u | d6u | d8u | d10u |
| −1.52E+01 | | 0.00E+00 | 2.49E−05 | 0.00E+00 | 0.00E+00 | 0.00E+00 |
| | | d2l | d4l | d6l | d8l | d10l |
| | | 0.00E+00 | 2.49E−05 | 0.00E+00 | 0.00E+00 | 0.00E+00 |

Incident surface of cylinder lens 41 (surface number 8)

| Ryu | Kyu | b2u | b4u | b6u | b8u | b10u |
|---|---|---|---|---|---|---|
| 0.00E+00 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| 0.00E+00 | 0.00E+00 | 0.00E+00 | 0.00E+00 | 0.00E+00 | 0.00E+00 | 0.00E+00 |
| r | | d2u | d4u | d6u | d8u | d10u |
| 1.77E+01 | | 0.00E+00 | 0.00E+00 | 0.00E+00 | 0.00E+00 | 0.00E+00 |
| | | d2l | d4l | d6l | d8l | d10l |
| | | 0.00E+00 | 0.00E+00 | 0.00E+00 | 0.00E+00 | 0.00E+00 |

Incident surface of first imaging lens 61 (surface number 11)

| Ryu | Kyu | b2u | b4u | b6u | b8u | b10u |
|---|---|---|---|---|---|---|
| −1.02E+02 | 9.46E−01 | 0.00E+00 | 1.28E−06 | 6.83E−11 | 0.00E+00 | 0.00E+00 |
| Ryl | Kyl | b2l | b4l | b6l | b8l | b10l |
| −1.02E+02 | 9.46E−01 | 0.00E+00 | 1.28E−06 | 6.83E−11 | 0.00E+00 | 0.00E+00 |

TABLE 3-continued

| r | d2u | d4u | d6u | d8u | d10u |
|---|---|---|---|---|---|
| −1.17E+03 | 0.00E+00 | 0.00E+00 | 0.00E+00 | 0.00E+00 | 0.00E+00 |
| | d2l | d4l | d6l | d8l | d10l |
| | 0.00E+00 | 0.00E+00 | 0.00E+00 | 0.00E+00 | 0.00E+00 |

Exit surface of first imaging lens 61 (surface number 12)

| Ryu | Kyu | b2u | b4u | b6u | b8u | b10u |
|---|---|---|---|---|---|---|
| −6.27E+01 | 7.31E+05 | 0.00E+00 | 1.65E−07 | 2.34E−10 | 0.00E+00 | 0.00E+00 |
| Ryl | Kyl | b2l | b4l | b6l | b8l | b10l |
| −6.27E+01 | 7.31E+05 | 0.00E+00 | 1.65E−07 | 2.34E−10 | 0.00E+00 | 0.00E+00 |
| r | | d2u | d4u | d6u | d8u | d10u |
| −1.17E+03 | | 0.00E+00 | 0.00E+00 | 0.00E+00 | 0.00E+00 | 0.00E+00 |
| | | d2l | d4l | d6l | d8l | d10l |
| | | 0.00E+00 | 0.00E+00 | 0.00E+00 | 0.00E+00 | 0.00E+00 |

Incident surface of second imaging lens 62 (surface number 13)

| Ryu | Kyu | b2u | b4u | b6u | b8u | b10u |
|---|---|---|---|---|---|---|
| −7.08E+02 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| −7.08E+02 | 0.00E+00 | 0.00E+00 | 0.00E+00 | 0.00E+00 | 0.00E+00 | 0.00E+00 |
| r | | d2u | d4u | d6u | d8u | d10u |
| 1.66E+02 | | 2.42E−04 | 6.84E−08 | −2.43E−11 | 6.53E−15 | 0.00E+00 |
| | | d2l | d4l | d6l | d8l | d10l |
| | | −9.56E−05 | 8.62E−08 | −1.40E−11 | 7.17E−16 | 0.00E+00 |

Exit surface of second imaging lens 62 (surface number 14)

| Ryu | Kyu | b2u | b4u | b6u | b8u | b10u |
|---|---|---|---|---|---|---|
| −6.27E+01 | −3.51E+04 | 0.00E+00 | −1.26E−07 | 8.51E−12 | −5.16E−16 | 1.85E−20 |
| Ryl | Kyl | b2l | b4l | b6l | b8l | b10l |
| −6.27E+01 | −2.54E+03 | 0.00E+00 | −1.19E−07 | 8.07E−12 | −5.61E−16 | 2.49E−20 |
| r | | d2u | d4u | d6u | d8u | d10u |
| −6.71E+01 | | −6.78E−05 | 1.91E−08 | −3.81E−12 | 2.94E−16 | 0.00E+00 |
| | | d2l | d4l | d6l | d8l | d10l |
| | | 8.71E−05 | −4.38E−08 | 8.23E−12 | −5.33E−16 | 0.00E+00 |

TABLE 4

| | Surface number | R | X | Y | Z | gx(x) | gx(y) | gx(z) |
|---|---|---|---|---|---|---|---|---|
| Light source 1 | 1 | 0.000 | 32.036 | −65.242 | −10.357 | 0.000 | −0.996 | −0.084 |
| Cover glass | 2 | 0.000 | 32.036 | −64.993 | −10.336 | 0.000 | −0.996 | −0.084 |
| Stop 2 | 3 | 0.000 | 32.036 | −49.498 | −9.035 | 0.000 | −0.996 | −0.084 |
| Incident surface of condensing lens 3 | 4 | 0.000 | 32.036 | −46.977 | −8.823 | 0.000 | −0.996 | −0.084 |
| Exit surface of condensing lens 3 | 5 | aspherical | 32.036 | −43.987 | −8.572 | 0.000 | −0.996 | −0.084 |
| Half mirror M1 | 6 | 0.000 | 32.036 | 0.000 | −4.878 | 0.000 | −0.999 | 0.039 |
| Folding mirror M3 | 7 | 0.000 | 32.036 | −39.389 | 1.571 | 0.342 | −0.934 | 0.103 |
| Incident surface of cylinder lens 42 | 8 | aspherical | 22.399 | −27.904 | 1.099 | 0.642 | −0.766 | 0.031 |
| Exit surface of cylinder lens 42 | 9 | 0.000 | 20.472 | −25.607 | 1.005 | 0.642 | −0.766 | 0.031 |
| Deflecting surface of polygon mirror 5 | 10 | 0.000 | −0.663 | −2.988 | 0.000 | 0.906 | −0.423 | 0.000 |
| Incident surface of first imaging lens 61 | 11 | aspherical | 52.000 | 0.000 | 0.000 | 1.000 | 0.000 | 0.000 |
| Exit surface of first imaging lens 61 | 12 | aspherical | 62.500 | 0.000 | 0.000 | 1.000 | 0.000 | 0.000 |
| Incident surface of second imaging lens 63 | 13 | aspherical | 160.500 | 0.000 | −2.653 | 1.000 | 0.000 | 0.000 |
| Exit surface of second imaging lens 63 | 14 | aspherical | 168.000 | 0.000 | −2.653 | 1.000 | 0.000 | 0.000 |
| Scanned surface 72 | 15 | 0.000 | 382.000 | 0.000 | −2.653 | 1.000 | 0.000 | 0.000 |

TABLE 5

Exit surface of condensing lens 3 (surface number 5)

| Ryu | Kyu | b2u | b4u | b6u | b8u | b10u |
|---|---|---|---|---|---|---|
| −1.52E+01 | 0.00E+00 | 0.00E+00 | 2.49E−05 | 0.00E+00 | 0.00E+00 | 0.00E+00 |
| Ryl | Kyl | b2l | b4l | b6l | b8l | b10l |
| −1.52E+01 | 0.00E+00 | 0.00E+00 | 2.49E−05 | 0.00E+00 | 0.00E+00 | 0.00E+00 |
| ru | | d2u | d4u | d6u | d8u | d10u |
| −1.52E+01 | | 0.00E+00 | 2.49E−05 | 0.00E+00 | 0.00E+00 | 0.00E+00 |
| rl | | d2l | d4l | d6l | d8l | d10l |
| −1.52E+01 | | 0.00E+00 | 2.49E−05 | 0.00E+00 | 0.00E+00 | 0.00E+00 |

TABLE 5-continued

| Incident surface of cylinder lens 42 (surface number 8) | | | | | | |
|---|---|---|---|---|---|---|
| Ryu | Kyu | b2u | b4u | b6u | b8u | b10u |
| 0.00E+00 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| 0.00E+00 | 0.00E+00 | 0.00E+00 | 0.00E+00 | 0.00E+00 | 0.00E+00 | 0.00E+00 |
| ru | | d2u | d4u | d6u | d8u | d10u |
| 1.77E+01 | | 0.00E+00 | 0.00E+00 | 0.00E+00 | 0.00E+00 | 0.00E+00 |
| rl | | d2l | d4l | d6l | d8l | d10l |
| 1.77E+01 | | 0.00E+00 | 0.00E+00 | 0.00E+00 | 0.00E+00 | 0.00E+00 |
| Incident surface of first imaging lens 61 (surface number 11) | | | | | | |
| Ryu | Kyu | b2u | b4u | b6u | b8u | b10u |
| −1.02E+02 | 9.46E−01 | 0.00E+00 | 1.28E−06 | 6.83E−11 | 0.00E+00 | 0.00E+00 |
| Ryl | Kyl | b2l | b4l | b6l | b8l | b10l |
| −1.02E+02 | 9.46E−01 | 0.00E+00 | 1.28E−06 | 6.83E−11 | 0.00E+00 | 0.00E+00 |
| ru | | d2u | d4u | d6u | d8u | d10u |
| −1.17E+03 | | 0.00E+00 | 0.00E+00 | 0.00E+00 | 0.00E+00 | 0.00E+00 |
| rl | | d2l | d4l | d6l | d8l | d10l |
| −1.17E+03 | | 0.00E+00 | 0.00E+00 | 0.00E+00 | 0.00E+00 | 0.00E+00 |
| Exit surface of first imaging lens 61 (surface number 12) | | | | | | |
| Ryu | Kyu | b2u | b4u | b6u | b8u | b10u |
| −6.27E+01 | 7.31E+05 | 0.00E+00 | 1.65E−07 | 2.34E−10 | 0.00E+00 | 0.00E+00 |
| Ryl | Kyl | b2l | b4l | b6l | b8l | b10l |
| −6.27E+01 | 7.31E+05 | 0.00E+00 | 1.65E−07 | 2.34E−10 | 0.00E+00 | 0.00E+00 |
| ru | | d2u | d4u | d6u | d8u | d10u |
| −1.17E+03 | | 0.00E+00 | 0.00E+00 | 0.00E+00 | 0.00E+00 | 0.00E+00 |
| rl | | d2l | d4l | d6l | d8l | d10l |
| −1.17E+03 | | 0.00E+00 | 0.00E+00 | 0.00E+00 | 0.00E+00 | 0.00E+00 |
| Incident surface of second imaging lens 63 (surface number 13) | | | | | | |
| Ryu | Kyu | b2u | b4u | b6u | b8u | b10u |
| −7.08E+02 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| −7.08E+02 | 0.00E+00 | 0.00E+00 | 0.00E+00 | 0.00E+00 | 0.00E+00 | 0.00E+00 |
| ru | | d2u | d4u | d6u | d8u | d10u |
| 1.66E+02 | | −9.56E−05 | 8.62E−08 | −1.40E−11 | 7.17E−16 | 0.00E+00 |
| rl | | d2l | d4l | d6l | d8l | d10l |
| 1.66E+02 | | 2.42E−04 | 6.84E−08 | −2.43E−11 | 6.53E−15 | 0.00E+00 |
| Exit surface of second imaging lens 63 (surface number 14) | | | | | | |
| Ryu | Kyu | b2u | b4u | b6u | b8u | b10u |
| −6.26E+03 | −2.54E+03 | 0.00E+00 | −1.19E−07 | 8.07E−12 | −5.61E−16 | 2.48E−20 |
| Ryl | Kyl | b2l | b4l | b6l | b8l | b10l |
| −6.26E+03 | −3.51E+04 | 0.00E+00 | −1.26E−07 | 8.51E−12 | −5.16E−16 | 1.85E−20 |
| ru | | d2u | d4u | d6u | d8u | d10u |
| −6.71E+01 | | 8.71E−05 | −4.38E−08 | 8.23E−12 | −5.33E−16 | 0.00E+00 |
| rl | | d2l | d4l | d6l | d8l | d10l |
| −6.71E+01 | | −6.78E−05 | 1.91E−08 | −3.81E−12 | 2.94E−16 | 0.00E+00 |

In Tables 3 and 5, "E-x" means "$\times 10^{-x}$".

In the followings, the axes X, Y, and Z are set to the optical axis of the first imaging lens 61, the axis orthogonal to the optical axis within the main scanning cross section, and an axis orthogonal to the optical axis in the sub-scanning cross section, respectively.

In Table 2, R indicates a curvature radius of each surface. X, Y, and Z indicate coordinates of the surface vertex of each surface, and gx(x), gx(y), and gx(z) indicate components of a normal vector at the surface vertex of each surface.

With a rotating polygon mirror having N surfaces, by a light flux reflected on each deflecting surface scanning can be performed by a scanning angle of 2×360/N degrees. The scanning angle is an angle between the axis X and a light flux deflected on a deflecting surface within the main scanning cross section. Herein, the scanning angle of 2×360/N degrees, that is, the range of scanning angle within the main scanning cross section that each deflecting surface can scan, is referred to as a full scanning angle.

On the other hand, the range of scanning angle for scanning the entire image height from the most off-axis image height on the scanning start side to the most off-axis image height on the scanning end side in the effective region of each scanned surface is referred to as an effective scanning angle (a print scanning angle), which corresponds to 2×ωmax. Herein, ωmax is the outermost angle.

Ratio D of the print scanning angle to the full scanning angle is represented by D=2×ωmax/(2×360/N).

As shown in Table 1, in the optical scanning apparatus 100 according to the first embodiment, the angles α1 and α2, which are angles between the axis X and the directions of incidence of the light fluxes L1 and L2 on a deflecting surface within the main scanning cross section, are 50 and −50 degrees, respectively.

As shown in Table 1, in the optical scanning apparatus 100 according to the first embodiment, the angles β1 and β2, which are angles between the axis Y and the directions of incidence of the light fluxes L1 and L2 on a deflecting surface within a cross section perpendicular to the optical axis 60, are 1.8 and −1.8 degrees, respectively.

In the optical scanning apparatus 100 according to the first embodiment, an angle β0, which is an angle between the axis Y and the direction of incidence of the light flux L emitted from the light source 1 on the half mirror M1 within the cross section perpendicular to the optical axis 60, is 4.8 degrees.

The half mirror M1 and folding mirrors M2 and M3 are properly arranged so that the aforementioned angles are implemented.

In the optical scanning apparatus 100 according to the first embodiment, the light fluxes L1 and L2 are obliquely incident on the deflecting surface 51 of the polygon mirror 5 at the angles β1 and β2 with respect to the axis Y within the cross section perpendicular to the axis X. Accordingly, the light fluxes L1 and L2 which have been deflected on the deflecting surface 51 separate from each other in the sub-scanning direction, so that only the light flux L can be reflected by the folding mirror M5 as the reflecting element.

The paths of the light fluxes L1 and L2 having been deflected on the deflecting surface 51 are separated from each other, and the light fluxes L1 and L2 are guided to the different scanned surfaces 71 and 72, respectively.

In the optical, scanning apparatus 100 according to the first embodiment, the paths of the light fluxes L1 and L2 incident on the polygon mirror 5 cross the axis Y at the coordinates of (0, 1.12) and (0, −1.12), respectively, and intersect at coordinate of (−0.94, 0) on the axis X (the optical axis 60) within the X-Y plane (the main scanning cross section).

Meridional line shapes of the incident and exit surfaces of each lens in the optical scanning apparatus 100 of the first embodiment are aspheric shapes which are expressed as a 10th or lower order function like the Expression 1. The meridional line shapes are shapes of lens surfaces within the main scanning cross section.

$$X = \frac{Y^2/Ry}{1+(1-(1+Ky)(Y/Ry)^2)^{1/2}} + b_4Y^4 + b_6Y^6 + b_8Y^8 + b_{10}Y^{10} \quad (1)$$

Herein, the origin is set to the intersection of each lens surface and the optical axis. Ry is the curvature radius of the meridional line; Ky is the eccentricity; and $b_i$ (i=4, 6, 8, and 10) are aspherical coefficients.

In terms of y, the side where the light source 1 of the optical scanning apparatus 100 is provided is referred to as a positive y side while the side where the light source 1 is not provided is referred to as a negative y side. When the coefficients Ry, Ky, and bi are different depending on the positive and negative y sides, the coefficients on the positive y side are followed by suffix u (Ryu, Kyu, and $b_{iu}$), and the coefficients on the negative y side are followed by suffix 1 (Ry1, Ky1, and $b_{i1}$) as shown in Tables 3 and 5. In this case, the meridional line shape is asymmetric in the main scanning direction.

Sagittal line shapes of the incident and exit surfaces of each lens in the optical scanning apparatus 100 of the first embodiment are aspheric shapes which are expressed as Expression 2 below. Each sagittal line shape is the shape of a lens surface within the sub-scanning cross section at each image height.

$$S = \frac{Z^2/r'}{1+(1-(Z/r')^2)^{1/2}} \quad (2)$$

Herein, S represents a sagittal line shape defined within a plane which includes the normal to the meridional line at each position on the meridional line and is perpendicular to the main scanning cross section.

A curvature radius of the sagittal line r' continuously changes along the y coordinates of the lens surface as expressed by Expression 3 below.

$$r'=r(l+d_2Y^2+d_4Y^4+d_6Y^6+d_8Y^8+d_{10}Y^{10}) \quad (3)$$

Herein, r is the curvature radius of the sagittal line on the optical axis, $d_j$ (j=2, 4, 6, 8, and 10) are coefficients of change in the curvature radius of the sagittal line. In the case where the coefficients $d_1$ are different depending on the positive and negative y sides, the coefficients on the positive y side are followed by suffixes u (that is, $d_{ju}$) while the coefficients on the negative y side are followed by suffixes 1 (that is, $d_{j1}$) as shown in Tables 3 and 5. In this case, the sagittal line shape is asymmetric in the main scanning direction.

In the first embodiment, the meridional and sagittal line shapes of each lens surface are defined by the functions expressed by Expressions 1 and 2, respectively. However, the first embodiment is not limited to such a configuration, and the meridional and sagittal line shapes may be defined by other functions.

As shown in Tables 2 to 5, the lens surface of the first imaging lens 61 having a power mainly in the main scanning cross section has an aspheric shape expressed by the above-described functions.

The first imaging lens 61 is a convex meniscus lens which has a large power within the main scanning cross section and has a non-circular surface profile within the main scanning cross section. The concave surface of the first imaging lens 61 faces the polygon mirror 5.

The profile of the first imaging lens 61 in the main scanning cross section is symmetric with respect to the optical axis.

The first imaging lens 61 has substantially no power since the incident and exit surfaces of the lens 61 have an identical curvature in the sub-scanning cross section. The first imaging lens 61 may have a cylindrical profile with both the incident and exit surfaces flat in the sub-scanning direction, for example.

The first imaging lens 61 plays a role of focusing the incident light flux mainly in the main scanning direction.

On the other hand, the second imaging lenses 62 and 63 are anomorphic lenses having a power mainly within the sub-scanning cross section as shown in Tables 2 to 5.

The lens surfaces of the second imaging lenses 62 and 63 have asymmetric shapes expressed by the aforementioned functions.

The second imaging lenses 62 and 63 have a larger power within the sub-scanning cross section than that within the main scanning cross section. The incident surface thereof within the main scanning cross section has a circular profile, and the other surface has a non-circular profile.

The profile of each of the second imaging lenses 62 and 63 in the main scanning cross section is asymmetric with respect to the optical axis 60. The second imaging lenses 62 and 63 have substantially no power in the main scanning direction near the optical axis 60.

On the other hand, the incident and exit surfaces of each of the second imaging lenses 62 and 63 have a convex profile within the sub-scanning cross section with the curvature gradually changing from the on-axis toward the off-axis and are asymmetric with respect to the optical axis.

The second imaging lenses 62 and 63 mainly play a role of focusing the incident light flux in the sub-scanning direction and correcting distortion in the main scanning direction.

The first imaging lens 61 and second imaging lenses 62 and 63 compensate facet angle error by forming a conjugate relation between the vicinity of the deflecting surface 51 of the polygon mirror 5 and the respective vicinities of the scanned surfaces 71 and 72 within the sub-scanning cross section.

As shown in Table 1, in the optical scanning apparatus 100 according to the first embodiment, the light fluxes L1 and L2 are incident on the deflecting surface 51 of the polygon mirror 5 so as to satisfy $\alpha 1 = -\alpha 2$ and $\beta 1 = -\beta 2$. In other words, the light fluxes L1 and L2 are incident on the deflecting surface 51 of the polygon mirror 5 in a two-fold rotational symmetry with respect to the optical axis 60.

As shown in Tables 3 and 5, in the optical scanning apparatus 100 according to the first embodiment, the shared first imaging lens 61, on which the light fluxes L1 and L2 reflected on the deflecting surface 51 of the polygon mirror 5 are both incident, have a symmetrical shape in the main scanning direction with respect to the optical axis 60.

As shown in Tables 3 and 5, in the optical scanning apparatus 100 according to the first embodiment, each of the second imaging lenses 62 and 63, on which the light fluxes L1 and L2 having passed through the first imaging lens 61 are incident, respectively, has an asymmetric profile at least in the main scanning direction with respect to the optical axis 60. Moreover, the second imaging lenses 62 and 63 are positioned so that when one of the lenses 62 and 63 is inverted with respect to the optical axis 60, the inverted lens coincides with the other lens. In other words, when one of the second imaging lenses 62 and 63 is rotated around the optical axis 60 by 180 degrees, the rotated lens coincides with the other lens.

Accordingly, in the optical scanning apparatus 100 according to the firs embodiment, when the light flux L emitted from a single light source is split into the light fluxes L1 and L2 by the half mirror M1, which are then incident on the polygon mirror 5 at different angles, for printing on the scanned surfaces 71 and 72 different from each other, the difference between the field curvatures on the scanned surfaces 71 and 72 can be easily reduced.

In the optical scanning apparatus 100 according to the first embodiment, moreover, the second imaging lens 62 for focusing the light flux L1 on the scanned surface 71 and second imaging lens 63 for focusing the light flux L2 on the scanned surface 72 have an identical profile which is asymmetric at least in the main scanning direction with respect to the optical axis 60. The second imaging lenses 62 and 63 are positioned so that when one of the lenses 62 and 63 is rotated around the optical axis 60 by 180 degrees, the rotated lens coincides with the other lens. This can reduce the asymmetries of the field curvatures on the scanned surfaces 71 and 72. Moreover, the second imaging lenses 62 and 63 can be manufactured with the same mold, thus achieving lower cost and fewer processes.

In the optical, scanning apparatus 100 according to the first embodiment, moreover, the light fluxes L1 and L2 are obliquely incident on the deflecting surface 51 of the polygon mirror 5 at the angles $\beta 1$ and $\beta 2$ within a cross section perpendicular to the optical axis 60. Accordingly, the paths of the light fluxes L1 and L2 having passed through the first imaging lens 61 can be easily separated by the folding mirror M5.

Furthermore, in the optical scanning apparatus 100 according to the first embodiment, the light fluxes L1 and 12 are incident on the deflecting surface 51 so as to intersect at the position behind the deflecting surface 51 on the optical axis 60. This enables scanning of a wide angle of view without increasing the width of the deflecting surface 51 in the main scanning direction.

In the optical scanning apparatus 100 according to the first embodiment, the light source 1 emits a single light flux. However, the invention is not limited to such a configuration. The light source 1 may be an edge emitter-type monolithic laser or a VCSEL emitting a plurality of light fluxes from a plurality of light emitting points, for example. The plurality of light fluxes emitted from the light source 1 may be split into a plurality of transmitted light fluxes and a plurality of reflected light fluxes by the half mirror M1 to be guided to different scanned surfaces.

In the optical scanning apparatus 100 according to the first embodiment, the splitting element is the half mirror M1. However, the invention is not limited to such a configuration. The splitting element may be a polarizing beam splitter to split a light flux into a P-polarized light flux and an S-polarized light flux or a diffraction optical device to split a light flux into light fluxes having different orders of diffraction, which can give the same effect. The half mirror M1 may have a bulk shape like a prism instead of the plate-like shape.

Second Embodiment

Figure 3A:
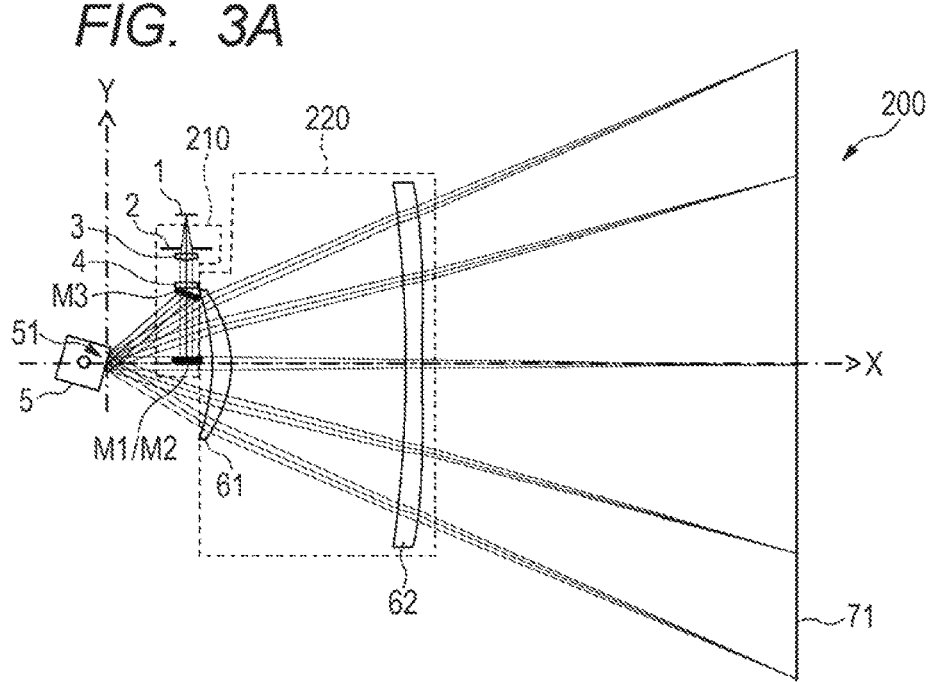
FIG. 3A is a main scanning cross-section view of an optical scanning apparatus according to a second embodiment.
Figure 3B:
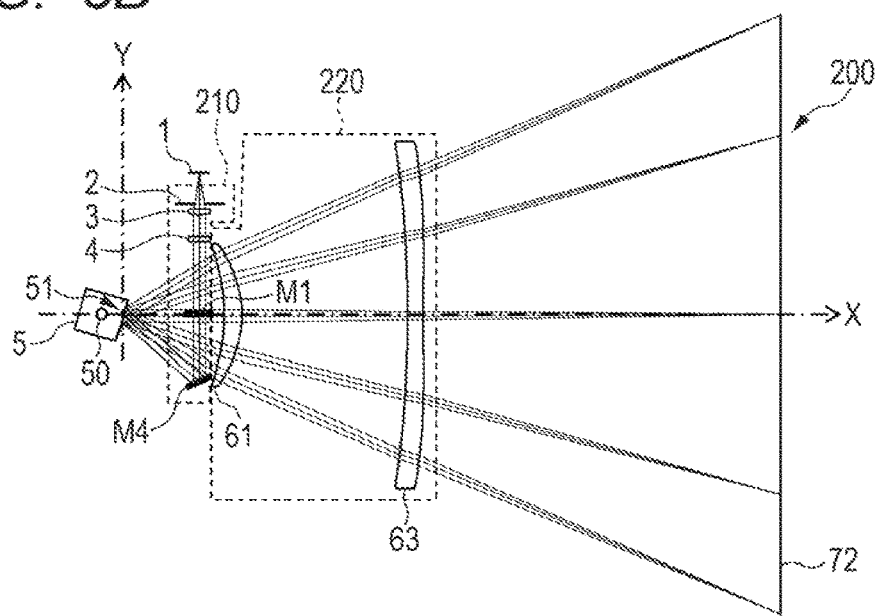
FIG. 3B is a main scanning cross-section view of an optical scanning apparatus according to the second embodiment.
Figure 3C:
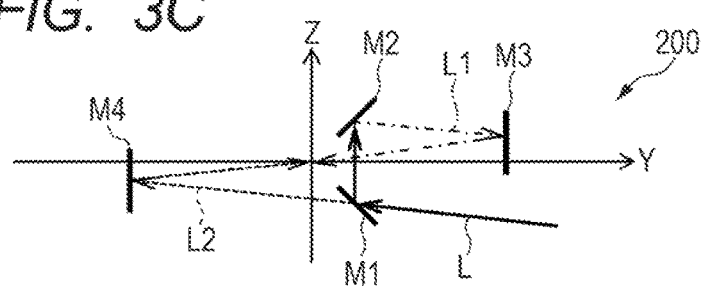
FIG. 3C is a view illustrating paths of light fluxes in the optical scanning apparatus according to the second embodiment.

FIGS. 3A and 3B are main scanning cross-section views of an optical scanning apparatus 200 according to a second embodiment. FIG. 3C is a view illustrating paths of light fluxes in the optical, scanning apparatus 200 according to the second embodiment.

FIG. 3A illustrates only the path of the light flux L1 reflected by the half mirror M1, not illustrating the folding mirror M4. FIG. 3B illustrates only the path of the light flux L2 transmitted through the half mirror M1, not illustrating the folding mirrors M2 and M3.

The optical scanning apparatus 200 includes a light source 1, a stop 2, a condensing lens 3, a cylinder lens 4, the half mirror M1 as the splitting element, and the folding mirrors M2, M3, and M4. The optical scanning apparatus 200 further includes a polygon mirror 5 as the deflecting unit, a first imaging lens 61, second imaging lenses 62 and 63, and not-illustrated folding mirrors M5, M6, and M7.

The stop 2, condensing lens 3, cylinder lens 4, half mirror M1, and folding mirrors M2, M3, and M4 constitute an incidence optical system 210 of the optical scanning apparatus 200 according to the second embodiment.

The first imaging lens 61 and second imaging lenses 62 and 63 constitute an imaging optical system 220 of the optical scanning apparatus 200 according to the second embodiment.

The folding mirrors M5, M6, and M7 constitute a reflection optical system of the optical scanning apparatus 200 according to the second embodiment.

The light flux L emitted from the light source 1 is limited in light flux diameter in the main scanning and sub-scanning directions by the stop 2 and then is converted into a light flux substantially collimated both in the main scanning and sub-scanning directions by the condensing lens 3 to be condensed in the sub-scanning direction by the cylinder lens 4.

The light flux L having passed through the cylinder lens 4 is split into a reflected light flux L1 and a transmitted light flux L2 by the half mirror M1.

The reflected light flux L1 is reflected on the folding mirrors M2 and M3 and then incident on the deflecting surface 51 of the polygon mirror 5. The transmitted light flux L2 is reflected on the folding mirror M4 and is incident on the deflecting surface 51 of the polygon mirror 5.

The light fluxes L1 and L2 which have been incident on the deflecting surface 51 of the polygon mirror 5 are reflected/deflected on the deflecting surface 51 of the polygon mirror 5 and are respectively focused on the scanned surfaces 71 and 72 by the first imaging lens 61, second imaging lenses 62 and 63, and folding mirrors M5, M6, and M7.

Spot-like images are thus formed near the scanned surfaces 71 and 72 both within the main scanning and sub-scanning cross sections. When the polygon mirror 5 is rotated at constant speed, the scanned surfaces 71 and 72 can be subjected to uniform scanning.

The rectangular opening of the stop 2 according to the second embodiment has a size of 4.80 mm in the main scanning direction×2.20 mm in the sub-scanning direction.

Next, the characteristics of the optical scanning apparatus 200 according to the second embodiment are shown in Tables 6 to 10 below.

TABLE 6

| | |
|---|---|
| Diameter of polygon mirror 5 (mm) | 20 |
| Number of surfaces of polygon mirror 5 | 4 |
| Angle α1 between light flux L1 and optical axis 60 (deg.) | 41 |
| Angle α2 between light flux L2 and optical axis 60 (deg.) | −41 |
| Most off-axis image height Y+ (mm) | 150 |
| Most off-axis image height Y− (mm) | −150 |
| Fθ coefficient | 282.84 |
| D | 35% |
| Sub-scanning oblique scanning angle β1 of light flux L1 (deg.) | −3.0 |
| Sub-scanning oblique scanning angle β2 of light flux L2 (deg.) | 3.0 |
| NA1 | 1.31 |
| NA2 | 1.31 |

TABLE 7

| | Surface number | R | X | Y | Z | gx(x) | gx(y) | gx(z) |
|---|---|---|---|---|---|---|---|---|
| Light source 1 | 1 | 0.000 | 37.657 | 71.482 | −8.112 | 0.000 | −0.999 | 0.052 |
| Cover glass | 2 | 0.000 | 37.657 | 71.232 | −8.099 | 0.000 | −0.999 | 0.052 |
| Stop 2 | 3 | 0.000 | 37.657 | 55.703 | −7.285 | 0.000 | −0.999 | 0.052 |
| Incident surface of condensing lens 3 | 4 | 0.000 | 37.657 | 53.177 | −7.153 | 0.000 | −0.999 | 0.052 |
| Exit surface of condensing lens 3 | 5 | aspherical | 37.657 | 50.181 | −6.996 | 0.000 | −0.999 | 0.052 |
| Incident surface of cylinder lens 4 | 6 | aspherical | 37.657 | 39.526 | −6.437 | 0.000 | −0.999 | 0.052 |
| Exit surface of cylinder lens 4 | 7 | 0.000 | 37.657 | 36.530 | −6.280 | 0.000 | −0.999 | 0.052 |
| Half mirror M1 | 8 | 0.000 | 37.657 | 0.000 | 0.000 | 0.000 | 0.707 | 0.707 |
| Folding mirror M2 | 9 | 0.000 | 37.657 | 0.000 | 0.000 | 0.000 | 0.707 | −0.707 |
| Folding mirror M3 | 10 | 0.000 | 37.657 | 33.374 | 2.617 | −0.415 | −0.910 | 0.000 |
| Deflecting surface of polygon mirror 5 | 11 | 0.000 | −0.448 | 2.478 | 0.000 | 0.937 | 0.350 | 0.000 |
| Incident surface of first imaging lens 61 | 12 | aspherical | 50.000 | 0.000 | 0.000 | 1.000 | 0.000 | 0.000 |
| Exit surface of first imaging lens 61 | 13 | aspherical | 59.000 | 0.000 | 0.000 | 1.000 | 0.000 | 0.000 |
| Incident surface of second imaging lens 62 | 14 | aspherical | 141.700 | 0.000 | −3.851 | 1.000 | 0.000 | 0.000 |
| Exit surface of second imaging lens 62 | 15 | aspherical | 149.700 | 0.000 | −3.851 | 1.000 | 0.000 | 0.000 |
| Scanned surface 71 | 16 | 0.000 | 328.100 | 0.000 | −3.851 | 1.000 | 0.000 | 0.000 |

TABLE 8

Exit surface of condensing lens 3 (surface number 5)

| Ryu | Kyu | b2u | b4u | b6u | b8u | b10u |
|---|---|---|---|---|---|---|
| −1.52E+01 | 0.00E+00 | 0.00E+00 | 2.45E−05 | 0.00E+00 | 0.00E+00 | 0.00E+00 |
| Ryl | Kyl | b2l | b4l | b6l | b8l | b10l |
| −1.52E+01 | 0.00E+00 | 0.00E+00 | 2.45E−05 | 0.00E+00 | 0.00E+00 | 0.00E+00 |
| r | | d2u | d4u | d6u | d8u | d10u |
| −1.52E+01 | | 0.00E+00 | 2.45E−05 | 0.00E+00 | 0.00E+00 | 0.00E+00 |
| | | d2l | d4l | d6l | d8l | d10l |
| | | 0.00E+00 | 2.45E−05 | 0.00E+00 | 0.00E+00 | 0.00E+00 |

Incident surface of cylinder lens 4 (surface number 6)

| Ryu | Kyu | b2u | b4u | b6u | b8u | b10u |
|---|---|---|---|---|---|---|
| 0.00E+00 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| 0.00E+00 | 0.00E+00 | 0.00E+00 | 0.00E+00 | 0.00E+00 | 0.00E+00 | 0.00E+00 |
| r | | d2u | d4u | d6u | d8u | d10u |
| 6.33E+01 | | 0.00E+00 | 0.00E+00 | 0.00E+00 | 0.00E+00 | 0.00E+00 |
| | | d2l | d4l | d6l | d8l | d10l |
| | | 0.00E+00 | 0.00E+00 | 0.00E+00 | 0.00E+00 | 0.00E+00 |

Incident surface of first imaging lens 61 (surface number 12)

| Ryu | Kyu | b2u | b4u | b6u | b8u | b10u |
|---|---|---|---|---|---|---|
| −8.93E+01 | 1.64E+00 | 0.00E+00 | 7.99E−07 | 2.25E−10 | 0.00E+00 | 0.00E+00 |
| Ryl | Kyl | b2l | b4l | b6l | b8l | b10l |
| −8.93E+01 | 1.64E+00 | 0.00E+00 | 7.99E−07 | 2.25E−10 | 0.00E+00 | 0.00E+00 |
| r | | d2u | d4u | d6u | d8u | d10u |
| −1.00E+03 | | 0.00E+00 | 0.00E+00 | 0.00E+00 | 0.00E+00 | 0.00E+00 |

TABLE 8-continued

|  |  | d2l | d4l | d6l | d8l | d10l |
|---|---|---|---|---|---|---|
|  |  | 0.00E+00 | 0.00E+00 | 0.00E+00 | 0.00E+00 | 0.00E+00 |
| | | Exit surface of first imaging lens 61 (surface number 13) | | | | |
| Ryu | Kyu | b2u | b4u | b6u | b8u | b10u |
| −5.26E+01 | −8.61E−01 | 0.00E+00 | 1.80E−08 | 1.83E−10 | 0.00E+00 | 0.00E+00 |
| Ryl | Kyl | b2l | b4l | b6l | b8l | b10l |
| −5.26E+01 | −8.61E−01 | 0.00E+00 | 1.80E−08 | 1.83E−10 | 0.00E+00 | 0.00E+00 |
| r | | d2u | d4u | d6u | d8u | d10u |
| −1.00E+03 | | 0.00E+00 | 0.00E+00 | 0.00E+00 | 0.00E+00 | 0.00E+00 |
| | | d2l | d4l | d6l | d8l | d10l |
| | | 0.00E+00 | 0.00E+00 | 0.00E+00 | 0.00E+00 | 0.00E+00 |
| | | Incident surface of second imaging lens 62 (surface number 14) | | | | |
| Ryu | Kyu | b2u | b4u | b6u | b8u | b10u |
| −6.50E+02 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| −6.50E+02 | 0.00E+00 | 0.00E+00 | 0.00E+00 | 0.00E+00 | 0.00E+00 | 0.00E+00 |
| r | | d2u | d4u | d6u | d8u | d10u |
| 9.57E+01 | | 1.37E−04 | 3.73E−08 | −2.06E−11 | 2.39E−15 | 0.00E+00 |
| | | d2l | d4l | d6l | d8l | d10l |
| | | 4.19E−05 | −1.00E−08 | −2.22E−12 | 6.26E−16 | 0.00E+00 |
| | | Exit surface of second imaging lens 62 (surface number 15) | | | | |
| Ryu | Kyu | b2u | b4u | b6u | b8u | b10u |
| 1.85E+03 | −6.47E+02 | 0.00E+00 | −1.52E−07 | 6.83E−12 | −1.23E−17 | −1.38E−20 |
| Ryl | Kyl | b2l | b4l | b6l | b8l | b10l |
| 1.85E+03 | −5.79E+02 | 0.00E+00 | −1.55E−07 | 7.95E−12 | −2.06E−16 | −1.36E−21 |
| r | | d2u | d4u | d6u | d8u | d10u |
| −7.24E+01 | | −5.32E−05 | 8.64E−09 | 1.42E−12 | −2.89E−16 | 0.00E+00 |
| | | d2l | d4l | d6l | d8l | d10l |
| | | 4.72E−05 | −9.63E−09 | 5.26E−12 | −7.04E−16 | 0.00E+00 |

TABLE 9

| | Surface number | R | X | Y | Z | gx(x) | gx(y) | gx(z) |
|---|---|---|---|---|---|---|---|---|
| Light source 1 | 1 | 0.000 | 37.657 | 71.482 | −8.112 | 0.000 | −0.999 | 0.052 |
| Cover glass | 2 | 0.000 | 37.657 | 71.232 | −8.099 | 0.000 | −0.999 | 0.052 |
| Stop 2 | 3 | 0.000 | 37.657 | 55.703 | −7.285 | 0.000 | −0.999 | 0.052 |
| Incident surface of condensing lens 3 | 4 | 0.000 | 37.657 | 53.177 | −7.153 | 0.000 | −0.999 | 0.052 |
| Exit surface of condensing lens 3 | 5 | aspherical | 37.657 | 50.181 | −6.996 | 0.000 | −0.999 | 0.052 |
| Incident surface of cylinder lens 4 | 6 | aspherical | 37.657 | 39.526 | −6.437 | 0.000 | −0.999 | 0.052 |
| Exit surface of cylinder lens 4 | 7 | 0.000 | 37.657 | 36.530 | −6.280 | 0.000 | −0.999 | 0.052 |
| Half mirror M1 | 8 | 0.000 | 37.657 | 0.000 | 0.000 | 0.000 | 0.707 | 0.707 |
| Folding mirror M4 | 9 | 0.000 | 37.657 | −33.374 | 0.000 | 0.000 | 0.707 | −0.707 |
| Deflecting surface of polygon mirror 5 | 11 | 0.000 | −0.448 | 2.476 | 0.000 | 0.937 | 0.350 | 0.000 |
| Incident surface of first imaging lens 61 | 12 | aspherical | 50.000 | 0.000 | 0.000 | 1.000 | 0.000 | 0.000 |
| Exit surface of first imaging lens 61 | 13 | aspherical | 59.000 | 0.000 | 0.000 | 1.000 | 0.000 | 0.000 |
| Incident surface of second imaging lens 63 | 14 | aspherical | 141.700 | 0.000 | 0.000 | 3.851 | 1.000 | 0.000 |
| Exit surface of second imaging lens 63 | 15 | aspherical | 149.700 | 0.000 | 0.000 | 3.851 | 1.000 | 0.000 |
| Scanned surface 72 | 16 | 0.000 | 328.100 | 0.000 | 0.000 | 3.851 | 1.000 | 0.000 |

TABLE 10

| | | Exit surface of condensing lens 3 (surface number 5) | | | | |
|---|---|---|---|---|---|---|
| Ryu | Kyu | b2u | b4u | b6u | b8u | b10u |
| −1.52E+01 | 0.00E+00 | 0.00E+00 | 2.45E−05 | 0.00E+00 | 0.00E+00 | 0.00E+00 |
| Ryl | Kyl | b2l | b4l | b6l | b8l | b10l |
| −1.52E+01 | 0.00E+00 | 0.00E+00 | 2.45E−05 | 0.00E+00 | 0.00E+00 | 0.00E+00 |
| r | | d2u | d4u | d6u | d8u | d10u |
| −1.52E+01 | | 0.00E+00 | 2.45E−05 | 0.00E+00 | 0.00E+00 | 0.00E+00 |
| | | d2l | d4l | d6l | d8l | d10l |
| | | 0.00E+00 | 2.45E−05 | 0.00E+00 | 0.00E+00 | 0.00E+00 |
| | | Incident surface of cylinder lens 4 (surface number 6) | | | | |
| Ryu | Kyu | b2u | b4u | b6u | b8u | b10u |
| 0.00E+00 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| 0.00E+00 | 0.00E+00 | 0.00E+00 | 0.00E+00 | 0.00E+00 | 0.00E+00 | 0.00E+00 |
| r | | d2u | d4u | d6u | d8u | d10u |
| 6.33E+01 | | 0.00E+00 | 0.00E+00 | 0.00E+00 | 0.00E+00 | 0.00E+00 |
| | | d2l | d4l | d6l | d8l | d10l |

TABLE 10-continued

| | | 0.00E+00 | 0.00E+00 | 0.00E+00 | 0.00E+00 | 0.00E+00 |
|---|---|---|---|---|---|---|
| Incident surface of first imaging lens 61 (surface number 12) | | | | | | |
| Ryu | Kyu | b2u | b4u | b6u | b8u | b10u |
| −8.93E+01 | 1.64E+00 | 0.00E+00 | 7.99E−07 | 2.25E−10 | 0.00E+00 | 0.00E+00 |
| Ryl | Kyl | b2l | b4l | b6l | b8l | b10l |
| −8.93E+01 | 1.64E+00 | 0.00E+00 | 7.99E−07 | 2.25E−10 | 0.00E+00 | 0.00E+00 |
| r | | d2u | d4u | d6u | d8u | d10u |
| −1.00E+03 | | 0.00E+00 | 0.00E+00 | 0.00E+00 | 0.00E+00 | 0.00E+00 |
| | | d2l | d4l | d6l | d8l | d10l |
| | | 0.00E+00 | 0.00E+00 | 0.00E+00 | 0.00E+00 | 0.00E+00 |
| Exit surface of first imaging lens 61 (surface number 13) | | | | | | |
| Ryu | Kyu | b2u | b4u | b6u | b8u | b10u |
| −5.26E+01 | −8.61E−01 | 0.00E+00 | 1.80E−08 | 1.83E−10 | 0.00E+00 | 0.00E+00 |
| Ryl | Kyl | b2l | b4l | b6l | b8l | b10l |
| −5.26E+01 | −8.61E−01 | 0.00E+00 | 1.80E−08 | 1.83E−10 | 0.00E+00 | 0.00E+00 |
| r | | d2u | d4u | d6u | d8u | d10u |
| −1.00E+03 | | 0.00E+00 | 0.00E+00 | 0.00E+00 | 0.00E+00 | 0.00E+00 |
| | | d2l | d4l | d6l | d8l | d10l |
| | | 0.00E+00 | 0.00E+00 | 0.00E+00 | 0.00E+00 | 0.00E+00 |
| Incident surface of second imaging lens 63 (surface number 14) | | | | | | |
| Ryu | Kyu | b2u | b4u | b6u | b8u | b10u |
| −6.50E+02 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| −6.50E+02 | 0.00E+00 | 0.00E+00 | 0.00E+00 | 0.00E+00 | 0.00E+00 | 0.00E+00 |
| r | | d2u | d4u | d6u | d8u | d10u |
| 9.57E+01 | | 4.19E−05 | −1.00E−08 | −2.22E−12 | 6.26E−16 | 0.00E+00 |
| | | d2l | d4l | d6l | d8l | d10l |
| | | 1.37E−04 | 3.73E−03 | −2.06E−11 | 2.39E−15 | 0.00E+00 |
| Exit surface of second imaging lens 63 (surface number 15) | | | | | | |
| Ryu | Kyu | b2u | b4u | b6u | b8u | b10u |
| 1.85E+03 | −5.79E+02 | 0.00E+00 | −1.55E−07 | 7.95E−12 | −2.06E−16 | −1.36E−21 |
| Ryl | Kyl | b2l | b4l | b6l | b8l | b10l |
| 1.85E+03 | −6.47E+02 | 0.00E+00 | −1.52E−07 | 6.89E−12 | −1.23E−17 | −1.38E−20 |
| r | | d2u | d4u | d6u | d8u | d10u |
| −7.24E+01 | | 4.72E−05 | −9.63E−09 | 5.26E−12 | −7.04E−16 | 0.00E+00 |
| | | d2l | d4l | d6l | d8l | d10l |
| | | −5.32E−05 | 8.64E−09 | 1.42E−12 | −2.89E−16 | 0.00E+00 |

In Tables 8 and 10, "E-x" means "$\times 10^{-x}$".

In the followings, the axes X, Y, and Z are set to the optical axis of the first imaging lens 61, the axis orthogonal to the optical axis within the main scanning cross section, and an axis orthogonal to the optical axis in the sub-scanning cross section, respectively.

In Table 7, R indicates a curvature radius of each surface. X, Y, and Z indicate coordinates of the surface vertex of each surface, and gx(x), gx(y), and gx(z) indicate components of a normal vector at the surface vertex of each surface.

D is a ratio of the print scanning angle to the full scanning angle.

As shown in Table 6, in the optical scanning apparatus 200 according to the second embodiment, angles α1 and α2, which are angles between the axis X and the directions of incidence of the light fluxes L1 and L2 on the deflecting surface within the main scanning cross section, are 41 and −41 degrees, respectively.

As shown in Table 6, in the optical scanning apparatus 200 according to the second embodiment, angles β1 and β2, which are angles between the axis Y and the directions of incidence of the light fluxes L1 and L2 on the deflecting surface within a cross section perpendicular to the optical axis 60, are −3.0 and 3.0 degrees, respectively.

In the optical scanning apparatus 200 according to the second embodiment, an angle β0, which is an angle between the axis Y and the direction of incidence of the light flux L emitted from the light source 1 on the half mirror M1 within the cross section perpendicular to the optical axis 60, is 3.0 degrees.

The half mirror M1 and folding mirrors M2, M3, and M4 are properly arranged so that the aforementioned angles are implemented.

In the optical scanning apparatus 200 according to the second embodiment, the paths of incidence of the light fluxes L1 and L2 on the polygon mirror 5 cross the axis Y at coordinates of (0, 0.62) and (0, −0.62), respectively, and intersect at coordinates of (−0.71, 0) on the axis X (the optical axis 60) within the X-Y plane (the main scanning cross section).

As shown in Table 6, in the optical scanning apparatus 200 according to the second embodiment, the light fluxes L1 and L2 are incident on the deflecting surface 51 of the polygon mirror 5 so as to satisfy α1=−α2 and β1=−β2. In other words, the light fluxes L1 and L2 are incident on the deflecting surface 51 of the polygon mirror 5 in a two-fold rotational symmetry with respect to the optical axis 60.

As shown in Tables 8 and 10, in the optical scanning apparatus 200 according to the second embodiment, the shared first imaging lens 61, on which the light fluxes L1 and L2 which have been reflected on the deflecting surface 51 of the polygon mirror 5 are both incident, have a symmetric shape in the main scanning direction with respect to the optical axis 60.

As shown in Tables 8 and 10, in the optical scanning apparatus 200 according to the second embodiment, each of the second imaging lenses 62 and 63, on which the light fluxes L1 and L2 having passed through the first imaging lens 61 are incident, respectively, has an asymmetric shape at least in the main scanning direction with respect to the optical axis 60. Moreover, the second imaging lenses 62 and 63 are positioned so that when one of the lenses 62 and 63 inverted with respect to the optical axis 60, the inverted lens coincides with the other lens. In other words, when one of the second imaging lenses 62 and 63 is rotated around the optical axis 60 by 180 degrees, the rotated lens coincides with the other.

Accordingly, in the optical scanning apparatus 200 according to the second embodiment, when the light flux L emitted from a single light source is split into the light fluxes L1 and L2 by the half mirror M1, which are then incident on the polygon mirror 5 at different angles, for printing on the scanned surfaces 71 and 72 different from each other, the difference between field curvatures on the scanned surfaces 71 and 72 can be easily reduced.

In the optical scanning apparatus 200 according to the second embodiment, moreover, the second imaging lens 62 for focusing the light flux L1 on the scanned surface 71 and second imaging lens 63 for focusing the light flux L2 on the scanned surface 72 have an identical profile which is asymmetric at least in the main scanning direction with respect to the optical axis 60. The second imaging lenses 62 and 63 are positioned so that when one of the lenses 62 and 63 is rotated around the optical axis 60 by 180 degrees, the lenses 62 and 63 coincide with each other. This can reduce the asymmetries of the field curvatures on the scanned surfaces 71 and 72. Moreover, the second imaging lenses 62 and 63 can be manufactured using the same mold, thus achieving lower cost and fewer processes.

In the optical, scanning apparatus 200 according to the second embodiment, moreover, the light fluxes L1 and L2 are obliquely incident on the deflecting surface 51 of the polygon mirror 5 at the angles β1 and β2 within a cross section perpendicular to the optical axis 60. Accordingly, the paths of the light fluxes L1 and L2 having passed through the first imaging lens 61 can be easily separated by the folding mirror M5.

Furthermore, in the optical scanning apparatus 200 according to the second embodiment, the light fluxes L1 and L2 are incident on the deflecting surface 51 so as to intersect at a position behind the deflecting surface 51 on the optical axis 60. This enables scanning of a wide angle of view without increasing the width of the deflecting surface 51 in the main scanning direction.

Figure 4A:
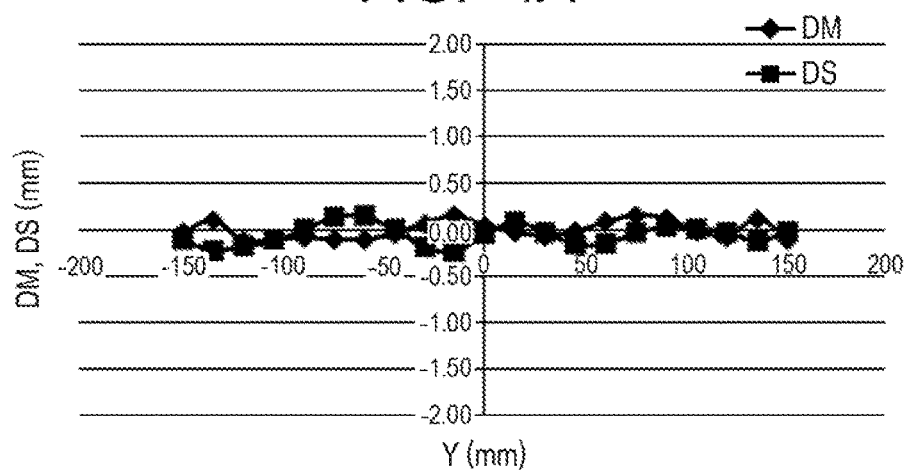
FIG. 4A is a diagram illustrating image-height dependence of image plane displacement amount on a first scanned surface in the optical scanning apparatus according to a second embodiment.

FIG. 4A illustrates image-height dependence of image plane displacement amount DM in the main scanning direction and image plane displacement amount DS in the sub-scanning direction on the scanned surface 71 in the optical scanning apparatus 200 according to the second embodiment.

Figure 4B:
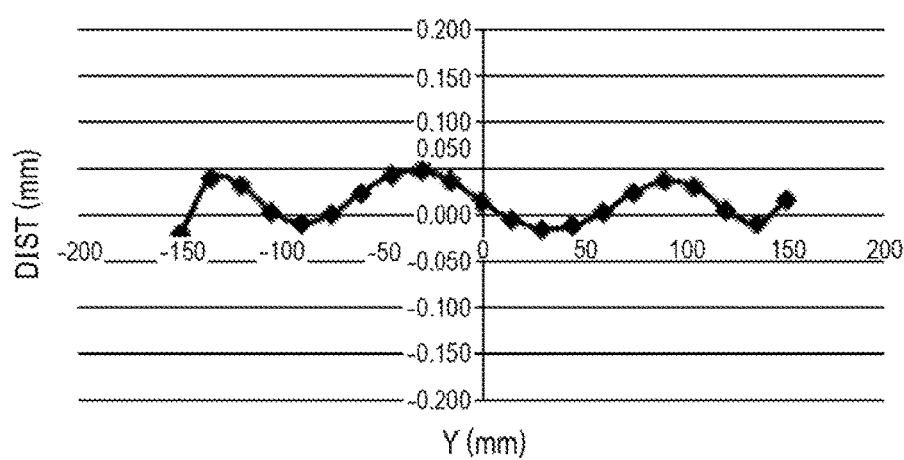
FIG. 4B is a diagram illustrating image-height dependence of displacement amount of the light-condensing position in the main scanning direction, on the first scanned surface in the optical scanning apparatus according to the second embodiment.

FIG. 4B illustrates image-height dependence of displacement amount DIST of the light condensed position in the main scanning direction, on the scanned surface 71 in the optical scanning apparatus 200 according to the second embodiment.

Figure 4C:
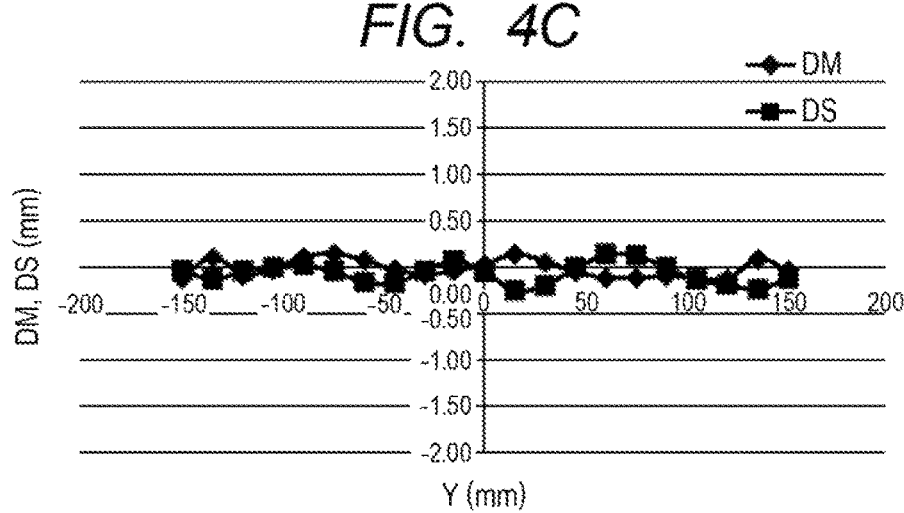
FIG. 4C is a diagram illustrating image-height dependence of image plane displacement amount on the second scanned surface in the optical scanning apparatus according to the second embodiment.

FIG. 4C illustrates image-height dependence of image plane displacement amount DM in the main scanning direction and image plane displacement amount DS in the sub-scanning direction on the scanned surface 72 in the optical scanning apparatus 200 according to the second embodiment.

Figure 4D:
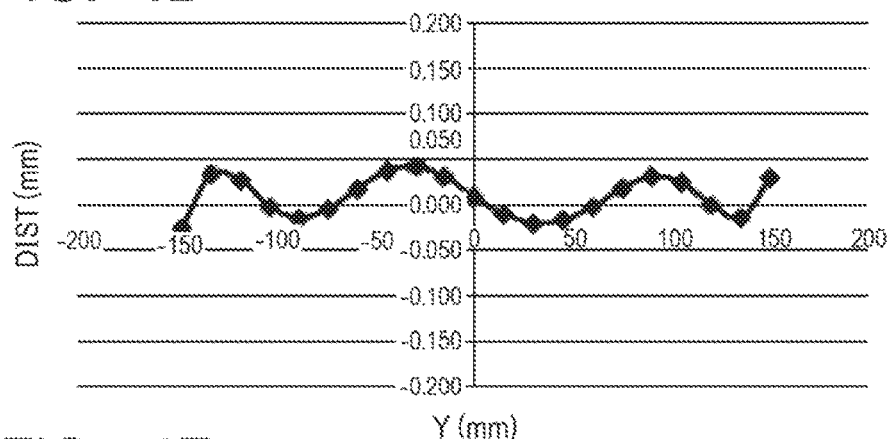
FIG. 4D is a diagram illustrating image-height dependence of displacement amount of the light-condensing position in the main scanning direction, on the second scanned surface in the optical scanning apparatus according to the second embodiment.

FIG. 4D illustrates image-height dependence of displacement amount DIST of the light condensed position in the main scanning direction, on the scanned surface 72 in the optical scanning apparatus 200 according to the second embodiment.

As illustrated in FIGS. 4A and 4C, the image plane displacement amount DM in the main scanning direction and the image plane displacement amount DS in the sub-scanning direction on the scanned surfaces 71 and 72 can be well reduced at each image height in the optical scanning apparatus 200 according to the second embodiment.

As illustrated in FIGS. 4B and 4D, the displacement amounts DIST of the light condensed positions in the main scanning direction on both the scanned surfaces 71 and 72 in the optical scanning apparatus 200 according to the second embodiment can be well reduced at each image height.

Figure 4E:
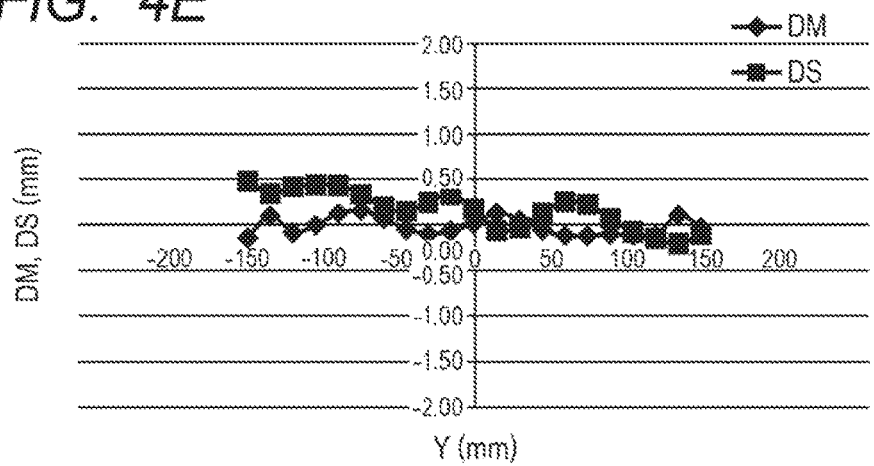
FIG. 4E is a diagram illustrating image-height dependence of image plane displacement amount on the second scanned surface in the optical scanning apparatus according to the second embodiment.

FIG. 4E illustrates image-height dependence of image plane displacement amount DM in the main scanning direction and image plane displacement amount DS in the sub-scanning direction on the scanned surface 72 in the optical scanning apparatus 200 according to the second embodiment when the main scanning incidence angle α2 of the light flux L2 is changed from −41 degrees to −45 degrees with the main scanning incidence angle α1 of the light flux L1 maintained at 41 degrees.

As illustrated in FIG. 4E, even when the main scanning incidence angle α2 of the light flux L2 is changed from −41 degrees to −45 degrees, the image plane displacement amount DS in the sub-scanning direction is within 0.5 mm, which is well reduced.

The optical scanning apparatus 200 according to the second embodiment is therefore configured to satisfy the conditional expression of:

$$-1.1 \leq \alpha1/\alpha2 \leq -0.9 \tag{4}$$

This can easily reduce the difference between the field curvatures on the scanned surfaces 71 and 72 and reduce the asymmetries of the respective field curvatures on the scanned surfaces 71 and 72 even when the light fluxes L1 and L2 are incident on the deflecting surface 51 of the polygon mirror 5.

Preferably, the optical scanning apparatus 200 according to the second embodiment satisfies the conditional expression of:

$$-1.05 \leq \alpha1/\alpha2 \leq -0.95 \tag{4a}$$

More preferably, the optical scanning apparatus 200 according to the second embodiment satisfies the conditional expression of:

$$-1.02 \leq \alpha1/\alpha2 \leq -0.98 \tag{4b}$$

In the optical scanning apparatus 200 according to the second embodiment, the difference between the field curvatures on the scanned surfaces 71 and 72 and the asymmetries of the respective field curvatures on the scanned surfaces 71 and 72 can be reduced most when the light fluxes L1 and L2 are incident on the deflecting surface 51 of the polygon mirror 5 in a two-fold rotational symmetry with respect to the optical axis 60, namely so as to satisfy α1/α2=−1.

Third Embodiment

Figure 10:
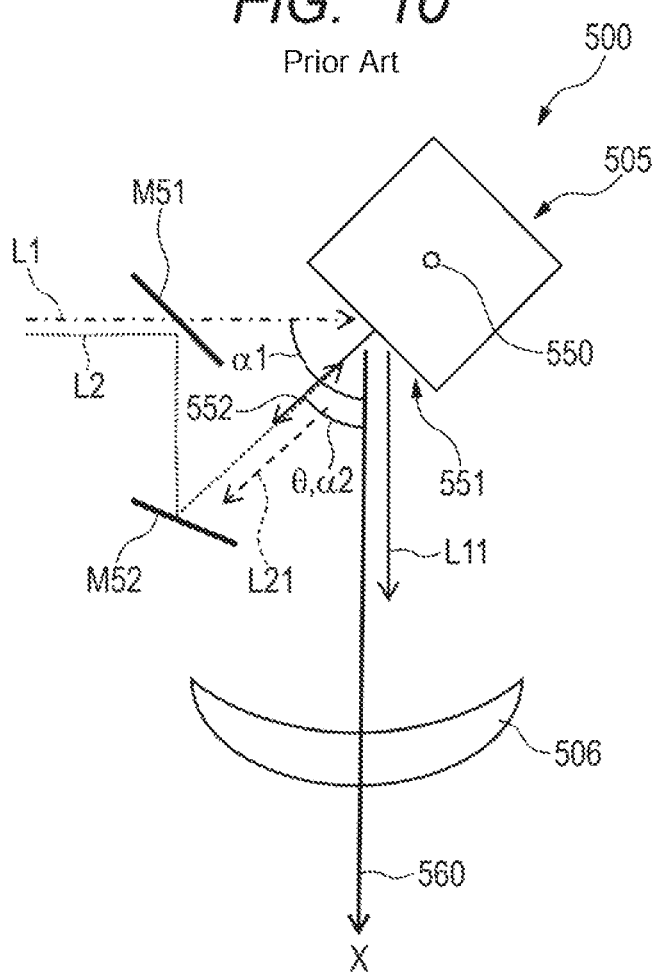
FIG. 10 is a partially-enlarged main scanning cross-section view of a conventional optical scanning apparatus.

FIG. 10 illustrates a partially-enlarged main scanning cross section view of an optical scanning apparatus 500 disclosed in Japanese Patent Application Laid-Open No. 2005-92129.

As shown below, Japanese Patent Application Laid-Open No. 2005-92129 does not include any discussion about return light in the optical scanning apparatus 500. This causes a problem that, while the light flux L1 of the two light fluxes L1 and L2 obtained by splitting a light flux emitted from a shared light source is used to print on the scanned surface, the light amount of the light flux L1 in printing becomes unstable due to the reflected light flux L21 of the other light flux L2.

As illustrated in FIG. 10, the light flux emitted from a shared light source (not illustrated) is split into the light fluxes L1 and L2 by a not-illustrated light flux splitting unit. The light flux L1 then goes straight to be incident on a deflecting surface 551 of the polygon mirror 505. The light flux L2 is reflected on folding mirrors M51 and M52 to be incident on the deflecting surface 551.

Herein, the axis X is set to an optical axis 560 of an imaging lens 506. Angles α1 and α2, which are angles between the axis X and the respective directions of incidence of the light fluxes L1 and L2 on the deflecting surface 551 within the main scanning cross section, are 90 and 45 degrees, respectively.

At the timing of FIG. 10, an angle θ, which is an angle between the axis X and a normal 552 of the deflecting surface 551 within the main scanning cross section, is 45 degrees.

The light flux L1 incident on the deflecting surface 551 is deflected. The deflected light flux L11 travels in parallel to the optical axis 560 and is focused at the on-axis image height in the not-illustrated scanned surface by an imaging lens 506.

Since the light flux L2 is perpendicularly incident on the deflecting surface 551, a deflected light flux L21 becomes so-called return light that travels back along the path of the light flux L2 to the light source.

Such return light reaches the light emitting point of the light source and is incident on an APC sensor (not illustrated) monitoring the light emitting amount of the light source. The light source such as a semiconductor laser controls the light emitting amount of the light source to a predetermined amount based on the light amount detected by the APC sensor. Accordingly, when the return light is incident on the light source, the APC sensor cannot correctly measure the light emitting amount of the light source, so that the light emitting amount of the light source becomes unstable.

At the timing of FIG. 10, the light flux L21 deflected on the deflecting surface 551 becomes return light while the light flux L11 deflected on the deflecting surface 551 is focused on a not-illustrated scanned surface. It is certain that in different time, the light flux L11 becomes return light while the light flux L21 is focused.

As shown below, in the optical scanning apparatus according to the third embodiment, such return light is not generated, so that the light emitting amount of the light source can be stabilized.

A description is given of conditional expressions satisfied by an optical scanning apparatus 300 according to the third embodiment.

Figure 6A:
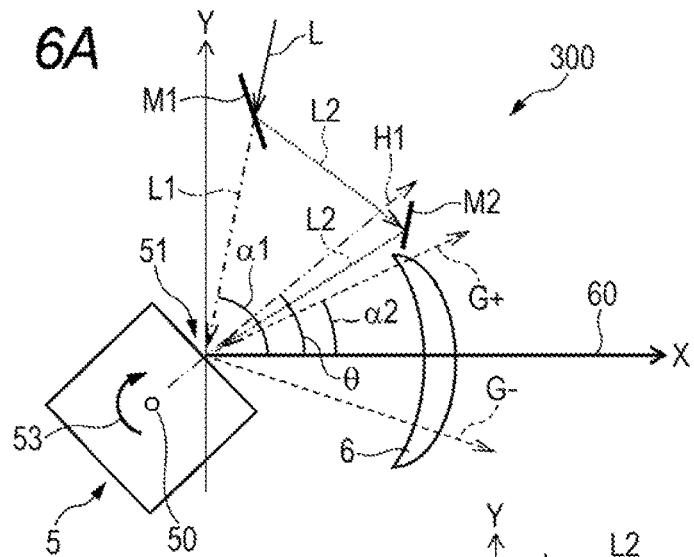
FIG. 6A is a partially-enlarged main scanning cross-section view of an optical scanning apparatus according to a third embodiment.
Figure 6B:
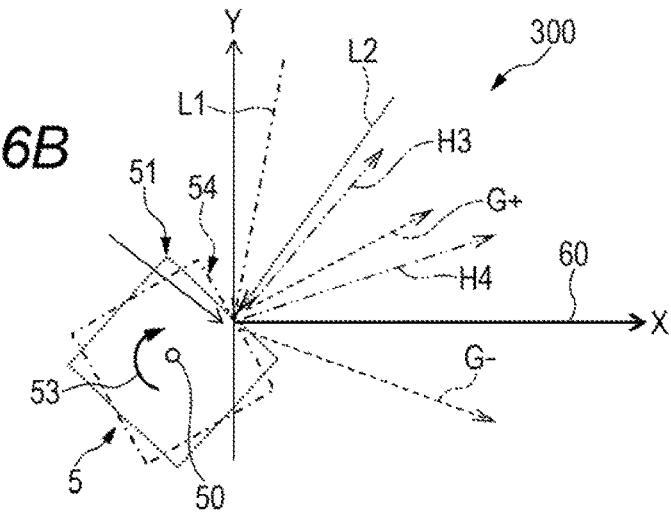
FIG. 6R is a partially-enlarged main scanning cross-section view of the optical scanning apparatus according to the third embodiment.
FIG. 6C is a partially-enlarged main scanning cross-section view of the optical scanning apparatus according to the third embodiment.
Figure 6C:
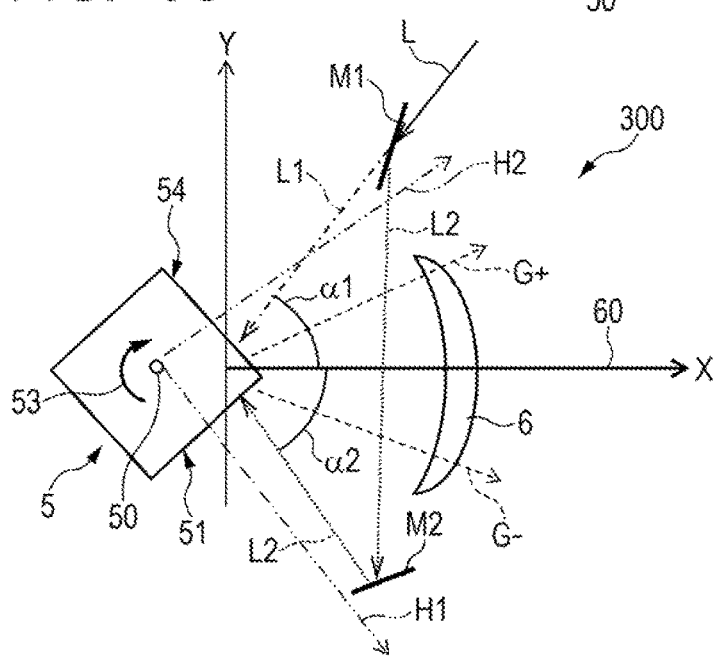

FIGS. 6A and 6B illustrate partially-enlarged main scanning cross-section views of an example of the optical scanning apparatus 300 according to the third embodiment. FIG. 6C is a partially-enlarged main scanning cross-section view of a modification of the optical scanning apparatus 300 according to the third embodiment.

FIG. 6B does not illustrate the half mirror M1, folding mirror M2, and imaging lens 6 for simplifying the drawing.

In the case illustrated in FIGS. 6A and 6B, the light flux L emitted from a not-illustrated light source is split into a transmitted light flux L1 and a reflected light flux L2 by the half mirror M1 as the splitting element.

The light flux L1 which has been transmitted through the half mirror M1 is incident on a deflecting surface 51 of the polygon mirror 5. On the other hand, the light flux L2 which has been reflected on the half mirror M1 is reflected on the folding mirror M2 to be incident on the deflecting surface 51 of the polygon mirror 5.

In the case illustrated in FIG. 6C, the light flux L emitted from a not-illustrated light source is split into a transmitted light flux L1 and a reflected light flux L2 by the half mirror M1 as the splitting element.

The light flux L1 which has been transmitted through the half mirror M1 is incident on a deflecting surface 54 of the polygon mirror 5. On the other hand, the light flux L2 which has been reflected on the half mirror M1 is reflected on the folding mirror M2 to be incident on the deflecting surface 51 of the polygon mirror 5.

As the polygon mirror 5 rotates, the deflecting surface 51 deflects the light flux L1 for scanning and then deflects the light flux L2 for scanning. The deflecting surface 54 next to the deflecting surface 51 deflects the light flux L1 for scanning and then deflects the light flux L2 for scanning.

The angle (main scanning incidence angle) between the axis X and the direction of incidence of the light flux L1 on a deflecting surface within the main scanning cross section is referred to as α1. The angle between the axis X and the direction of incidence of the light flux L2 on the deflecting surface within the main scanning cross section is referred to as α2. Herein, the axis X is set to the optical axis 60 of the imaging lens.

The angles α1 and α2 are set so that the light fluxes L1 and L2 scan respective scanned surfaces different from each other during different periods alternately.

Hereinafter, for simple explanation, it is assumed that α1>α2 and α1>0.

The angles α1 and α2 are positive when measured counterclockwise from the axis X around the axis parallel to the rotational axis 50 of the polygon mirror 5.

In the examples illustrated in FIGS. 6A and 6B, α2>0 and (α1−α2) is relatively small. In the example illustrated in FIG. 6C, α2<0 and (α1−α2) is relatively large.

It is assumed that the polygon mirror 5 rotates in the direction of arrow 53.

The third embodiment is not limited to the above condition.

As illustrated in FIGS. 6A to 6C, H1 indicates the normal of the deflecting surface 51 of the polygon mirror 5, and θ indicates the angle between the axis X and the normal H1 in the main scanning cross section.

The polygon mirror 5 includes four deflecting surfaces. The number N of surfaces of the polygon mirror 5 is 4.

The light fluxes L1 and L2 deflected by the polygon mirror 5 scan respective different scanned surfaces (not illustrated) through the imaging lens 6.

As illustrated in FIGS. 6A to 6C, the angle between the axis X and a travel direction G+ that a light flux directed to most off-axis image height Y+ on the scanning start side on the scanned surface travels just after the light flux is reflected on the deflecting surface is referred to as an outermost scanning angle +ωmax. The angle between the axis X and a travel direction G− that a light flux directed to most off-axis image height Y− on the scanning end side on the scanned surface travels just after the light flux is reflected on the deflecting surface is referred to as an outermost scanning angle −ωmax.

With a rotating polygon mirror having N surfaces, the light flux reflected on each deflecting surface is capable of scanning a full scanning angle of 2×360/N degrees.

On the other hand, the effective scanning angle (print scanning angle), which is the range of scanning angle of a light flux that scans the entire image height from the most off-axis image height Y+ to the most off-axis image height Y− in the effective region (printing region) of the scanned surface corresponds to 2×ωmax.

The ratio D of the print scanning angle to the full scanning angle is represented as D=2×ωmax/(2×360/N). The outermost angle ωmax is expressed as:

$$\omega max=360/N\times D.$$

In the optical scanning apparatus 300 according to the third embodiment, the light fluxes L1 and L2 are deflected for scanning. D is therefore also the ratio of the print scanning angle of the light flux L1 to the full scanning angle or the ratio of the print scanning angle of the light flux L2 to the full scanning angle.

Since the polygon mirror 5 rotates at constant speed, the light fluxes L1 and L2 are sequentially deflected by the same deflecting surface. The light fluxes L1 and L2 scan the respective scanned surfaces different from each other during different periods alternately.

The optical scanning apparatus 300 according to the third embodiment is therefore configured so that the ratio of the time taken to print an image in a certain period of time is D+D=2×D.

Next, a description is given of setting of the main scanning incidence angle α1 of the light flux L1 and the main scanning incidence angle α2 of the light flux L2 in detail.

First, a description is given of the conditions for avoiding overlapping of printing times by the respective light fluxes L1 and L2 in the optical scanning apparatus 300 according to the third embodiment.

When the angles α1 and α2 are close enough to each other, the printing time by the light flux L1 overlaps the printing time by the light flux L2. In other words, the light fluxes L1 and L2 scan for printing at the same time.

The angles α1 and α2 therefore need to be set so that the printing time by the light flux L1 is properly separated from the printing time by the light flux L2.

As described above, in the optical scanning apparatus 300 according to the third embodiment, as the polygon mirror 5 rotates, the deflecting surface 51 deflects the light flux L1 for scanning and then deflects the light flux L2 for scanning. Subsequently, the deflecting surface 54 next to the deflecting surface 51 deflects the light flux L1 for scanning and then deflects the light flux L2 for scanning.

In this process, it is necessary to consider two conditions herein.

The first condition is that the printing time when the deflecting surface 51 deflects the light flux L1 for scanning does not overlap the printing time when the deflecting surface 51 deflects the light flux L2 for scanning.

The second condition is that the printing time when the deflecting surface 51 deflects the light flux L2 for scanning does not overlap the printing time when the deflecting surface 54 deflects the light flux L1 for scanning.

The above two conditions need to be satisfied simultaneously. The first condition needs to be considered in the case where (α1−α2) is small in particular while the second condition needs to be considered in the case where (α1−α2) is large in particular.

First, the first condition is discussed.

The first condition is achieved if the timing when the light flux L1 is deflected in the G− direction to scan at the outermost scanning angle −ωmax is prior to the timing when the light flux L2 is deflected in the G+ direction to scan at the outermost scanning angle +ωmax.

Specifically, the angles α1 and α2 need to be set so that the difference between the angle of deflection of the light flux L1 by the deflecting surface 51 and the angle of deflection of the light flux L2 by the deflecting surface 51 is not less than the angle of deflection of 2×ωmax from the most off-axis image height Y+ to the most off-axis image height Y−.

The angle of deflection of the light flux L1 by the deflecting surface 51 is 2×θ−α1 where the main scanning incidence angle of the light flux L and the angle of the normal of the deflecting surface 51 are α1 and θ, respectively.

The angle of deflection of the light flux L2 by the deflecting surface 51 is 2×θ−α2 where the main scanning incidence angle of the light flux L2 and the angle of the normal of the deflecting surface 51 are α2 and θ, respectively.

The difference between the above angle of deflection of the light flux L1 by the deflecting surface 51 and the above angle of deflection of the light flux L2 by the deflecting surface 51 needs to be not less than 2×ωmax. It is therefore necessary to satisfy the conditional expression (5) below.

$$(2\times\theta-\alpha2)-(2\times\theta-\alpha1)\geq 2\times\omega max \quad (5)$$

From the conditional expression (5), α1−α2≥2×ωmax. By substituting ωmax=360/N×D into the above expression, the conditional expression (6) below is obtained.

$$\alpha1-\alpha2\geq 2\times 360/N\times D \quad (6)$$

Next, the second condition is discussed.

The second condition is achieved if the timing when the light flux L2 is deflected in the G− direction to scan at the outermost scanning angle −ωmax is prior to the timing when the light flux L1 is deflected in the G+ direction to scan at the outermost scanning angle +ωmax.

Specifically, the angles α1 and α2 need to be set so that the difference between the angle of deflection of the light flux L2 by the deflecting surface 51 and the angle of deflection of the light flux L1 by the deflecting surface 54 is not less than the angle of deflection 2×ωmax from the most off-axis image height Y+ to the most off-axis image height Y−.

The angle of deflection of the light flux L2 by the deflecting surface 51 is 2×θ−α2 where the main scanning incidence angle of the light flux L2 and the angle of the normal of the deflecting surface 51 are α2 and θ, respectively.

The angle of deflection of the light flux L1 by the deflecting surface 54 is 2×(θ+360/N)−α1 where the main scanning incidence angle of the light flux L1 and the angle of a normal 112 of the deflecting surface 54 are α1 and θ'=(θ+360/N), respectively.

The difference between the above angle of deflection of the light flux L2 by the deflecting surface 51 and the above angle of deflection of the light flux L1 by the deflecting surface 54 needs to be not less than 2×ωmax. It is therefore necessary to satisfy the conditional expression (7) below.

$$(2\times(\theta+360/N)-\alpha1)-(2\times\theta-\alpha2)\geq 2\times\omega max \quad (7)$$

From the conditional expression (7), α2≥α1+2×(ωmax−360/N). By substituting ωmax=360/N×D into the above expression, the conditional expression (8) below is obtained.

$$\alpha2\geq\alpha1-2\times 360/N\times(1-D) \quad (8)$$

Next, a description is given of third to ninth conditions for preventing one of the light fluxes L1 and L2 from becoming return light returning to the light source while the other light flux scans in the optical scanning apparatus 300 according to the third embodiment.

As illustrated in FIG. 6B, it is assumed herein that the light flux L1 incident on the deflecting surface 51 of the polygon mirror 5 is deflected in the direction G+ toward the most off-axis image height Y+ on the scanning start side in the scanned surface when the normal of the deflecting surface 51 is directed in a direction H3. It is also assumed that the light flux L incident on the deflecting surface 51 of the polygon mirror 5 is deflected in the direction G− toward the most off-axis image height Y− on the scanning end side in the scanned surface when the normal of the deflecting surface 51 is directed in a direction H4.

The third condition is a condition for preventing the light flux L2 from becoming return light returning to the light source along the path of the light flux L2 by the deflecting surface 51 while the light flux L1 is deflected by the deflecting surface 51 to scan.

This condition is achieved when the angles α1 and α2 are set so that the incident direction of the light flux L2 does not coincide with the normal direction of the deflecting surface 51 while the light flux L1 is deflected on the deflecting surface 51 to scan, that is, while the normal direction of the deflecting surface 51 changes from the direction H3 to the direction H4.

The angle of deflection of the light flux L1 by the deflecting surface 51 is 2×θ−α1 as described above, and therefore, the following expression (9) is satisfied.

$$-\omega max \leq 2\times\theta - \alpha1 \leq +\omega max \tag{9}$$

Herein, by modifying the expression (9), the expression (10) below is obtained.

$$(\alpha1-\omega max)/2 \leq \theta \leq (\alpha1+\omega max)/2 \tag{10}$$

Since the third condition is to prevent α2 from coinciding with θ, the conditional expression (11a) or (11b) shown below need to be satisfied.

$$\alpha2 < (\alpha1-\omega max)/2 \tag{11a}$$

$$\alpha2 > (\alpha1+\omega max)/2 \tag{11b}$$

By substituting ωmax=360/N×D into the conditional expressions (11a) and (11b), the conditional expression (12a) or (12b) below needs to be satisfied as the third condition.

$$\alpha2 < (\alpha1-360/N\times D)/2 \tag{12a}$$

$$\alpha2 > (\alpha1+360/N\times D)/2 \tag{12b}$$

Next, the fourth condition is a condition for preventing the light flux L1 from becoming return light returning to the light source along the path of the light flux L1 by the deflecting surface 51 while the light flux L2 is deflected by the deflecting surface 51 to scan.

This condition is achieved when the angles α1 and α2 are set so that the direction of incidence of the light flux L1 does not coincide with the normal direction of the deflecting surface 51 while the light flux L2 is deflected on the deflecting surface 51 to scan, that is, while the normal direction of the deflecting surface 51 changes from the direction H3 to the direction H4.

The angle of deflection of the light flux L2 by the deflecting surface 51 is 2×θ−α2 as described above, and therefore, the following expression (13) is satisfied.

$$-\omega max \leq 2\times\theta - \alpha2 \leq +\omega max \tag{13}$$

Herein, by modifying the expression (13), the expression (14) below is obtained.

$$(\alpha2-\omega max)/2 \leq \theta \leq (\alpha2+\omega max)/2 \tag{14}$$

Since the fourth condition is to prevent α1 from coinciding with θ, the conditional expression (15a) or (15b) shown below need to be satisfied.

$$\alpha1 < (\alpha2-\omega max)/2 \tag{15a}$$

$$\alpha1 > (\alpha2+\omega max)/2 \tag{15b}$$

By substituting ωmax=360/N×D into the conditional expressions (15a) and (15b), the conditional expression (16a) or (16b) below needs to be satisfied as the fourth condition.

$$\alpha2 > 2\times\alpha1 + 360/N\times D \tag{16a}$$

$$\alpha2 < 2\times\alpha1 - 360/N\times D \tag{16b}$$

Next, the fifth condition is a condition for preventing the light flux L1 from becoming return light returning to the light source along the path of the light flux L1 by the deflecting surface 54 next to the deflecting surface 51 while the light flux L2 is deflected by the deflecting surface 51 to scan.

This condition is achieved when the angles α1 and α2 are set so that the incident direction of the light flux L1 does not coincide with the normal direction of the deflecting surface 54 while the light flux L2 is deflected on the deflecting surface 51 to scan, that is, while the normal direction of the deflecting surface 51 changes from the direction H3 to the direction H4.

The angle θ' between the axis X and the normal of the deflecting surface 54 within the main scanning cross section is θ+360/N where θ is the angle between the axis X and the normal of the deflecting surface 51 within the main scanning cross section as described above.

The angle of deflection of the light flux L2 by the deflecting surface 51 is 2×θ−α2 as described above, and therefore, the expression (17) below is satisfied.

$$-\omega max \leq 2\times\theta - \alpha2 \leq +\omega max \tag{17}$$

Herein, by modifying the expression (17) with θ'=θ+360/N, the following expression (18) is obtained.

$$(\alpha2-\omega max)/2+360/N \leq \theta' \leq (\alpha2+\omega max)/2+360/N \tag{18}$$

Since the fifth condition is to prevent α1 from coinciding with θ', the conditional expression (19a) or (19b) shown below needs to be satisfied.

$$\alpha1 < (\alpha2-\omega max)/2+360/N \tag{19a}$$

$$\alpha1 > (\alpha2+\omega max)/2+360/N \tag{19b}$$

By substituting ωmax=360/N×D into the conditional expressions (19a) and (19b), the conditional expression (20a) or (20b) below needs to be satisfied as the fifth condition.

$$\alpha2 > 2\times\alpha1 - 360/N\times(2-D) \tag{20a}$$

$$\alpha2 < 2\times\alpha1 - 360/N\times(2+D) \tag{20b}$$

Next, the sixth condition is a condition for preventing the light flux L from becoming return light returning to the light source along the path of the light flux L1 by a deflecting surface while the light flux L1 is deflected by the same deflecting surface to scan.

This condition is achieved by making the light flux L1 incident on a deflecting surface at an angle larger than the outermost scanning angle +ωmax corresponding to the direction G+ toward the most off-axis image height Y+ on the scanning start side in the scanned surface.

The condition corresponds to α1>ωmax, and by substituting ωmax=360/N×D into the above conditional expression, the conditional expression (21) below needs to be satisfied as the sixth condition.

$$\alpha1 > 360/N \times D \quad (21)$$

Next, the seventh condition is a condition for preventing the light flux L2 from becoming return light returning to the light source along the path of the light flux L2 by a deflecting surface while the light flux 12 is deflected by the same deflecting surface to scan.

This condition is achieved by making the light flux L2 incident on a deflecting surface at an angle larger than the outermost scanning angle +ωmax corresponding to the direction G+ toward the most off-axis image height Y+ on the scanning start side in the scanned surface or making the light flux L2 incident on a deflecting surface at an angle smaller than the outermost scanning angle −ωmax corresponding to the direction G− toward the most off-axis image height Y− on the scanning end side in the scanned surface.

As the seventh conditions, the conditional expression (22a) or (22b) below needs to be satisfied.

$$\alpha2 > \omega max \quad (22a)$$

$$\alpha2 < -\omega max \quad (22b)$$

By substituting ωmax=360/N×D into the conditional expressions (22a) and (22b), the conditional expression (23a) or (23b) below needs to be satisfied as the seventh condition.

$$\alpha2 > 360/N \times D \quad (23a)$$

$$\alpha2 < -360/N \times D \quad (23b)$$

Next, the eighth condition is a condition for preventing the light flux L2 from becoming return light returning to the light source along the path of the light flux L1 by a deflecting surface while the light flux L1 is deflected by the same deflecting surface to scan.

This condition is achieved by making the light flux L2 incident on a deflecting surface at an angle larger than the outermost scanning angle +ωmax corresponding to the direction G+ toward the most off-axis image height Y+ on the scanning start side in the scanned surface or making the light flux L2 incident on a deflecting surface at an angle smaller than the outermost scanning angle −ωmax corresponding to the direction G− toward the most off-axis image height Y− on the scanning end side in the scanned surface.

As the eighth conditions, the conditional expression (23a) or (23b) described above needs to be satisfied.

Next, the ninth condition is a condition for preventing the light flux L1 from becoming return light returning to the light source along the path of the light flux L2 by a deflecting surface while the light flux L2 is deflected by the same deflecting surface to scan.

This condition is achieved by making the light flux L1 incident on a deflecting surface at an angle larger than the outermost scanning angle +ωmax corresponding to the direction G+ toward the most off-axis image height Y+ on the scanning start side in the scanned surface.

As the ninth conditions, the conditional expression (21) described above needs to be satisfied.

As described above, in the optical scanning apparatus 300 according to the third embodiment, by satisfying the above-described first to ninth conditions, the light flux L emitted from a single light source is split into the light fluxes L1 and L2 by the half mirror M1, which are then incident on the polygon mirror 5 at the different angles α1 and α2 and can be deflected to scan different scanned surfaces so that the scanned surfaces are printed at different timing.

By controlling differences in time when a plurality of light fluxes obtained by splitting a light flux emitted from a shared light source alternately scan each of scanned surfaces, synchronization detection and APC control, which are necessary to be performed when printing on the scanned surface is not performed, can be properly performed.

Moreover, the plurality of light fluxes obtained by splitting a light flux emitted from a shared light source cannot return to the light source, thus stabilizing the light emitting amount of the light source.

With the optical scanning apparatus 300 according to the third embodiment, in the case of using a light flux emitted from a single light source to scan a plurality of scanned surfaces, it is therefore possible to properly control the timing to emit light from the light source and the amount of emitted light.

Figure 7A:
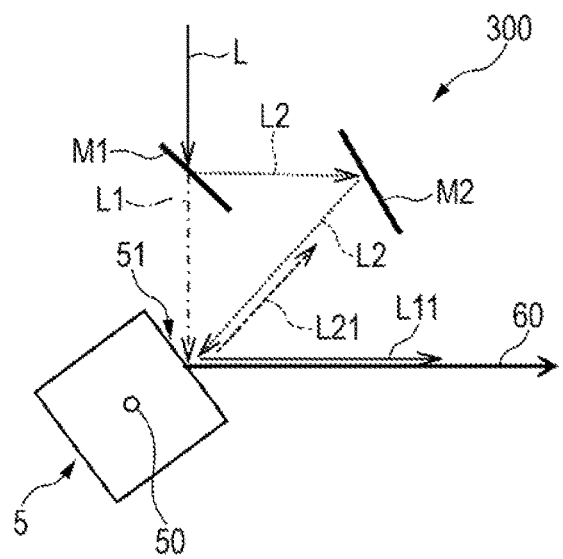
FIG. 7A is a partially-enlarged main scanning cross-section view of the optical scanning apparatus according to the third embodiment.
Figure 7B:
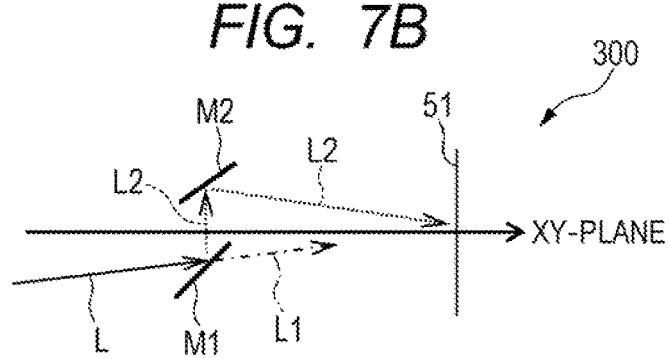
FIG. 7B is a view illustrating paths of light fluxes in the optical scanning apparatus according to the third embodiment.
Figure 7C:
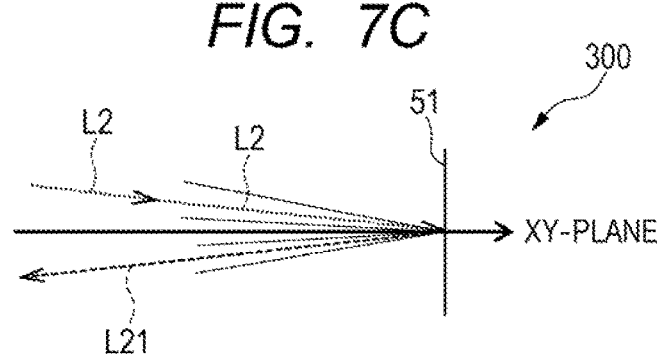
FIG. 7C is a view illustrating paths of light fluxes in the optical scanning apparatus according to the third embodiment.

FIG. 7A is a partially-enlarged main scanning cross-section view of an example of the optical scanning apparatus 300 according to the third embodiment. FIGS. 7B and 7C are views illustrating paths of light fluxes in the optical scanning apparatus 300 according to the third embodiment.

As illustrated in FIGS. 7A to 7C, the light flux L emitted from a not-illustrated light source is split into a transmitted light flux L1 and a reflected light flux L2 by the half mirror M1 as the splitting element.

The light flux L1 which has been transmitted through the half mirror M1 is incident on the deflecting surface 51 of the polygon mirror 5. The light flux L2 which has been reflected on the half mirror M1 is reflected on a folding mirror M2 to be incident on the deflecting surface 51 of the polygon mirror 5.

Herein, angles α1 and α2 between the axis X and the respective directions of incidence of the light fluxes L1 and L2 on a deflecting surface within the main scanning cross section are 90 and 45 degrees, respectively. Herein, the axis X is the optical axis 60 of the imaging lens.

Angles β1 and β2 (hereinafter, referred to as sub-scanning oblique incidence angles) are angles between the X-Y plane and the respective directions of incidence of the light fluxes L1 and L2 on a deflecting surface. The axis Y is an axis orthogonal to the optical axis 60 within the main scanning cross section.

In FIG. 7A, an angle θ between the axis X and a normal H1 of the deflecting surface 51 of the polygon mirror 5 within the main scanning cross section is 45 degrees.

At this time, the light flux L1 is deflected on the deflecting surface 51 in a direction parallel to the optical axis 60 within the main scanning cross section. On the other hand, the main scanning incidence angle α2 of the light flux L2 coincides with the normal angle θ of the deflecting surface 51. In other words, the light flux L2 faces the deflecting surface 51.

A reflected light flux L21 (as a reflection of the light flux L2 on the deflecting surface 51) returns to the light source along the incidence path of the light flux L2.

FIG. 7C illustrates the paths of the light fluxes L2 and L21. As illustrated in FIG. 7C, the light fluxes L2 and L21 include marginal rays in addition to principal rays.

Herein, if the sub-scanning oblique scanning angle β2 of the light flux L2 is large enough, the path of the light flux L21 is sufficiently separated from the path of the light flux L2. If the sub-scanning oblique scanning angle β2 of the light flux L2 is small, the path of the light flux L21 overlaps the path of the light flux L2, and some rays of the light flux L21 become return light returning to the light source along the path of the light flux L2.

Accordingly, the light flux L21 cannot become return light when β2 is set so as to satisfy |β2|>NA2. Herein, NA2 is a spread angle of the marginal rays of the light flux L2 within the sub-scanning cross section.

Actually, the angle β2 and NA2 vary due to tolerances. In the light of the tolerances, the optical scanning apparatus 300 according to the third embodiment preferably satisfies the conditional expression (24) below.

$$|\beta2|>K \times NA2 \quad (24)$$

Herein, K is a coefficient representing the degree of variation due to the tolerances of the angle β2 and NA2.

Herein, experiences show that K≤1.31 even considering degradation of wavefront aberration as the tolerance in particular.

In a similar manner, as for the light flux L1, the reflected light flux L1 (as a reflection of the light flux L1 by the deflecting surface 51) cannot become return light when β1 is set so as to satisfy |β1|>NA1. Herein, NA1 is a spread angle of the marginal rays of the light flux L1 within the sub-scanning cross section.

More preferably, β1 is set so as to satisfy the conditional expression (25) below.

$$|\beta1|>K \times NA1 \quad (25)$$

Figure 8A:
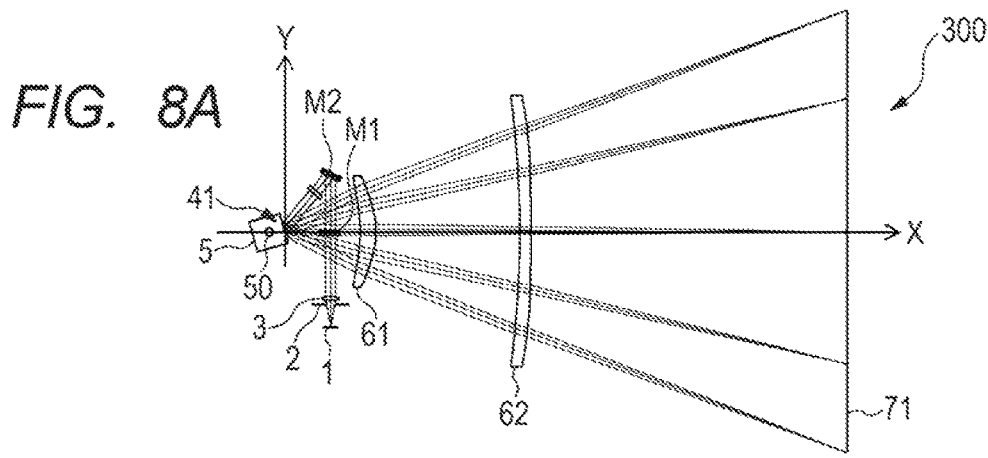
FIG. 8A is a main scanning cross-section view of the optical scanning apparatus according to the third embodiment.
Figure 8B:
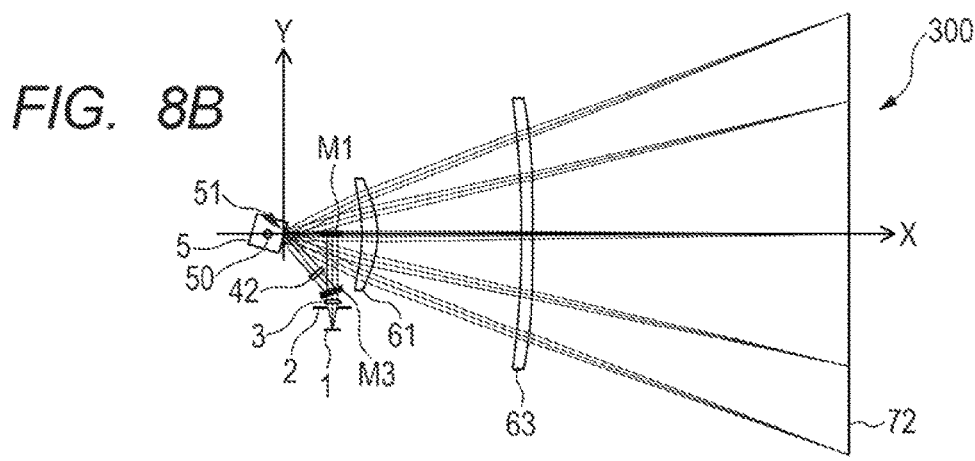
FIG. 8B is a main scanning cross-section view of the optical scanning apparatus according to the third embodiment.
Figure 8C:
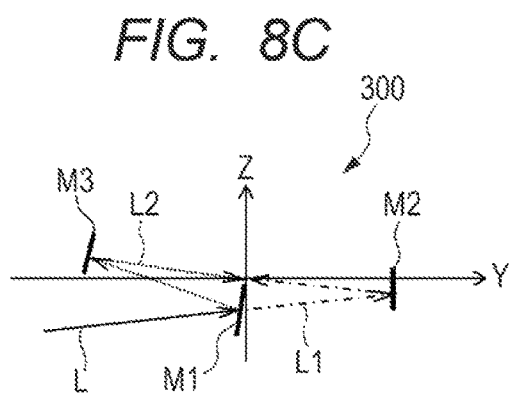
FIG. 8C is a view illustrating paths of light fluxes in the optical scanning apparatus according to the third embodiment.
Figure 8D:
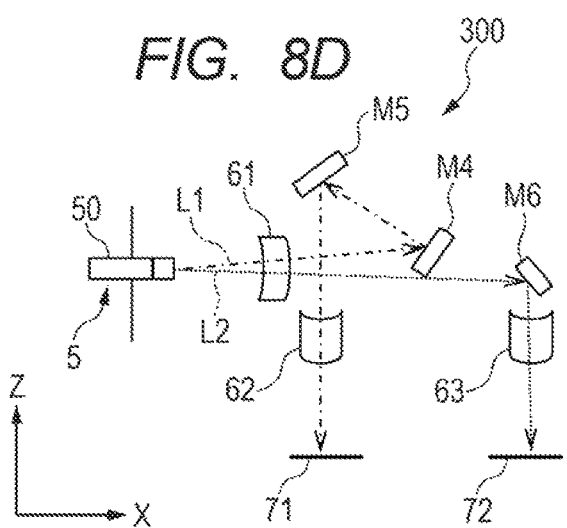
FIG. 8D is a partially-enlarged sub-scanning cross-section view of the optical scanning apparatus according to the third embodiment.

FIGS. 8A and 8B are main scanning cross-section view of the optical scanning apparatus 300 according to the third embodiment. FIG. 8C is a view illustrating paths of light fluxes in the optical, scanning apparatus 300 according to the third embodiment. FIG. 8D is a view illustrating a partially enlarged sub-scanning cross-section view of the optical scanning apparatus 300 according to the third embodiment.

FIG. 8A illustrates only the path of the light flux L1 transmitted through the half mirror M1, not illustrating the folding mirror M3 and cylinder lens 42. FIG. 8B illustrates only the path of the light flux L2 reflected on the half mirror M1, not illustrating the folding mirror M2 and cylinder lens 41.

The optical scanning apparatus 300 includes a light source 1, a stop 2, a condensing lens 3, the cylinder lenses 41 and 42, the half mirror M1 as the splitting element, and folding mirrors M2 and M3. The optical scanning apparatus 300 further includes a polygon mirror 5 as the deflecting unit, a first imaging lens 61, second imaging lenses 62 and 63, and folding mirrors M4, M5, and M6.

In the optical scanning apparatus 300 according to the third embodiment, the same members as those of the optical scanning apparatus 100 according to the first embodiment are given the same reference numerals, and the description thereof is omitted.

The light fluxes L1 and L2 which are obtained by splitting a light flux emitted from the light source 1 are condensed only in the sub-scanning direction near the deflecting surface 51 of the polygon mirror 5 to form a line image long in the main scanning direction.

The stop 2, condensing lens 3, cylinder lenses 41 and 42, half mirror M1, and folding mirrors M2 and M3 constitute an incidence optical system of the optical scanning apparatus 300 according to the third embodiment.

The rectangular opening of the stop 2 according to the third embodiment has a size of 5.60 mm in the main scanning direction×0.76 mm in the sub-scanning direction.

The first imaging lens 61, second imaging lenses 62 and 63, and folding mirrors M4, M5, and M6 constitute an imaging optical system of the optical scanning apparatus 300 according to the third embodiment.

The light flux L emitted from the light source 1 is limited in light flux diameter in the main scanning and sub-scanning directions by the stop 2 and is then converted into a light flux substantially collimated both in the main scanning and sub-scanning directions by the condensing lens 3 to be split into a transmitted light flux L1 and a reflected light flux L2 by the half mirror M1.

The transmitted light flux L1 and reflected light flux L2 are respectively reflected on the folding mirrors M2 and M3 and condensed in the sub-scanning direction by the cylinder lenses 41 and 42 to be incident on the deflecting surface 51 of the polygon mirror 5.

The light fluxes L1 and L2 which have been incident on the deflecting surface 51 of the polygon mirror 5 are reflected/deflected on the deflecting surface 51 of the polygon mirror 5 and are then respectively focused on the scanned surfaces 71 and 72 by the first imaging lens 61, second imaging lenses 62 and 63, and folding mirrors M4, M5, and M6.

In such a manner, spot-like images are formed near the scanned surfaces 71 and 72 both in the main scanning cross section and sub-scanning cross section. When the polygon mirror 5 is rotated at constant speed, the scanned surfaces 71 and 72 can be subjected to uniform scanning.

The first imaging lens 61 and second imaging lenses 62 and 63 of the optical scanning apparatus 300 according to the third embodiment are made of resin. Lenses made of resin are manufactured by such a known molding technique in which resin is filled into a mold, cooled, and then taken out of the mold. The resin lenses are manufactured at lower cost than conventional imaging lenses such as glass lenses.

As illustrated in FIG. 8C, the optical scanning apparatus 300 according to the third embodiment employs a so-called sub-scanning oblique incidence optical system, in which the light fluxes L1 and L2 are incident on a deflecting surface 51 of the polygon mirror 5 at an angle β from below and above in the sub-scanning direction, respectively. Hereinafter, the angle β is sometimes referred to as a sub-scanning oblique incidence angle.

As illustrated in FIG. 8D, therefore the paths of the light fluxes L1 and L2 having passed through the first imaging lens 61 can be separated by the folding mirror M4.

Next, characteristics of the optical, scanning apparatus 300 according to the third embodiment are shown in Tables 11 to 1.6 below.

TABLE 11

| | |
|---|---|
| Number of surfaces of polygon mirror 5 | 4 |
| Angle α1 between light flux L1 and optical axis 60 (deg.) | 50 |
| Angle α2 between light flux L2 and optical axis 60 (deg.) | −50 |
| Most off-axis image height Y+ (mm) | 150 |
| Most off-axis image height Y− (mm) | −150 |
| Fθ coefficient | 318.31 |
| D | 30% |
| Sub-scanning oblique scanning angle β1 of light flux L1 (deg.) | 1.8 |
| Sub-scanning oblique scanning angle β2 of light flux L2 (deg.) | −1.8 |
| NA1 | 1.65 |
| NA2 | 1.65 |

TABLE 12

|  | Surface number | R | X | Y | Z | gx(x) | gx(y) | gx(z) |
|---|---|---|---|---|---|---|---|---|
| Light source 1 | 1 | 0.000 | 32.036 | −65.242 | −10.357 | 0.000 | 0.996 | 0.084 |
| Cover glass | 2 | 0.000 | 32.036 | −64.993 | −10.336 | 0.000 | 0.996 | 0.084 |
| Stop 2 | 3 | 0.000 | 32.036 | −49.498 | −9.035 | 0.000 | 0.996 | 0.084 |
| Incident surface of condensing lens 3 | 4 | 0.000 | 32.036 | −46.977 | −8.823 | 0.000 | 0.996 | 0.084 |
| Exit surface of condensing lens 3 | 5 | aspherical | 32.036 | −43.987 | −8.572 | 0.000 | 0.996 | 0.084 |
| Half mirror M1 | 6 | 0.000 | 32.036 | 0.000 | −4.878 | 0.000 | −0.999 | 0.039 |
| Folding mirror M2 | 7 | 0.000 | 32.036 | 39.389 | −1.571 | 0.342 | 0.939 | 0.028 |
| Incident surface of cylinder lens 41 | 8 | aspherical | 22.399 | 27.904 | −1.099 | 0.642 | 0.766 | −0.031 |
| Exit surface of cylinder lens 41 | 9 | 0.000 | 20.472 | 25.607 | −1.005 | 0.642 | 0.766 | −0.031 |
| Deflecting surface of polygon mirror 5 | 10 | 0.000 | −0.663 | 2.988 | 0.000 | 0.906 | 0.423 | 0.000 |
| Incident surface of first imaging lens 61 | 11 | aspherical | 52.000 | 0.000 | 0.000 | 1.000 | 0.000 | 0.000 |
| Exit surface of first imaging lens 61 | 12 | aspherical | 62.500 | 0.000 | 0.000 | 1.000 | 0.000 | 0.000 |
| Incident surface of second imaging lens 62 | 13 | aspherical | 160.500 | 0.000 | 2.653 | 1.000 | 0.000 | 0.000 |
| Exit surface of second imaging lens 62 | 14 | aspherical | 168.000 | 0.000 | 2.653 | 1.000 | 0.000 | 0.000 |
| Scanned surface 71 | 15 | 0.000 | 382.000 | 0.000 | 2.653 | 1.000 | 0.000 | 0.000 |

TABLE 13

| | Exit surface of condensing lens 3 (surface number 5) |
|---|---|---|---|---|---|
| Ryu | Kyu | b2u | b4u | b6u | b8u | b10u |
| −1.52E+01 | 0.00E+00 | 0.00E+00 | 2.49E−05 | 0.00E+00 | 0.00E+00 | 0.00E+00 |
| Ryl | Kyl | b2l | b4l | b6l | b8l | b10l |
| −1.52E+01 | 0.00E+00 | 0.00E+00 | 2.49E−05 | 0.00E+00 | 0.00E+00 | 0.00E+00 |
| r |  | d2u | d4u | d6u | d8u | d10u |
| −1.52E+01 |  | 0.00E+00 | 2.49E−05 | 0.00E+00 | 0.00E+00 | 0.00E+00 |
|  |  | d2l | d4l | d6l | d8l | d10l |
|  |  | 0.00E+00 | 2.49E−05 | 0.00E+00 | 0.00E+00 | 0.00E+00 |
| | Incident surface of cylinder lens 41 (surface number 8) |
| Ryu | Kyu | b2u | b4u | b6u | b8u | b10u |
| 0.00E+00 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| 0.00E+00 | 0.00E+00 | 0.00E+00 | 0.00E+00 | 0.00E+00 | 0.00E+00 | 0.00E+00 |
| r |  | d2u | d4u | d6u | d8u | d10u |
| 1.77E+01 |  | 0.00E+00 | 0.00E+00 | 0.00E+00 | 0.00E+00 | 0.00E+00 |
|  |  | d2l | d4l | d6l | d8l | d10l |
|  |  | 0.00E+00 | 0.00E+00 | 0.00E+00 | 0.00E+00 | 0.00E+00 |
| | Incident surface of first imaging lens 61 (surface number 11) |
| Ryu | Kyu | b2u | b4u | b6u | b8u | b10u |
| −1.02E+02 | 9.46E−01 | 0.00E+00 | 1.28E−06 | 6.83E−11 | 0.00E+00 | 0.00E+00 |
| Ryl | Kyl | b2l | b4l | b6l | b8l | b10l |
| −1.02E+02 | 9.46E−01 | 0.00E+00 | 1.28E−06 | 6.83E−11 | 0.00E+00 | 0.00E+00 |
| r |  | d2u | d4u | d6u | d8u | d10u |
| −1.17E+03 |  | 0.00E+00 | 0.00E+00 | 0.00E+00 | 0.00E+00 | 0.00E+00 |
|  |  | d2l | d4l | d6l | d8l | d10l |
|  |  | 0.00E+00 | 0.00E+00 | 0.00E+00 | 0.00E+00 | 0.00E+00 |
| | Exit surface of first imaging lens 61 (surface number 12) |
| Ryu | Kyu | b2u | b4u | b6u | b8u | b10u |
| −6.27E+01 | 7.31E+05 | 0.00E+00 | 1.65E−07 | 2.34E−10 | 0.00E+00 | 0.00E+00 |
| Ryl | Kyl | b2l | b4l | b6l | b8l | b10l |
| −6.27E+01 | 7.31E+05 | 0.00E+00 | 1.65E−07 | 2.34E−10 | 0.00E+00 | 0.00E+00 |
| r |  | d2u | d4u | d6u | d8u | d10u |
| −1.17E+03 |  | 0.00E+00 | 0.00E+00 | 0.00E+00 | 0.00E+00 | 0.00E+00 |
|  |  | d2l | d4l | d6l | d8l | d10l |
|  |  | 0.00E+00 | 0.00E+00 | 0.00E+00 | 0.00E+00 | 0.00E+00 |
| | Incident surface of second imaging lens 62 (surface number 13) |
| Ryu | Kyu | b2u | b4u | b6u | b8u | b10u |
| −7.08E+02 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| −7.08E+02 | 0.00E+00 | 0.00E+00 | 0.00E+00 | 0.00E+00 | 0.00E+00 | 0.00E+00 |
| r |  | d2u | d4u | d6u | d8u | d10u |
| 1.66E+02 |  | 2.42E−04 | 6.84E−08 | −2.43E−11 | 6.53E−15 | 0.00E+00 |
|  |  | d2l | d4l | d6l | d8l | d10l |
|  |  | −9.56E−05 | 8.62E−08 | −1.40E−11 | 7.17E−16 | 0.00E+00 |
| | Exit surface of second imaging lens 62 (surface number 14) |
| Ryu | Kyu | b2u | b4u | b6u | b8u | b10u |
| −6.29E+03 | 6.25E+01 | 0.00E+00 | −1.26E−07 | 8.51E−12 | −5.16E−16 | 1.85E−20 |
| Ryl | Kyl | b2l | b4l | b6l | b8l | b10l |
| −6.28E+03 | 4.45E+01 | 0.00E+00 | −1.19E−07 | 8.07E−12 | −5.61E−16 | 2.48E−20 |

TABLE 13-continued

| r | d2u | d4u | d6u | d8u | d10u |
|---|---|---|---|---|---|
| −6.71E+01 | −6.78E−05 | 1.91E−08 | −3.81E−12 | 2.94E−16 | 0.00E+00 |
|  | d2l | d4l | d6l | d8l | d10l |
|  | 8.71E−05 | −4.38E−08 | 8.23E−12 | −5.33E−16 | 0.00E+00 |

TABLE 14

|  | Surface number | R | X | Y | Z | gx(x) | gx(y) | gx(z) |
|---|---|---|---|---|---|---|---|---|
| Light source 1 | 1 | 0.000 | 32.036 | −65.242 | −10.357 | 0.000 | −0.996 | −0.084 |
| Cover glass | 2 | 0.000 | 32.036 | −64.993 | −10.336 | 0.000 | −0.996 | −0.084 |
| Stop 2 | 3 | 0.000 | 32.036 | −49.498 | −9.035 | 0.000 | −0.996 | −0.084 |
| Incident surface of condensing lens 3 | 4 | 0.000 | 32.036 | −46.977 | −8.823 | 0.000 | −0.996 | −0.084 |
| Exit surface of condensing lens 3 | 5 | aspherical | 32.036 | −43.987 | −8.572 | 0.000 | −0.996 | −0.084 |
| Half mirror M1 | 6 | 0.000 | 32.036 | 0.000 | −4.878 | 0.000 | −0.999 | 0.039 |
| Folding mirror M3 | 7 | 0.000 | 32.036 | −39.389 | 1.571 | 0.342 | −0.934 | 0.103 |
| Incident surface of cylinder lens 42 | 8 | aspherical | 22.399 | −27.904 | 1.099 | 0.642 | −0.766 | 0.031 |
| Exit surface of cylinder lens 42 | 9 | 0.000 | 20.472 | −25.607 | 1.005 | 0.642 | −0.766 | 0.031 |
| Deflecting surface of polygon mirror 5 | 10 | 0.000 | −0.663 | −2.988 | 0.000 | 0.906 | −0.423 | 0.000 |
| Incident surface of first imaging lens 61 | 11 | aspherical | 52.000 | 0.000 | 0.000 | 1.000 | 0.000 | 0.000 |
| Exit surface of first imaging lens 61 | 12 | aspherical | 62.500 | 0.000 | 0.000 | 1.000 | 0.000 | 0.000 |
| Incident surface of second imaging lens 63 | 13 | aspherical | 160.500 | 0.000 | −2.653 | 1.000 | 0.000 | 0.000 |
| Exit surface of second imaging lens 63 | 14 | aspherical | 168.000 | 0.000 | −2.653 | 1.000 | 0.000 | 0.000 |
| Scanned surface 72 | 15 | 0.000 | 382.000 | 0.000 | −2.653 | 1.000 | 0.000 | 0.000 |

TABLE 15

Exit surface of condensing lens 3 (surface number 5)

| Ryu | Kyu | b2u | b4u | b6u | b8u | b10u |
|---|---|---|---|---|---|---|
| −1.52E+01 | 0.00E+00 | 0.00E+00 | 2.49E−05 | 0.00E+00 | 0.00E+00 | 0.00E+00 |
| Ryl | Kyl | b2l | b4l | b6l | b8l | b10l |
| −1.52E+01 | 0.00E+00 | 0.00E+00 | 2.49E−05 | 0.00E+00 | 0.00E+00 | 0.00E+00 |
| r |  | d2u | d4u | d6u | d8u | d10u |
| −1.52E+01 |  | 0.00E+00 | 2.49E−05 | 0.00E+00 | 0.00E+00 | 0.00E+00 |
|  |  | d2l | d4l | d6l | d8l | d10l |
|  |  | 0.00E+00 | 2.49E−05 | 0.00E+00 | 0.00E+00 | 0.00E+00 |

Incident surface of cylinder lens 42 (surface number 8)

| Ryu | Kyu | b2u | b4u | b6u | b8u | b10u |
|---|---|---|---|---|---|---|
| 0.00E+00 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| 0.00E+00 | 0.00E+00 | 0.00E+00 | 0.00E+00 | 0.00E+00 | 0.00E+00 | 0.00E+00 |
| r |  | d2u | d4u | d6u | d8u | d10u |
| 1.77E+01 |  | 0. 00E+00 | 0.00E+00 | 0.00E+00 | 0.00E+00 | 0.00E+00 |
|  |  | d2l | d4l | d6l | d8l | d10l |
|  |  | 0.00E+00 | 0.00E+00 | 0.00E+00 | 0.00E+00 | 0.00E+00 |

Incident surface of first imaging lens 61 (surface number 11)

| Ryu | Kyu | b2u | b4u | b6u | b8u | b10u |
|---|---|---|---|---|---|---|
| −1.02E+02 | 9.46E−01 | 0.00E+00 | 1.28E−06 | 6.83E−11 | 0.00E+00 | 0.00E+00 |
| Ryl | Kyl | b2l | b4l | b6l | b8l | b10l |
| −1.02E+02 | 9.46E−01 | 0.00E+00 | 1.28E−06 | 6.83E−11 | 0.00E+00 | 0.00E+00 |
| r |  | d2u | d4u | d6u | d8u | d10u |
| −1.17E+03 |  | 0.00E+00 | 0.00E+00 | 0.00E+00 | 0.00E+00 | 0.00E+00 |
|  |  | d2l | d4l | d6l | d8l | d10l |
|  |  | 0.00E+00 | 0.00E+00 | 0.00E+00 | 0.00E+00 | 0.00E+00 |

Exit surface of first imaging lens 61 (surface number 12)

| Ryu | Kyu | b2u | b4u | b6u | b8u | b10u |
|---|---|---|---|---|---|---|
| −6.27E+01 | 7.31E+05 | 0.00E+00 | 1.65E−07 | 2.34E−10 | 0.00E+00 | 0.00E+00 |
| Ryl | Kyl | b2l | b4l | b6l | b8l | b10l |
| −6.27E+01 | 7.31E+05 | 0.00E+00 | 1.65E−07 | 2.34E−10 | 0.00E+00 | 0.00E+00 |
| r |  | d2u | d4u | d6u | d8u | d10u |
| −1.17E+03 |  | 0.00E+00 | 0.00E+00 | 0.00E+00 | 0.00E+00 | 0.00E+00 |
|  |  | d2l | d4l | d6l | d8l | d10l |
|  |  | 0.00E+00 | 0.00E+00 | 0.00E+00 | 0.00E+00 | 0.00E+00 |

Incident surface of second imaging lens 63 (surface number 13)

| Ryu | Kyu | b2u | b4u | b6u | b8u | b10u |
|---|---|---|---|---|---|---|
| −7.08E+02 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| −7.08E+02 | 0.00E+00 | 0.00E+00 | 0.00E+00 | 0.00E+00 | 0.00E+00 | 0.00E+00 |

TABLE 15-continued

| r | d2u | d4u | d6u | d8u | d10u |
|---|---|---|---|---|---|
| 1.66E+02 | −9.56E−05 | 8.62E−08 | −1.40E−11 | 7.17E−16 | 0.00E+00 |
| | d2l | d4l | d6l | d8l | d10l |
| | 2.42E−04 | 6.84E−08 | −2.43E−11 | 6.53E−15 | 0.00E+00 |
| Exit surface of second imaging lens 63 (surface number 14) | | | | | |

| Ryu | Kyu | b2u | b4u | b6u | b8u | b10u |
|---|---|---|---|---|---|---|
| −6.26E+03 | −2.54+03 | 0.00E+00 | −1.19E−07 | 8.07E−12 | −5.61E−16 | 2.48E−20 |
| Ryl | Kyl | b2l | b4l | b6l | b8l | b10l |
| −6.26E+03 | −3.51E+04 | 0.00E+00 | −1.26E−07 | 8.51E−12 | −5.16E−16 | 1.85E−20 |
| r | | d2u | d4u | d6u | d8u | d10u |
| −6.71E+01 | | 8.71E−05 | −4.38E−08 | 8.23E−12 | −5.33E−16 | 0.00E+00 |
| | | d2l | d4l | d6l | d8l | d10l |
| | | −6.78E−05 | 1.91E−08 | −3.81E−12 | 2.94E−16 | 0.00E+00 |

TABLE 16

| Conditional Expression | Left side of equation | Right side of equation |
|---|---|---|
| $\alpha 1 > \alpha 2$ | 50.0 | −50.0 |
| Conditional Expression (6): | −50.0 | −4.0 |
| $\alpha 2 \leq \alpha 1 - 2 \times 360/N \times D$ | | |
| Conditional Expression (8): | −50.0 | −76.0 |
| $\alpha 2 \geq \alpha 1 - 2 \times 360/N \times (1 - D)$ | | |
| Conditional Expression (12a): | −50.0 | 11.5 |
| $\alpha 2 < (\alpha 1 - 360/N \times D)/2$ | | |
| Conditional Expression (12b): | −50.0 | 38.5 |
| $\alpha 2 > (\alpha 1 + 360/N \times D)/2$ | | |
| Conditional Expression (16a): | −50.0 | 127.0 |
| $\alpha 2 > 2 \times \alpha 1 + 360/N \times D$ | | |
| Conditional Expression (16b): | −50.0 | 73.0 |
| $\alpha 2 < 2 \times \alpha 1 - 360/N \times D$ | | |
| Conditional Expression (20a): | −50.0 | −53.0 |
| $\alpha 2 > 2 \times \alpha 1 - 360/N \times (2 - D)$ | | |
| Conditional Expression (20b): | −50.0 | −107.0 |
| $\alpha 2 > 2 \times \alpha 1 - 360/N \times (2 + D)$ | | |
| Conditional Expression (21): | 50.0 | 27.0 |
| $\alpha 1 > 360/N \times D$ | | |
| Conditional Expression (23a): | −50.0 | 27.0 |
| $\alpha 2 > 360/N \times D$ | | |
| Conditional Expression (23b): | −50.0 | −27.0 |
| $\alpha 2 < 360/N \times D$ | | |

In Tables 13 and 15, "E-x" means "$\times 10^{-x}$".

In the followings, the axes X, Y, and Z are set to the optical axis of the first imaging lens 61, the axis orthogonal to the optical axis within the main scanning cross section, and an axis orthogonal to the optical axis within the sub-scanning cross section, respectively.

In Table 12, R indicates a curvature radius of each surface. X, Y, and Z indicate coordinates of the surface vertex of each surface, and gx(x), gx(y), and gx(z) indicate components of a normal vector at the surface vertex of each surface.

As shown in Table 11, in the optical scanning apparatus 300 according to the third embodiment, angles α1 and α2, which are angles between the axis X and the directions of incidence of the light fluxes L1 and L2 on the deflecting surface within the main scanning cross section, are 50 and −50 degrees, respectively.

As shown in Table 11, in the optical scanning apparatus 300 according to the third embodiment, angles β1 and β2, which are angles between the X-Y plane and the directions of incidence of the light fluxes L1 and L2 on the deflecting surface, are 1.8 and −1.8 degrees, respectively.

In the optical scanning apparatus 300 according to the third embodiment, an angle β0, which is an angle between the X-Y plane and the direction of incidence of the light flux L emitted from the light source 1 on the half mirror M1, is 4.8 degrees.

The half mirror M1 and folding mirrors M2 and M3 are properly arranged so that the aforementioned angles are implemented.

The meridional line shapes of the incident and exit surfaces of each lens in the optical scanning apparatus 300 of the third embodiment are aspheric shapes which are expressed by a 10th or lower order function like the expression (1) described above.

Sagittal line shapes of the incident and exit surfaces of each lens in the optical scanning apparatus 300 of the third embodiment are aspheric shapes which are expressed by the expression (2) described above.

The meridional and sagittal line shapes of each lens surface may be defined by other functions instead of the expressions (1) and (2).

As illustrated in Tables 12 to 15, the lens surface of the first imaging lens 61 having a power mainly within the main scanning cross section has an aspheric profile expressed by the above-described functions.

The first imaging lens 61 is a convex meniscus lens which has a large power within the main scanning cross section and has a non-circular surface profile within the main scanning cross section. The concave surface of the first imaging lens 61 faces the polygon mirror 5.

The profile of the first imaging lens 61 within the main scanning cross section is symmetric with respect to the optical axis.

The shape of the imaging lens 61 has substantially no power since the incident and exit surfaces of the lens 61 have an identical curvature within the sub-scanning cross section. The first imaging lens 61 may have a cylindrical profile with both the incident and exit surfaces flat in the sub-scanning direction, for example.

The first imaging lens 61 plays a role of focusing the incident light flux mainly in the main scanning direction.

On the other hand, the second imaging lenses 62 and 63 are anamorphic lenses having a power mainly within the sub-scanning cross section as shown in Tables 12 to 15.

The lens surfaces of the second imaging lenses 62 and 63 have aspheric shapes expressed by the aforementioned functions.

The second imaging lenses 62 and 63 have a larger power within the sub-scanning cross section than that within the main scanning cross section. The incident surface thereof has a circular shape within the main scanning cross section, and the other surface has a non-circular shape.

The shape of each of the second imaging lenses 62 and 63 within the main scanning cross section is asymmetric with respect to the optical axis. The second imaging lenses 62 and 63 have substantially no power within the main scanning direction near the optical axis.

On the other hand, the incident and exit surfaces of each of the second imaging lenses 62 and 63 have convex shapes within the sub-scanning cross section with the curvature gradually changing from the on-axis toward the off-axis and are asymmetric with respect to the optical axis.

The second imaging lenses 62 and 63 mainly play a role of focusing the incident light flux in the sub-scanning direction and correcting distortion in the main scanning direction.

As shown in Tables 12 to 15, the second imaging lenses 62 and 63 are rotationally symmetric about the optical axis.

The first imaging lens 61 and second imaging lenses 62 and 63 compensate facet angle error by forming a conjugate relation between the vicinity of the deflecting surface 51 of the polygon mirror 5 and the respective vicinities of the scanned surfaces 71 and 72 within the sub-scanning cross section.

As shown in Table 16, the optical scanning apparatus 300 according to the third embodiment satisfies all of the first to ninth conditions, that is, the conditional expressions (6), (8), (12a) or (12b), (16a) or (16b), (20a) or (20b), (21), and (23a) or (23b).

As described above, in the optical scanning apparatus 300 according to the third embodiment, which satisfies the first to ninth conditions, the light flux L emitted from a single light source is split into the light fluxes L1 and L2 by the half mirror M1, which are then incident on the polygon mirror 5 at the different angles α1 and α2 and are deflected to scan different scanned surfaces so that the scanned surfaces are printed at different timings.

By controlling differences in time when a plurality of light fluxes obtained by splitting a light flux emitted from a shared light source alternately scan each of scanned surfaces, synchronization detection and APC control, which are necessary to be performed when printing on the scanned surface is not performed, can be properly performed.

Synchronization detection and APC control, which are desirably performed at the timing when there is no return light to the light source 1, are performed when the normal angle θ of the deflecting surface 51 is not equal to α1, α2, and (α1+α2)/2.

This can prevent a plurality of light fluxes obtained by splitting a light flux emitted from a shared light source from returning to the light source, thus stabilizing the light emitting amount of the light source.

With the optical scanning apparatus 300 according to the third embodiment, it is therefore possible to properly control the timing to emit light from the light source and the light emitting amount of the light source in the case of using a light flux emitted from a single light source to scan a plurality of scanned surfaces.

In the optical scanning apparatus 300 according to the third embodiment, the light source 1 emits a single light flux. However, the light source 1 is not limited to such a configuration. The light source 1 may be an edge emitter-type monolithic laser or a VCSEL emitting a plurality of light fluxes from a plurality of light emitting points, for example. The plurality of light fluxes emitted from the light source 1 may be split into a plurality of transmitted light fluxes and a plurality of reflected light fluxes by the half mirror M1 to be guided to different scanned surfaces.

In the optical scanning apparatus 300 according to the third embodiment, the half mirror M1 is used as the splitting element. The splitting element is not limited to the half mirror M1. The splitting element may be a polarizing beam splitter to split a light flux into a P-polarized light flux and an S-polarized light flux or a diffraction optical element to split a light flux into light fluxes having different orders of diffraction, which can give the same effect. The half mirror M1 may have a bulk shape like a prism instead of the plate-like shape.

Fourth Embodiment

Figure 9A:
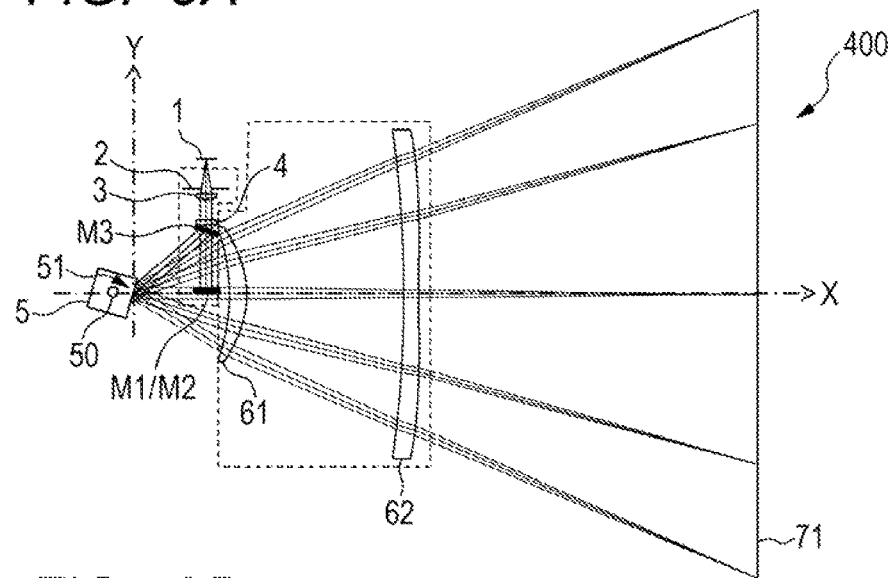
FIG. 9A is a main scanning cross-section view of an optical scanning apparatus according to a fourth embodiment.
Figure 9B:
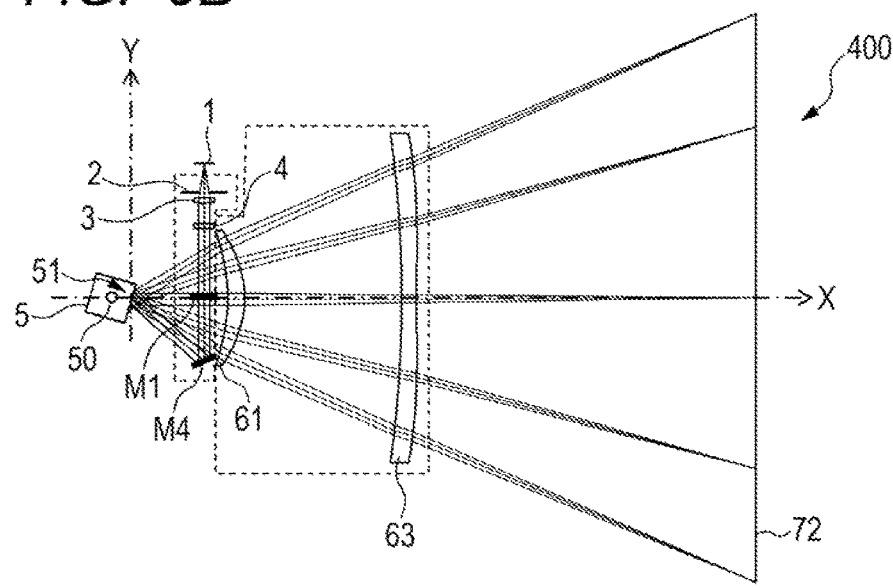
FIG. 9B is a main scanning cross-section view of the optical scanning apparatus according to the fourth embodiment.
Figure 9C:
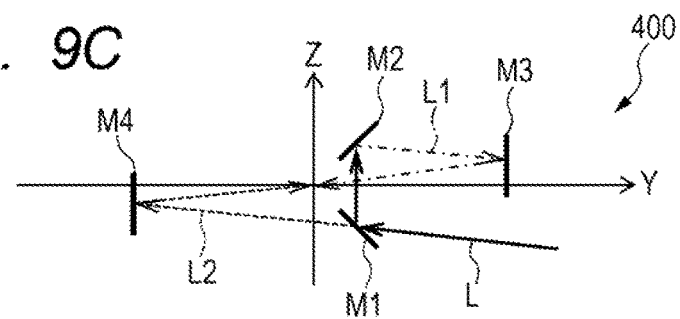
FIG. 9C is a view illustrating paths of light fluxes in the optical scanning apparatus according to the fourth embodiment.

FIGS. 9A and 9B illustrate main scanning cross-section views of an optical scanning apparatus 400 according to a fourth embodiment. FIG. 9C is a view illustrating paths of light fluxes in the optical scanning apparatus 400 according to the fourth embodiment.

FIG. 9A illustrates only the path of the light flux L1 reflected on the half mirror M1, not illustrating the folding mirror M4. FIG. 9B illustrates only the path of the light flux L2 transmitted through the half mirror M1, not illustrating the folding mirror M2 and M3.

The optical scanning apparatus 400 includes a light source 1, a stop 2, a condensing lens 3, a cylinder lens 4, a half mirror M1 as the splitting element, and folding mirrors M2, M3, and M4. The optical scanning apparatus 400 further includes a polygon mirror 5 as the deflecting unit, a first imaging lens 61, second imaging lenses 62 and 63, and folding mirrors M5, M6, and M7 not illustrated.

The stop 2, condensing lens 3, cylinder lens 4, half mirror M1, and folding mirrors M2, M3, and M4 constitute an incidence optical system of the optical scanning apparatus 400 according to the fourth embodiment.

The first imaging lens 61, second imaging lenses 62 and 63, and folding mirrors M5, M6, and M7 constitute an imaging optical system of the optical scanning apparatus 400 according to the fourth embodiment.

The light flux L emitted from the light source 1 is limited in diameter in the main scanning and sub-scanning directions by the stop 2 and is then converted into a light flux substantially collimated both in the main scanning and sub-scanning directions by the condensing lens 3 to be condensed by the cylinder lens 4 in the sub-scanning direction.

The light flux L having passed through the cylinder lens 4 is split by the half mirror M1 into a reflected light flux L1 and a transmitted light flux L2.

The reflected light flux L1 is reflected on the folding mirrors M2 and M3 to be incident on the deflecting surface 51 of the polygon mirror 5. On the other hand, the transmitted light flux L2 is reflected on the folding mirror M4 to be incident on the deflecting surface 51 of the polygon mirror 5.

The light fluxes L1 and L2 which have been incident on the deflecting surface 51 of the polygon mirror 5 are reflected/deflected on the deflecting surface 51 of the polygon mirror 5 and are then respectively focused on the scanned surfaces 71 and 72 by the first imaging lens 61, second imaging lenses 62 and 63, and folding mirrors M5, M6, and M7.

In such a manner, spot-like images are formed near the scanned surfaces 71 and 72 both within the main scanning cross section and sub-scanning cross section. When the polygon mirror 5 is rotated at constant speed, the scanned surfaces 71 and 72 can be subjected to uniform scanning.

The rectangular opening of the stop 2 according to the fourth embodiment has a size of 4.80 mm in the main scanning direction×2.20 mm in the sub-scanning direction.

Next, characteristics of the optical scanning apparatus 400 according to the fourth embodiment are shown in Tables 17 to 22 below.

TABLE 17

| | |
|---|---|
| Diameter of polygon mirror 5 (mm) | 20 |
| Number of surfaces of polygon mirror 5 | 4 |
| Angle α1 between light flux L1 and optical axis 60 (deg.) | 41 |
| Angle α2 between light flux L2 and optical axis 60 (deg.) | −41 |
| Most off-axis image height Y+ (mm) | 150 |
| Most off-axis image height Y− (mm) | −150 |
| Fθ coefficient | 282.84 |
| D | 35% |

TABLE 17-continued

| | |
|---|---|
| Sub-scanning oblique scanning angle β1 of light flux L1 (deg.) | −3.0 |
| Sub-scanning oblique scanning angle β2 of light flux L2 (deg.) | 3.0 |
| NA1 | 1.31 |
| NA2 | 1.31 |

TABLE 18

| | Surface number | R | X | Y | Z | gx(x) | gx(y) | gx(z) |
|---|---|---|---|---|---|---|---|---|
| Light source 1 | 1 | 0.000 | 37.657 | 71.482 | −8.112 | 0.000 | −0.999 | 0.052 |
| Cover glass | 2 | 0.000 | 37.657 | 71.232 | −8.099 | 0.000 | −0.999 | 0.052 |
| Stop 2 | 3 | 0.000 | 37.657 | 55.703 | −7.285 | 0.000 | −0.999 | 0.052 |
| Incident surface of condensing lens 3 | 4 | 0.000 | 37.657 | 53.177 | −7.153 | 0.000 | −0.999 | 0.052 |
| Exit surface of condensing lens 3 | 5 | aspherical | 37.657 | 50.181 | −6.996 | 0.000 | −0.999 | 0.052 |
| Incident surface of cylinder lens 4 | 6 | aspherical | 37.657 | 39.526 | −6.437 | 0.000 | −0.999 | 0.052 |
| Exit surface of cylinder lens 4 | 7 | 0.000 | 37.657 | 36.530 | −6.280 | 0.000 | −0.999 | 0.052 |
| Half mirror M1 | 8 | 0.000 | 37.657 | 0.000 | 0.000 | 0.000 | 0.707 | 0.707 |
| Folding mirror M2 | 9 | 0.000 | 37.657 | 0.000 | 0.000 | 0.000 | 0.707 | −0.707 |
| Folding mirror M3 | 10 | 0.000 | 37.657 | 33.374 | 2.617 | −0.415 | −0.910 | 0.000 |
| Deflecting surface of polygon mirror 5 | 11 | 0.000 | −0.448 | 2.476 | 0.000 | 0.937 | 0.350 | 0.000 |
| Incident surface of first imaging lens 61 | 12 | aspherical | 50.000 | 0.000 | 0.000 | 1.000 | 0.000 | 0.000 |
| Exit surface of first imaging lens 61 | 13 | aspherical | 59.000 | 0.000 | 0.000 | 1.000 | 0.000 | 0.000 |
| Incident surface of second imaging lens 62 | 14 | aspherical | 141.700 | 0.000 | −3.851 | 1.000 | 0.000 | 0.000 |
| Exit surface of second imaging lens 62 | 15 | aspherical | 149.700 | 0.000 | −3.851 | 1.000 | 0.000 | 0.000 |
| Scanned surface 71 | 16 | 0.000 | 328.100 | 0.000 | −3.851 | 1.000 | 0.000 | 0.000 |

TABLE 19

Exit surface of condensing lens 3 (surface number 5)

| Ryu | Kyu | b2u | b4u | b6u | b8u | b10u |
|---|---|---|---|---|---|---|
| −1.52E+01 | 0.00E+00 | 0.00E+00 | 2.45E−05 | 0.00E+00 | 0.00E+00 | 0.00E+00 |
| Ryl | Kyl | b2l | b4l | b6l | b8l | b10l |
| −1.52E+01 | 0.00E+00 | 0.00E+00 | 2.45E−05 | 0.00E+00 | 0.00E+00 | 0.00E+00 |
| r | | d2u | d4u | d6u | d8u | d10u |
| −1.52E+01 | | 0.00E+00 | 2.45E−05 | 0.00E+00 | 0.00E+00 | 0.00E+00 |
| | | d2l | d4l | d6l | d8l | d10l |
| | | 0.00E+00 | 2.45E−05 | 0.00E+00 | 0.00E+00 | 0.00E+00 |

Incident surface of cylinder lens 4 (surface number 6)

| Ryu | Kyu | b2u | b4u | b6u | b8u | b10u |
|---|---|---|---|---|---|---|
| 0.00E+00 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| 0.00E+00 | 0.00E+00 | 0.00E+00 | 0.00E+00 | 0.00E+00 | 0.00E+00 | 0.00E+00 |
| r | | d2u | d4u | d6u | d8u | d10u |
| 6.33E+01 | | 0.00E+00 | 0.00E+00 | 0.00E+00 | 0.00E+00 | 0.00E+00 |
| | | d2l | d4l | d6l | d8l | d10l |
| | | 0.00E+00 | 0.00E+00 | 0.00E+00 | 0.00E+00 | 0.00E+00 |

Incident surface of first imaging lens 61 (surface number 12)

| Ryu | Kyu | b2u | b4u | b6u | b8u | b10u |
|---|---|---|---|---|---|---|
| −8.93E+01 | 1.64E+00 | 0.00E+00 | 7.99E−07 | 2.25E−10 | 0.00E−00 | 0.00E+00 |
| Ryl | Kyl | b2l | b4l | b6l | b8l | b10l |
| −8.93E+01 | 1.64E+00 | 0.00E+00 | 7.99E−07 | 2.25E−10 | 0.00E+00 | 0.00E+00 |
| r | | d2u | d4u | d6u | d8u | d10u |
| −1.00E+03 | | 0.00E+00 | 0.00E+00 | 0.00E+00 | 0.00E+00 | 0.00E+00 |
| | | d2l | d4l | d6l | d8l | d10l |
| | | 0.00E+00 | 0.00E+00 | 0.00E+00 | 0.00E+00 | 0.00E+00 |

Exit surface of first imaging lens 61 (surface number 13)

| Ryu | Kyu | b2u | b4u | b6u | b8u | b10u |
|---|---|---|---|---|---|---|
| −5.26E+01 | −8.61E−01 | 0.00E+00 | 1.80E−08 | 1.83E−10 | 0.00E+00 | 0.00E+00 |
| Ryl | Kyl | b2l | b4l | b6l | b8l | b10l |
| −5.26E+01 | −8.61E−01 | 0.00E+00 | 1.80E−08 | 1.83E−10 | 0.00E+00 | 0.00E+00 |
| r | | d2u | d4u | d6u | d8u | d10u |
| −1.00E+03 | | 0.00E+00 | 0.00E+00 | 0.00E+00 | 0.00E+00 | 0.00E+00 |
| | | d2l | d4l | d6l | d8l | d10l |
| | | 0.00E+00 | 0.00E+00 | 0.00E+00 | 0.00E+00 | 0.00E+00 |

TABLE 19-continued

Incident surface of second imaging lens 62 (surface number 14)

| Ryu | Kyu | b2u | b4u | b6U | b8U | b10u |
|---|---|---|---|---|---|---|
| −6.50E+02 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| −6.50E+02 | 0.00E+00 | 0.00E+00 | 0.00E+00 | 0.00E+00 | 0.00E+00 | 0.00E+00 |
| r | | d2u | d4u | d6u | d8u | d10u |
| 9.57E+01 | | 1.37E−04 | 3.73E−08 | −2.06E−11 | 2.39E−15 | 0.00E+00 |
| | | d2l | d4l | d6l | d8l | d10l |
| | | 4.19E−05 | −1.00E−03 | −2.22E−12 | 6.26E−16 | 0.00E+00 |

Exit surface of second imaging lens 62 (surface number 15)

| Ryu | Kyu | b2u | b4u | b6u | b8u | b10u |
|---|---|---|---|---|---|---|
| 1.85E+03 | −6.47E+02 | 0.00E+00 | −1.52E−07 | 6.89E−12 | −1.23E−17 | −1.38E−20 |
| Ryl | Kyl | b2l | b4l | b6l | b8l | b10l |
| 1.85E+03 | −5.79E+02 | 0.00E+00 | −1.55E−07 | 7.95E−12 | −2.06E−16 | −1.36E−21 |
| r | | d2u | d4u | d6u | d8u | d10u |
| −7.24E+01 | | −5.32E−05 | 8.64E−09 | 1.42E−12 | −2.89E−16 | 0.00E+00 |
| | | d2l | d4l | d6l | d8l | d10l |
| | | 4.72E−05 | −9.63E−09 | 5.26E−12 | −7.04E−16 | 0.00E+00 |

TABLE 20

| | Surface number | R | X | Y | Z | gx(x) | gx(y) | gx(z) |
|---|---|---|---|---|---|---|---|---|
| Light source 1 | 1 | 0.000 | 37.657 | 71.482 | −8.112 | 0.000 | −0.999 | 0.052 |
| Cover glass | 2 | 0.000 | 37.657 | 71.232 | −8.099 | 0.000 | −0.999 | 0.052 |
| Stop 2 | 3 | 0.000 | 37.657 | 55.703 | −7.285 | 0.000 | −0.999 | 0.052 |
| Incident surface of condensing lens 3 | 4 | 0.000 | 37.657 | 53.177 | −7.153 | 0.000 | −0.999 | 0.052 |
| Exit surface of condensing lens 3 | 5 | aspherical | 37.657 | 50.181 | −6.996 | 0.000 | −0.999 | 0.052 |
| Incident surface of cylinder lens 4 | 6 | aspherical | 37.657 | 39.526 | −6.437 | 0.000 | −0.999 | 0.052 |
| Exit surface of cylinder lens 4 | 7 | 0.000 | 37.657 | 36.530 | −6.280 | 0.000 | −0.999 | 0.052 |
| Half mirror M1 | 8 | 0.000 | 37.657 | 0.000 | 0.000 | 0.000 | 0.707 | 0.707 |
| Folding mirror M4 | 9 | 0.000 | 37.657 | 0.000 | 0.000 | 0.000 | 0.707 | −0.707 |
| Deflecting surface of polygon mirror 5 | 11 | 0.000 | −0.448 | 2.476 | 0.000 | 0.937 | 0.350 | 0.000 |
| Incident surface of first imaging lens 61 | 12 | aspherical | 50.000 | 0.000 | 0.000 | 1.000 | 0.000 | 0.000 |
| Exit surface of first imaging lens 61 | 13 | aspherical | 59.000 | 0.000 | 0.000 | 1.000 | 0.000 | 0.000 |
| Incident surface of second imaging lens 63 | 14 | aspherical | 141.700 | 0.000 | 3.851 | 1.000 | 0.000 | 0.000 |
| Exit surface of second imaging lens 63 | 15 | aspherical | 149.700 | 0.000 | 3.851 | 1.000 | 0.000 | 0.000 |
| Scanned surface 72 | 16 | 0.000 | 328.100 | 0.000 | 3.851 | 1.000 | 0.000 | 0.000 |

TABLE 21

Exit surface of condensing lens 3 (surface number 5)

| Ryu | Kyu | b2u | b4u | b6u | b8u | b10u |
|---|---|---|---|---|---|---|
| −1.52E+01 | 0.00E+00 | 0.00E+00 | 2.45E−05 | 0.00E+00 | 0.00E+00 | 0.00E+00 |
| Ryl | Kyl | b2l | b4l | b6l | b8l | b10l |
| −1.52E+01 | 0.00E+00 | 0.00E+00 | 2.45E−05 | 0.00E+00 | 0.00E+00 | 0.00E+00 |
| r | | d2u | d4u | d6u | d8u | d10u |
| −1.52E+01 | | 0.00E+00 | 2.45E−05 | 0.00E+00 | 0.00E+00 | 0.00E+00 |
| | | d2l | d4l | d6l | d8l | d10l |
| | | 0.00E+00 | 2.45E−05 | 0.00E+00 | 0.00E+00 | 0.00E+00 |

Incident surface of cylinder lens 4 (surface number 6)

| Ryu | Kyu | b2u | b4u | b6u | b8u | b10u |
|---|---|---|---|---|---|---|
| 0.00E+00 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| 0.00E+00 | 0.00E+00 | 0.00E+00 | 0.00E+00 | 0.00E+00 | 0.00E+00 | 0.00E+00 |
| r | | d2u | d4u | d6u | d8u | d10u |
| 6.33E+01 | | 0.00E+00 | 0.00E+00 | 0.00E+00 | 0.00E+00 | 0.00E+00 |
| | | d2l | d4l | d6l | d8l | d10l |
| | | 0.00E+00 | 0.00E+00 | 0.00E+00 | 0.00E+00 | 0.00E+00 |

Incident surface of first imaging lens 61 (surface number 12)

| Ryu | Kyu | b2u | b4u | b6u | b8u | b10u |
|---|---|---|---|---|---|---|
| −8.93E+01 | 1.64E+00 | 0.00E+00 | 7.99E−07 | 2.25E−10 | 0.00E−00 | 0.00E+00 |
| Ryl | Kyl | b2l | b4l | b6l | b8l | b10l |
| −8.93E+01 | 1.64E+00 | 0.00E+00 | 7.99E−07 | 2.25E−10 | 0.00E+00 | 0.00E+00 |
| r | | d2u | d4u | d6u | d8u | d10u |
| −1.00E+03 | | 0.00E+00 | 0.00E+00 | 0.00E+00 | 0.00E+00 | 0.00E+00 |
| | | d2l | d4l | d6l | d8l | d10l |
| | | 0.00E+00 | 0.00E+00 | 0.00E+00 | 0.00E+00 | 0.00E+00 |

TABLE 21-continued

Exit surface of first imaging lens 61 (surface number 13)

| Ryu | Kyu | b2u | b4u | b6u | b8u | b10u |
|---|---|---|---|---|---|---|
| −5.26E+01 | −8.61E−01 | 0.00E+00 | 1.80E−08 | 1.83E−10 | 0.00E+00 | 0.00E+00 |
| Ryl | Kyl | b2l | b4l | b6l | b8l | b10l |
| −5.26E+01 | −8.61E−01 | 0.00E+00 | 1.80E−08 | 1.83E−10 | 0.00E+00 | 0.00E+00 |
| r | | d2u | d4u | d6u | d8u | d10u |
| −1.00E+03 | | 0.00E+00 | 0.00E+00 | 0.00E+00 | 0.00E+00 | 0.00E+00 |
| | | d2l | d4l | d6l | d8l | d10l |
| | | 0.00E+00 | 0.00E+00 | 0.00E+00 | 0.00E+00 | 0.00E+00 |

Incident surface of second imaging lens 63 (surface number 14)

| Ryu | Kyu | b2u | b4u | b6u | b8u | b10u |
|---|---|---|---|---|---|---|
| −6.50E+02 | 0.00E+00 | 0.00E+00 | 0.00E+00 | 0.00E+00 | 0.00E+00 | 0.00E+00 |
| Ryl | Kyl | b2l | b4l | b6l | b8l | b10l |
| −6.50E+02 | 0.00E+00 | 0.00E+00 | 0.00E+00 | 0.00E+00 | 0.00E+00 | 0.00E+00 |
| r | | d2u | d4u | d6u | d8u | d10u |
| 9.57E+01 | | 4.19E−05 | −1.00E−08 | −2.22E−12 | 6.26E−16 | 0.00E+00 |
| | | d2l | d4l | d6l | d8l | d10l |
| | | 1.37E−04 | 3.73E−08 | −2.06E−11 | 2.39E−15 | 0.00E+00 |

Exit surface of second imaging lens 63 (surface number 15)

| Ryu | Kyu | b2u | b4u | b6u | b8u | b10u |
|---|---|---|---|---|---|---|
| 1.85E+03 | −5.79E+02 | 0.00E+00 | −1.55E−07 | 7.95E−12 | −2.06E−16 | −1.36E−21 |
| Ryl | Kyl | b2l | b4l | b6l | b8l | b10l |
| 1.85E+03 | −6.47E+02 | 0.00E+00 | −1.52E−07 | 6.89E−12 | −1.23E−17 | −1.38E−20 |
| r | | d2u | d4u | d6u | d8u | d10u |
| −7.24E+01 | | 4.72E−05 | −9.63E−09 | 5.26E−12 | −7.04E−16 | 0.00E+00 |
| | | d2l | d4l | d6l | d8l | d10l |
| | | −5.32E−05 | 8.64E−09 | 1.42E−12 | −2.89E−16 | 0.00E+00 |

TABLE 22

| Conditional Expression | Left side of equation | Right side of equation |
|---|---|---|
| $\alpha 1 > \alpha 2$ | 41.0 | −41.0 |
| Conditional Expression (6):<br>$\alpha 2 \leq \alpha 1 - 2 \times 360/N \times D$ | −41.0 | −22.0 |
| Conditional Expression (8):<br>$\alpha 2 \geq \alpha 1 - 2 \times 360/N \times (1 - D)$ | −41.0 | −76.0 |
| Conditional Expression (12a):<br>$\alpha 2 < (\alpha 1 - 360/N \times D)/2$ | −41.0 | 4.8 |
| Conditional Expression (12b):<br>$\alpha 2 > (\alpha 1 + 360/N \times D)/2$ | −41.0 | 36.3 |
| Conditional Expression (16a):<br>$\alpha 2 > 2 \times \alpha 1 + 360/N \times D$ | −41.0 | 113.5 |
| Conditional Expression (16b):<br>$\alpha 2 < 2 \times \alpha 1 - 360/N \times D$ | −41.0 | 50.5 |
| Conditional Expression (20a):<br>$\alpha 2 > 2 \times \alpha 1 - 360/N \times (2 - D)$ | −41.0 | −66.5 |
| Conditional Expression (20b):<br>$\alpha 2 < 2 \times \alpha 1 - 360/N \times (2 + D)$ | −41.0 | −129.5 |
| Conditional Expression (21):<br>$\alpha 1 > 360/N \times D$ | 41.0 | 31.5 |
| Conditional Expression (23a):<br>$\alpha 2 > 360/N \times D$ | −41.0 | 31.5 |
| Conditional Expression (23b):<br>$\alpha 2 < -360/N \times D$ | −41.0 | −31.5 |

In Tables 19 and 21, "E-x" means "$\times 10^{-x}$".

In the followings, the axes X, Y, and Z are set to the optical axis of the first imaging lens 61, the axis orthogonal to the optical axis within the main scanning cross section, and an axis orthogonal to the optical axis within the sub-scanning cross section, respectively.

In Table 18, R indicates a curvature radius of each surface. X, Y, and Z indicate coordinates of the surface vertex of each surface, and gx(x), gx(y), and gx(z) indicate components of a normal vector at the surface vertex of each surface.

As shown in Table 17, in the optical scanning apparatus 400 according to the fourth embodiment, angles α1 and α2, which are angles between the axis X and the directions of incidence of the light fluxes L1 and L2 on the deflecting surface within the main scanning cross section, are 41 and −43 degrees, respectively.

As shown in Table 17, in the optical scanning apparatus 400 according to the fourth embodiment, angles β1 and β2, which are angles between the X-Y plane and the directions of incidence of the light fluxes L1 and L2 on the deflecting surface, are −3.0 and 3.0 degrees, respectively.

In the optical scanning apparatus 400 according to the fourth embodiment, an angle β0, which is an angle between the X-Y plane and the direction of incidence of the light flux L emitted from the light source 1 on the half mirror M1, is 3.0 degrees.

The half mirror M1 and folding mirrors M2 and M3 are properly arranged so that the aforementioned angles are implemented.

As shown in Table 22, the optical scanning apparatus 400 according to the fourth embodiment satisfies all of the first to ninth conditions, that is, the conditional expressions (6), (8), (12a) or (12b), (16a) or (16b), (20a) or (20b), (21), and (23a) or (23b).

As described above, in the optical scanning apparatus 400 according to the fourth embodiment, which satisfies the first to ninth conditions, the light flux L emitted from a single light source is split into the light fluxes L1 and L2 by the half mirror M1, which are then incident on the polygon mirror 5 at the angles α1 and α2 different from each other and can be deflected to scan different scanned surfaces so that the scanned surfaces are printed at different timings.

By controlling differences in time when a plurality of light fluxes obtained by splitting a light flux emitted from a shared light source alternately scan each of the scanned surfaces, synchronization detection and APC control, which are necessary to be performed when printing on the scanned surface is not performed, can be properly performed.

Synchronization detection and APC control, which are desirably performed at the timing when there is no return light to the light source 1, are performed when the normal angle θ of the deflecting surface 51 is not equal to α1, α2, and (α1+α2)/2.

This can prevent a plurality of light fluxes obtained by splitting a light flux emitted from a shared light source from returning to the light source, thus stabilizing the light emitting amount of the light source.

With the optical scanning apparatus 400 according to the fourth embodiment, in the case of using a light flux emitted from a single light source to scan a plurality of scanned surfaces, it is therefore possible to properly control the timing to emit light from the light source and the light emitting amount of the light source.

Various Embodiments

Tables 23 to 28 show the characteristics of optical scanning apparatuses according to various embodiments and the results of calculation of the conditional expressions (6), (8), (12a) or (12b), (16a) or (16b), (20a) or (20b), (21), and (23a) or (23b).

Each of the optical scanning apparatuses according to the various embodiments includes the same configuration as that of the optical scanning apparatus 300 according to the third embodiment or the optical scanning apparatus 400 according to the fourth embodiment.

Among the characteristics, Tables 23 to 28 show only the number of surfaces of the polygon mirror 5, the main scanning incidence angles α1 and α2 of the light fluxes L1 and L2, and ratio D of the print scanning angle to the full scanning angle.

As shown in Tables 23 to 28, the optical scanning apparatuses according to the various embodiments satisfy all of the first to ninth conditions, that is, the conditional expressions (6), (8), (12a) or (12b), (16a) or (16b), (20a) or (20b), (21), and (23a) or (23b).

TABLE 23

| Number of surfaces of polygon mirror 5 | | 4 |
|---|---|---|
| Angle α1 between light flux L1 and optical axis 60 (deg.) | | 80 |
| Angle α2 between light flux L2 and optical axis 60 (deg.) | | −50 |
| D | | 25% |

| Conditional Expression | Left side of equation | Right side of equation |
|---|---|---|
| α1 > α2 | 80.0 | −50.0 |
| Conditional Expression (6): <br> α2 ≤ α1 − 2 × 360/N × D | −50.0 | 35.0 |
| Conditional Expression (8): <br> α2 ≥ α1 − 2 × 360/N × (1 − D) | −50.0 | −55.0 |
| Conditional Expression (12a): <br> α2 < (α1 − 360/N × D)/2 | −50.0 | 28.8 |
| Conditional Expression (12b): <br> α2 > (α1 + 360/N × D)/2 | −50.0 | 51.3 |
| Conditional Expression (16a): <br> α2 > 2 × α1 + 360/N × D | −50.0 | 182.5 |
| Conditional Expression (16b): <br> α2 < 2 × α1 − 360/N × D | −50.0 | 137.5 |
| Conditional Expression (20a): <br> α2 > 2 × α1 − 360/N × (2 − D) | −50.0 | 2.5 |
| Conditional Expression (20b): <br> α2 < 2 × α1 − 360/N × (2 + D) | −50.0 | −42.5 |
| Conditional Expression (21): <br> α1 > 360/N × D | 80.0 | 22.5 |
| Conditional Expression (23a): <br> α2 > 360/N × D | −50.0 | 22.5 |
| Conditional Expression (23b): <br> α2 < −360/N × D | −50.0 | −22.5 |

TABLE 24

| Number of surfaces of polygon mirror 5 | | 4 |
|---|---|---|
| Angle α1 between light flux L1 and optical axis 60 (deg.) | | 90 |
| Angle α2 between light flux L2 and optical axis 60 (deg.) | | −30 |
| D | | 30% |

| Conditional Expression | Left side of equation | Right side of equation |
|---|---|---|
| α1 > α2 | 90.0 | −30.0 |
| Conditional Expression (6): <br> α2 ≤ α1 − 2 × 360/N × D | −30.0 | 36.0 |
| Conditional Expression (8): <br> α2 ≥ α1 − 2 × 360/N × (1 − D) | −30.0 | −36.0 |
| Conditional Expression (12a): <br> α2 < (α1 − 360/N × D)/2 | −30.0 | 31.5 |
| Conditional Expression (12b): <br> α2 > (α1 + 360/N × D)/2 | −30.0 | 58.5 |
| Conditional Expression (16a): <br> α2 > 2 × α1 + 360/N × D | −30.0 | 207.0 |
| Conditional Expression (16b): <br> α2 < 2 × α1 − 360/N × D | −30.0 | 153.0 |
| Conditional Expression (20a): <br> α2 > 2 × α1 − 360/N × (2 − D) | −30.0 | 27.0 |
| Conditional Expression (20b): <br> α2 < 2 × α1 − 360/N × (2 + D) | −30.0 | −27.0 |
| Conditional Expression (21): <br> α1 > 360/N × D | 90.0 | 27.0 |
| Conditional Expression (23a): <br> α2 > 360/N × D | −30.0 | 27.0 |
| Conditional Expression (23b): <br> α2 < −360/N × D | −30.0 | −27.0 |

TABLE 25

| Number of surfaces of polygon mirror 5 | | 5 |
|---|---|---|
| Angle α1 between light flux L1 and optical axis 60 (deg.) | | 70 |
| Angle α2 between light flux L2 and optical axis 60 (deg.) | | 25 |
| D | | 25% |

| Conditional Expression | Left side of equation | Right side of equation |
|---|---|---|
| α1 > α2 | 70.0 | 25.0 |
| Conditional Expression (6): <br> α2 ≤ α1 − 2 × 360/N × D | 25.0 | 34.0 |
| Conditional Expression (8): <br> α2 ≥ α1 − 2 × 360/N × (1 − D) | 25.0 | −38.0 |
| Conditional Expression (12a): <br> α2 < (α1 − 360/N × D)/2 | 25.0 | 26.0 |
| Conditional Expression (12b): <br> α2 > (α1 + 360/N × D)/2 | 25.0 | 44.0 |
| Conditional Expression (16a): <br> α2 > 2 × α1 + 360/N × D | 25.0 | 158.0 |
| Conditional Expression (16b): <br> α2 < 2 × α1 − 360/N × D | 25.0 | 122.0 |
| Conditional Expression (20a): <br> α2 > 2 × α1 − 360/N × (2 − D) | 25.0 | 14.0 |
| Conditional Expression (20b): <br> α2 < 2 × α1 − 360/N × (2 + D) | 25.0 | −22.0 |
| Conditional Expression (21): <br> α1 > 360/N × D | 70.0 | 18.0 |
| Conditional Expression (23a): <br> α2 > 360/N × D | 25.0 | 18.0 |
| Conditional Expression (23b): <br> α2 < −360/N × D | 25.0 | −18.0 |

TABLE 26

| | |
|---|---|
| Number of surfaces of polygon mirror 5 | 5 |
| Angle α1 between light flux L1 and optical axis 60 (deg.) | 40 |
| Angle α2 between light flux L2 and optical axis 60 (deg.) | −40 |
| D | 30% |

| Conditional Expression | Left side of equation | Right side of equation |
|---|---|---|
| α1 > α2 | 40.0 | −40.0 |
| Conditional Expression (6): <br> α2 ≤ α1 − 2 × 360/N × D | −40.0 | −3.2 |
| Conditional Expression (8): <br> α2 ≥ α1 − 2 × 360/N × (1 − D) | −40.0 | −60.8 |
| Conditional Expression (12a): <br> α2 < (α1 − 360/N × D)/2 | −40.0 | 9.2 |
| Conditional Expression (12b): <br> α2 > (α1 + 360/N × D)/2 | −40.0 | 30.8 |
| Conditional Expression (16a): <br> α2 > 2 × α1 + 360/N × D | −40.0 | 101.6 |
| Conditional Expression (16b): <br> α2 < 2 × α1 − 360/N × D | −40.0 | 58.4 |
| Conditional Expression (20a): <br> α2 > 2 × α1 − 360/N × (2 − D) | −40.0 | −42.4 |
| Conditional Expression (20b): <br> α2 < 2 × α1 − 360/N × (2 + D) | −40.0 | −85.6 |
| Conditional Expression (21): <br> α1 > 360/N × D | 40.0 | 21.6 |
| Conditional Expression (23a): <br> α2 > 360/N × D | −40.0 | 21.6 |
| Conditional Expression (23b): <br> α2 < −360/N × D | −40.0 | −21.6 |

TABLE 27

| | |
|---|---|
| Number of surfaces of polygon mirror 5 | 6 |
| Angle α1 between light flux L1 and optical axis 60 (deg.) | 90 |
| Angle α2 between light flux L2 and optical axis 60 (deg.) | 25 |
| D | 35% |

| Conditional Expression | Left side of equation | Right side of equation |
|---|---|---|
| α1 > α2 | 90.0 | 25.0 |
| Conditional Expression (6): <br> α2 ≤ α1 − 2 × 360/N × D | 25.0 | 48.0 |
| Conditional Expression (8): <br> α2 ≥ α1 − 2 × 360/N × (1 − D) | 25.0 | 12.0 |
| Conditional Expression (12a): <br> α2 < (α1 − 360/N × D)/2 | 25.0 | 34.5 |
| Conditional Expression (12b): <br> α2 > (α1 + 360/N × D)/2 | 25.0 | 55.5 |
| Conditional Expression (16a): <br> α2 > 2 × α1 + 360/N × D | 25.0 | 201.0 |
| Conditional Expression (16b): <br> α2 < 2 × α1 − 360/N × D | 25.0 | 159.0 |
| Conditional Expression (20a): <br> α2 > 2 × α1 − 360/N × (2 − D) | 25.0 | 81.0 |
| Conditional Expression (20b): <br> α2 < 2 × α1 − 360/N × (2 + D) | 25.0 | 39.0 |
| Conditional Expression (21): <br> α1 > 360/N × D | 90.0 | 21.0 |
| Conditional Expression (23a): <br> α2 > 360/N × D | 25.0 | 21.0 |
| Conditional Expression (23b): <br> α2 < −360/N × D | 25.0 | −21.0 |

TABLE 28

| | |
|---|---|
| Number of surfaces of polygon mirror 5 | 6 |
| Angle α1 between light flux L1 and optical axis 60 (deg.) | 34 |
| Angle α2 between light flux L2 and optical axis 60 (deg.) | −34 |
| D | 25% |

| Conditional Expression | Left side of equation | Right side of equation |
|---|---|---|
| α1 > α2 | 34.0 | −34.0 |
| Conditional Expression (6): <br> α2 ≤ α1 − 2 × 360/N × D | −34.0 | 4.0 |
| Conditional Expression (8): <br> α2 ≥ α1 − 2 × 360/N × (1 − D) | −34.0 | −56.0 |
| Conditional Expression (12a): <br> α2 < (α1 − 360/N × D)/2 | −34.0 | 9.5 |
| Conditional Expression (12b): <br> α2 > (α1 + 360/N × D)/2 | −34.0 | 24.5 |
| Conditional Expression (16a): <br> α2 > 2 × α1 + 360/N × D | −34.0 | 83.0 |
| Conditional Expression (16b): <br> α2 < 2 × α1 − 360/N × D | −34.0 | 53.0 |
| Conditional Expression (20a): <br> α2 > 2 × α1 − 360/N × (2 − D) | −34.0 | −37.0 |
| Conditional Expression (20b): <br> α2 < 2 × α1 − 360/N × (2 + D) | −34.0 | −67.0 |
| Conditional Expression (21): <br> α1 > 360/N × D | 34.0 | 15.0 |
| Conditional Expression (23a): <br> α2 > 360/N × D | −34.0 | 15.0 |
| Conditional Expression (23b): <br> α2 < −360/N × D | −34.0 | −15.0 |

(Image Forming Apparatus)

Figure 11:
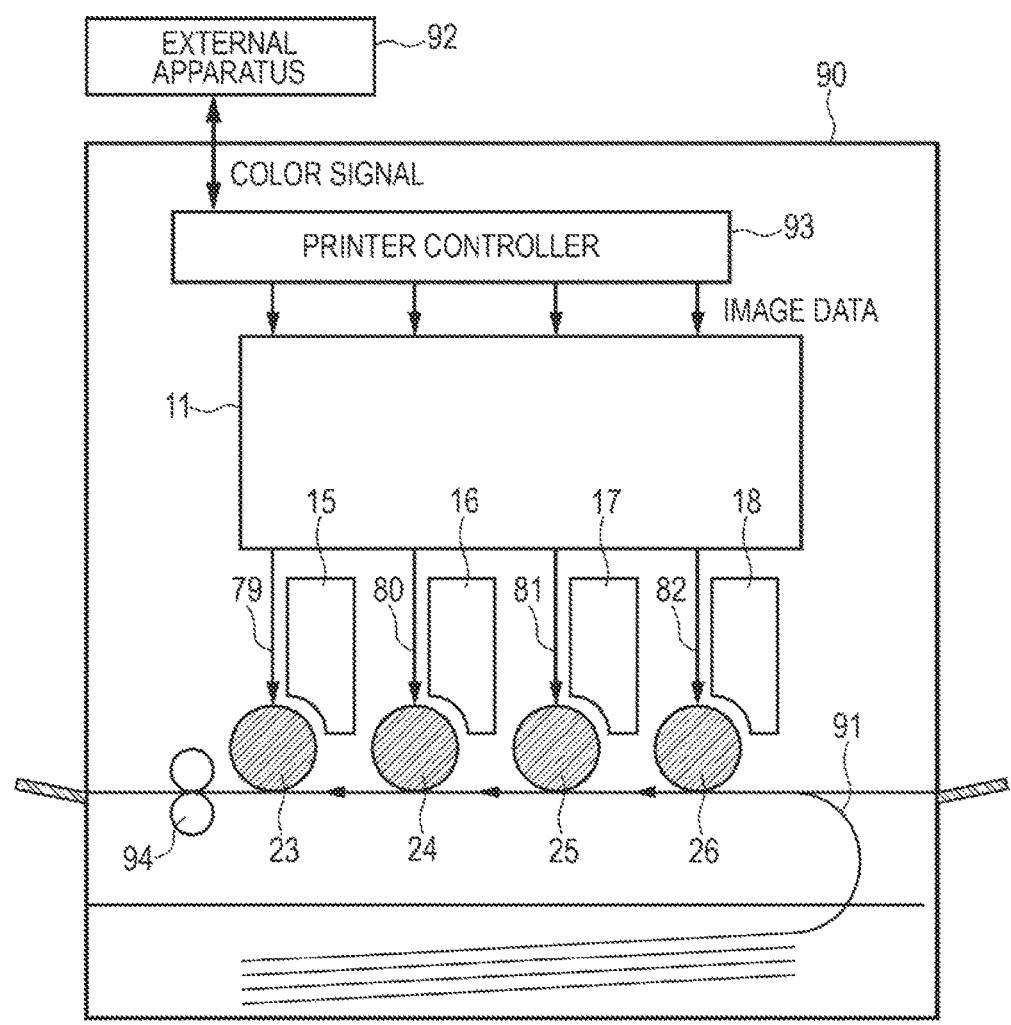
FIG. 11 is a sub-scanning cross-section view of a main portion of a color image forming apparatus including the optical scanning apparatus according to each embodiment of the present invention.

FIG. 11 illustrates a sub-scanning cross-section view of a main portion of a color image forming apparatus 90 including the optical scanning apparatus according to the aforementioned embodiments.

The image forming apparatus 90 is a tandem-type color image forming apparatus which records image information on a surface of each photosensitive drum as an image bearing member using the optical scanning apparatus.

The image forming apparatus 90 includes an optical scanning apparatus 11 according to the above-described embodiments, photosensitive drums 23, 24, 25, and 26 as the image bearing member, developing units 15, 16, 17, and 18, a conveyance belt 91, a printer controller 93, and a fixing unit 94.

The image forming apparatus 90 receives color signals (code data) of R (red), G (green), and B (blue) output from an external apparatus 92 such as a personal computer. These color signals are converted to image data (dot data) of C (cyan), M (magenta), Y (yellow), and K (black) by the printer controller 93 within the image forming apparatus 90. These image data is input to the optical scanning apparatus 11. The optical scanning apparatus 11 emits light fluxes 79, 80, 81, and 82 modulated according to the image data. The light fluxes 79, 80, 81, and 82 scan photosensitive surfaces of the photosensitive drums 23, 24, 25, and 26 in a main scanning direction, respectively.

On the photosensitive surfaces of the photosensitive drums 23, 24, 25, and 26, electrostatic latent images of the respective colors are formed by the light fluxes 79, 80, 81, and 82 which are emitted based on the corresponding image data by the optical scanning apparatus 11, respectively. Thereafter, the formed electrostatic latent images are developed into toner images of the respective colors by the developing units 15 to 18, respectively. The developed toner images of the respective colors are transferred and superimposed on a transferred material by a transferring unit. The transferred toner images are fixed by the fixing unit 94, thus forming a full-color image.

In the image forming apparatus 90, the optical scanning apparatus 11 records the image signals (image information) on the photosensitive surfaces of the photosensitive drums 23, 24, 25, and 26 corresponding to the respective colors of C, M, Y, and K for high speed printing of color images.

The external apparatus 92 may be a color image reading apparatus including a CCD sensor, for example. In this case, the color image reading apparatus and color image forming apparatus 90 constitute a color digital copier.

The recording density of the image forming apparatus according to the embodiment is not particularly limited. The higher the recording density, the higher the required image quality. In the light of such a requirement for higher quality, the effect of the present invention is exerted more when the optical scanning apparatus according to the aforementioned embodiments is mounted on image forming apparatuses of 1200 dpi or more.

According to the present invention, it is possible to provide an optical scanning apparatus in which differences between field curvatures on respective scanned surfaces scanned by a plurality of light fluxes obtained by splitting a light flux from a shared light source can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-077749, filed Apr. 8, 2016, and Japanese Patent Application No. 2016-077750, filed Apr. 8, 2016, which are hereby incorporated by reference herein in their entirety.

What is claimed is:

1. An optical scanning apparatus, comprising:
   a splitting element which splits a light flux emitted from a light source into first and second light fluxes;
   a deflecting unit which deflects the first and second light fluxes to scan first and second scanned surfaces in a main scanning direction; and
   an imaging optical system which includes a first imaging lens on which both the first and second light fluxes deflected by the deflecting unit are incident and guides the first and second light fluxes to the first and second scanned surfaces, respectively, wherein
   the condition expressed by $-1.1 \leq \alpha1/\alpha2 \leq -0.9$ is satisfied where $\alpha1$ and $\alpha2$ are angles within a main scanning cross section between a first axis parallel to the main scanning cross section and directions of incidence of the first and second light fluxes on the deflecting unit, respectively.

2. The optical scanning apparatus according to claim 1, wherein the first axis is an optical axis of the first imaging lens.

3. The optical scanning apparatus according to claim 2, wherein the first imaging lens has a symmetrical shape with respect to the optical axis in the main scanning direction.

4. The optical scanning apparatus according to claim 1, wherein the optical scanning apparatus satisfies $\beta1 = -\beta2$ wherein $\beta1$ and $\beta2$ are angles between an axis perpendicular to the first axis within the main scanning cross section and projections of the directions of incidence of the first and second light fluxes onto a first cross section perpendicular to the first axis, respectively.

5. The optical scanning apparatus according to claim 1, wherein $\alpha1/\alpha2 = -1$ is satisfied.

6. The optical scanning apparatus according to claim 1, wherein the imaging optical system includes:
   a second imaging lens on which the first light flux having passed through the first imaging lens is incident; and
   a third imaging lens on which the second light flux having passed through the first imaging lens is incident.

7. The optical scanning apparatus according to claim 6, wherein the second and third imaging lenses have an identical shape and are positioned in two-fold rotational symmetry to each other with respect to an optical axis of the first imaging lens.

8. The optical scanning apparatus according to claim 6, wherein each of the second and third imaging lenses has an asymmetrical shape in the main scanning direction with respect to an optical axis of the first imaging lens.

9. The optical scanning apparatus according to claim 1, wherein the directions of incidence of the first and second light fluxes intersect each other on a side closer to a rotational axis of the deflecting unit than a deflection surface of the deflecting unit when the deflection surface is perpendicular to the first axis.

10. The optical scanning apparatus according to claim 1, wherein the deflecting unit scans the first and second scanned surfaces at different timing from each other.

11. The optical scanning apparatus according to claim 1, wherein the optical scanning apparatus satisfies the conditions of:

$\alpha2 \leq \alpha1 - 2 \times 360/N \times D$, and $\alpha2 \geq \alpha1 - 2 \times 360/N \times (1-D)$ where N is the number of deflecting surfaces included in the deflecting unit and D is a ratio of an effective scanning angle to a full scanning angle of the deflecting unit.

12. The optical scanning apparatus according to claim 11, wherein the optical scanning apparatus satisfies $\alpha2 < (\alpha1 - 360/N \times D)/2$, or $\alpha2 > (\alpha1 + 360/N \times D)/2$.

13. The optical scanning apparatus according to claim 11, wherein the optical scanning apparatus satisfies $\alpha2 > 2 \times \alpha1 + 360/N \times D$, or $\alpha2 < 2 \times \alpha1 - 360/N \times D$.

14. The optical scanning apparatus according to claim 11, wherein the optical scanning apparatus satisfies $\alpha2 > 2 \times \alpha1 - 360/N \times (2D)$, or $\alpha2 < 2 \times \alpha1 - 360/N \times (2+D)$.

15. The optical scanning apparatus according to claim 11, wherein the optical scanning apparatus satisfies $\alpha1 > 360/N \times D$.

16. The optical scanning apparatus according to claim 11, where the optical scanning apparatus satisfies $\alpha2 > 360/N \times D$, or $\alpha2 < -360/N \times D$.

17. The optical scanning apparatus according to claim 11, wherein the optical scanning apparatus satisfies $\beta1 = -\beta2$ wherein β1 and β2 are angles between an axis orthogonal to the first axis within the main scanning cross section and projections of the directions of incidence of the first and second light fluxes onto a first cross section perpendicular to the first axis, respectively.

18. The optical scanning apparatus according to claim 11, wherein the optical scanning apparatus satisfies $$|\beta1|>NA1, \text{ and}$$

$$|\beta2|>NA2$$

wherein β1 and β2 are angles between an axis orthogonal to the first axis within the main scanning cross section and projections of the directions of incidence of the first and second light fluxes onto a first cross section perpendicular to the first axis, respectively, and NA1 and NA2 are spread angles of marginal rays of the first and second light fluxes within a sub-scanning cross section.

19. An image forming apparatus, comprising:
a light scanning apparatus;
a developing unit which develops toner images of electrostatic latent images formed on first and second scanned surfaces by the optical scanning apparatus;
a transferring unit which transfers the developed toner images to a transferred material; and
a fixing unit which fixes the transferred toner images onto the transferred material, wherein
the optical scanning apparatus includes:
a splitting element which splits a light flux emitted from a light source into first and second light fluxes;
a deflecting unit which deflects the first and second light fluxes to scan first and second scanned surfaces in a main scanning direction; and
an imaging optical system which includes a first imaging lens on which both the first and second light fluxes deflected by the deflecting unit are incident and guides the first and second light fluxes to the first and second scanned surfaces, respectively and,
the condition expressed by $$-1.1 \leq \alpha1/\alpha2 \leq -0.9$$

is satisfied where α1 and α2 are angles within a main scanning cross section between a first axis parallel to the main scanning cross section and directions of incidence of the first and second light fluxes on the deflecting unit, respectively.

20. An image forming apparatus, comprising:
an optical scanning apparatus, and
a printer controller which converts code data output from an external apparatus into an image signal and inputs the image signal to the optical scanning apparatus, wherein
the optical scanning apparatus includes:
a splitting element which splits a light flux emitted from a light source into first and second light fluxes;
a deflecting unit which deflects the first and second light fluxes to scan first and second scanned surfaces in a main scanning direction; and
an imaging optical system which includes a first imaging lens on which both the first and second light fluxes deflected by the deflecting unit are incident and guides the first and second light fluxes to the first and second scanned surfaces, respectively, and,
the condition expressed by $$-1.1 \leq \alpha1/\alpha2 \leq -0.9$$

is satisfied where α1 and α2 are angles within a main scanning cross section between a first axis parallel to the main scanning cross section and directions of incidence of the first and second light fluxes on the deflecting unit, respectively.

* * * * *